US008665347B2

(12) United States Patent
Miyawaki et al.

(10) Patent No.: US 8,665,347 B2
(45) Date of Patent: Mar. 4, 2014

(54) IMAGE PROCESSING DEVICE, IMAGE PROCESSING PROGRAM, AND IMAGING DEVICE COMPUTING BRIGHTNESS VALUE AND COLOR PHASE VALUE

(75) Inventors: Yu Miyawaki, Tokyo (JP); Tsuyoshi Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 486 days.

(21) Appl. No.: 12/839,621

(22) Filed: Jul. 20, 2010

(65) Prior Publication Data
US 2011/0032389 A1 Feb. 10, 2011

(30) Foreign Application Priority Data

Jul. 21, 2009 (JP) ................................. 2009-170367
Jul. 21, 2009 (JP) ................................. 2009-170368
Feb. 26, 2010 (JP) ................................. 2010-043004
Feb. 26, 2010 (JP) ................................. 2010-043013

(51) Int. Cl.
*H04N 9/68* (2006.01)
(52) U.S. Cl.
USPC ........................................................ 348/234
(58) Field of Classification Search
USPC ................... 348/234, 237; 382/275
See application file for complete search history.

(56) References Cited

U.S. PATENT DOCUMENTS

| 6,035,072 | A  | * | 3/2000 | Read ............................. 382/275 |
| 6,233,364 | B1 |   | 5/2001 | Krainiouk et al. |
| 7,969,627 | B2 | * | 6/2011 | Ishiguro et al. ............... 358/514 |
| 8,170,365 | B2 | * | 5/2012 | Shimizu ......................... 382/275 |
| 2006/0115177 | A1 | | 6/2006 | Ishiga |
| 2008/0285840 | A1 | * | 11/2008 | Kawai ............................. 382/141 |
| 2009/0087022 | A1 | | 4/2009 | Fukuda et al. |

FOREIGN PATENT DOCUMENTS

| CN | 101460971 A | 6/2009 |
| EP | 0 831 421 A2 | 3/1998 |
| EP | 1 583 356 A1 | 10/2005 |
| JP | A-10-228536 | 8/1998 |
| JP | A-10-232915 | 9/1998 |
| JP | A-2000-092319 | 3/2000 |
| JP | A-2000-137804 | 5/2000 |
| JP | A-2001-197289 | 7/2001 |
| JP | A-2003-209683 | 7/2003 |

(Continued)

OTHER PUBLICATIONS

Office Action issued in Japanese Patent Application No. 2009-170367 dated Nov. 1, 2011 (with translation).

(Continued)

*Primary Examiner* — Roberto Velez
*Assistant Examiner* — Gary C Vieaux
(74) *Attorney, Agent, or Firm* — Oliff & Berridge, PLC

(57) ABSTRACT

An image processing device comprises: a brilliance gradient computation unit computing a brilliance gradient within an image based on an image information; a color phase value computation unit computing a first color phase value and a second color phase value, the first color phase value representing a color phase inside a candidate region determined based on the brilliance gradient computed by the brilliance gradient computation unit, the second color phase value representing a color phase in a region surrounding the candidate region; and a region extraction unit extracting a region from the candidate region such that a difference between the first color phase value and the second color phase value is less than or equal to a predetermined threshold value.

2 Claims, 26 Drawing Sheets

(56) References Cited

FOREIGN PATENT DOCUMENTS

| JP | A-2004-220553 | 8/2004 |
|---|---|---|
| JP | A-2005-079856 | 3/2005 |
| JP | A-2006-060290 | 3/2006 |
| JP | A-2007-082021 | 3/2007 |
| JP | A-2007-094487 | 4/2007 |
| JP | A-2007-264203 | 10/2007 |
| JP | A-2007-311903 | 11/2007 |
| JP | A-2008-258982 | 10/2008 |
| JP | A-2008-306442 | 12/2008 |
| JP | A-2009-016985 | 1/2009 |

OTHER PUBLICATIONS

Sarabandi et al.; "Shadow Detection and Radiometric Restoration in Satellite High Resolution Images;" *GeoScience and Remote Sensing Symposium*; vol. 6; 2004; pp. 3744-3747; IEEE.

Kang et al. "Automatic Defect Classification of TFT-LCD Panels Using Machine Learning;" *Industrial Electronics*;2009; pp. 2175-2177; IEEE.

Farid; "Blind Inverse Gamma Correction;" *Transactions on Image Processing*; vol. 10; No. 10; 2001; pp. 1428-1433; IEEE.

Salavador et al. "Shadow Identification and Classification Using Invariant Color Models;" *International Conference on Acoustics, Speech, and Signal Processing*; vol. 3; 2001; pp. 1545-1548; IEEE.

Extended European Search Report issued in European Application No. 10170159.7 dated Nov. 22, 2010.

Sep. 11, 2012 Notice of Reasons for Rejection issued in Japanese Patent Application No. 2010-043013 (with English-language translation).

Feb. 7, 2012 Notice of Allowance issued in Japanese Patent Application No. 2009-170367 (with translation).

Jan. 10, 2012 Office Action issued in Japanese Patent Application No. 2010-043013 (with translation).

Feb. 7, 2012 Office Action issued in Japanese Patent Application No. 2010-043004 (with translation).

Feb. 12, 2013 Decision of Rejection in Japanese Application No. 2009-170368 (with translation).

Apr. 9, 2013 Notice of Allowance issued in Japanese Application No. 2010-043013 (with translation).

Jun. 11, 2013 Notice of Allowance issued in Japanese Patent Application No. 2012-051672 (with translation).

Nov. 20, 2012 Office Action issued in Japanese Patent Application No. 2009-170368 (with translation).

Nov. 28, 2013 Office Action issued in Chinese Patent Application No. 201010234441.X (with translation).

* cited by examiner

IMAGE PROCESSING DEVICE, IMAGE PROCESSING PROGRAM, AND IMAGING DEVICE COMPUTING BRIGHTNESS VALUE AND COLOR PHASE VALUE

BACKGROUND OF THE INVENTION

The present application claims priority on Japanese Patent Application No. 2009-170367, filed Jul. 21, 2009; Japanese Patent Application No. 2009-170368, filed Jul. 21, 2009; Japanese Patent Application No. 2010-043004, filed Feb. 26, 2010; and Japanese Patent Application No. 2010-043013, filed Feb. 26, 2010; the contents of which are incorporated herein by reference.

FIELD OF THE INVENTION

The present invention relates to an image processing device, an image processing program, and an imaging device.

DESCRIPTION OF THE RELATED ART

When an imaging is performed using an imaging device such as a digital camera, and litter is attached on an imaging light path of an optical component such as an optical filter and the like placed near an imaging element, a shadow created by the attached litter may be shown in the captured image. In particular, regarding a lens-exchanging-type imaging device, litter such as dust and dirt may enter and attach to the interior of a camera body when, for instance, the lens is being exchanged. For example, according to technology disclosed in Japanese Unexamined Patent Application, First Publication No. 2004-220553 (hereinafter may be referred to as Patent Document 1), in order to detect a litter shadow being shown in the image and to perform a correction, a coordinate of a position of a litter is computed by performing, in advance, an imaging of a standard image. The standard image is such that a litter shadow is shown in a uniform plane. Furthermore, a correction is made to delete a litter shadow with respect to a position corresponding to the position of the litter in the standard image with respect to the captured image of the object to be corrected. In addition, Patent Document 1 describes technology to extract a litter shadow based on a change in a brilliance information of each pixel included in the image to be corrected.

However, when a correction of the litter shadow is performed based on the standard image using the technology described in Patent Document 1, the operation is performed for a plurality of images including the standard image and the image to be corrected. Therefore, the operation becomes complicated. As a result, the imaging device needs to have a substantial degree of processing capability. Further, a substantial amount of processing time is required. On the other hand, when the litter shadow is extracted based on a change in the brilliance information of each pixel included in the image to be corrected, there is a problem in that a change in the brilliance due to the coloring of the subject is erroneously regarded and detected as a litter shadow. When a litter shown in the image is extracted, it is preferable that the extraction be completed efficiently with a small number of steps. It is also preferable that the incidence of erroneous detection of the litter shadow be reduced.

In addition, when an imaging is performed using an imaging device such as a digital camera, and litter is attached on an imaging light path of an optical component such as an optical filter and the like placed near an imaging element, a shadow created by the attached litter may be shown in the captured image. In particular, regarding a lens-exchanging-type imaging device, litter such as dust and dirt may enter and attach to the interior of a camera body when, for instance, the lens is being exchanged. For example, according to technology disclosed in Patent Document 1, in order to extract a litter shadow being shown in the image and to perform a correction, a coordinate of a position of a litter is computed by performing, in advance, an imaging of a standard image. The standard image is such that a litter shadow is shown in a uniform plane. Furthermore, a correction is made to delete a litter shadow with respect to a position corresponding to the position of the litter in the standard image with respect to the captured image of the object to be corrected. In addition, Patent Document 1 describes technology to extract a litter shadow based on a change in a brilliance information of each pixel included in the image to be corrected.

However, when a correction of the litter shadow is performed based on the standard image using the technology described in Patent Document 1, the operation is performed for a plurality of images including the standard image and the image to be corrected. Therefore, the imaging device needs to have a substantial degree of processing capability which is commensurate with the processing load of the complicated operation. Further, a substantial amount of processing time is required to cope with the processing load of the complicated operation. On the other hand, when the litter shadow is extracted based on a change in the brilliance information of each pixel included in the image to be corrected, there is a problem in that a change in the brilliance due to the coloring of the subject is erroneously regarded and detected as a litter shadow. Here, when a litter shown in the image is extracted, it is preferable that the extraction be completed efficiently with a small processing load. It is also preferable that the incidence of erroneous detection of the litter shadow be reduced.

In addition, regarding an imaging device such as a digital camera, a foreign object may attach to an optical component such as an optical filter placed along an imaging light path. As a result of the attached foreign object, an imaging defect may occur on the captured image. As conventional technology to solve such problems, an image processing device has been suggested, for example, which detects a foreign object which is shown in the image, based on a brilliance data of the captured image, and removes this foreign object (see, for example, Patent Document 1).

However, according to the conventional technology, an erroneous detection may occur because the accuracy with which the foreign object shown in the captured image is detected has been inadequate. Moreover, according to conventional technology, there is a problem in that it is difficult to determine whether or not a change in the brilliance in a specified region is due to a foreign object being shown.

In addition, regarding an imaging device such as a digital camera, a foreign object may attach to an optical component such as an optical filter placed along an imaging light path. As a result of the attached foreign object, an imaging defect may occur on the captured image. As conventional technology to solve such problems, an image processing device has been suggested, for example, which detects a foreign object which is shown in the image, based on a brilliance data of the captured image, and removes this foreign object (see, for example, Patent Document 1).

However, according to the conventional technology, there is a problem in that when a correction is made with respect to the captured image to remove the foreign object shown in the image, a correction trace is created in the image after the correction.

SUMMARY OF THE INVENTION

Considering the problems described above, an object of the present invention is to provide an image processing device, an image processing program, and an imaging device which efficiently and accurately extracts a litter shadow shown in an image.

In addition, an object of the present invention is to provide an image processing device, an image processing program, and an imaging device which accurately extracts a litter shadow, shown in an image, with a smaller processing load.

In addition, an object of the present invention is to provide an image processing device and an image processing program which detects a foreign object of an image with a high degree of accuracy.

In addition, an object of the present invention is to provide an image processing device, an image processing program, and an imaging device which performs a correction of an image in a preferable manner.

An image processing device according to an aspect of the present invention comprises a brilliance gradient computation unit computing a brilliance gradient within an image based on an image information; a color phase value computation unit computing a first color phase value and a second color phase value, the first color phase value representing a color phase inside a candidate region determined based on the brilliance gradient computed by the brilliance gradient computation unit, the second color phase value representing a color phase in a region surrounding the candidate region; and a region extraction unit extracting a region from the candidate region such that a difference between the first color phase value and the second color phase value is less than or equal to a predetermined threshold value.

The image processing device may be configured as follows: the brilliance gradient computation unit computes the brilliance gradient based on the image information being inverse-gamma-corrected.

The image processing device may be configured as follows: the region extraction unit makes a determination regarding whether or not a size of the candidate region is greater than or equal to a predetermined threshold value. The region extraction unit also extracts the region based on a result of the determination.

The image processing device may be configured as follows: the image processing device further comprises a brightness computation unit computing a level of a brightness inside the image. Here, the region extraction unit extracts the region based on at least one of a determination regarding whether or not a brightness value of a region surrounding the candidate region is greater than or equal to a predetermined threshold value, a determination regarding whether or not a variation of a brightness value of a region surrounding the candidate region is less than or equal to a predetermined threshold value, and a determination regarding whether or not a ratio of a brightness value of the candidate region and a brightness value of a region surrounding the candidate region is less than or equal to a predetermined threshold value.

The image processing device may be configured as follows: the image processing device further comprises a brightness computation unit computing a first brightness value and a second brightness value, the first brightness value representing a brightness of each portion inside an image, and the second brightness value representing a brightness of a region surrounding the each portion. In addition, the image processing device further comprises a region extraction unit extracting a region comprising the portion such that a difference between the first brightness value and the second brightness value is greater than or equal to a predetermined threshold value, and a difference between the first color phase value and the second color phase value is not greater than or equal to a predetermined threshold value.

The image processing device may be configured as follows: the image processing device further comprises a standard deviation computation unit computing a standard deviation of a brightness value of a pixel comprised by the image and a brightness value of a portion surrounding the pixel. Here, the region extraction unit extracts a region satisfying an additional condition that the standard deviation computed by the standard deviation unit is greater than or equal to a predetermined threshold value.

The image processing device may be configured as follows: the region extraction unit makes a determination regarding whether or not a number of pixels comprised by the region being extracted is within a predetermined range of number of pixels, and extracts the region satisfying an additional condition that the number of pixels is within the predetermined range.

The image processing device may be configured as follows: the region extraction unit extracts the region satisfying an additional condition that a brightness value of a portion surrounding the region being extracted is greater than or equal to a predetermined threshold value.

The image processing device may be configured as follows: the region extraction unit extracts the region satisfying a further condition that a standard deviation of a brightness of a portion surrounding the region being extracted is less than or equal to a predetermined threshold value.

The image processing device may be configured as follows: the region extraction unit extracts the region satisfying a further condition that a ratio of a brightness value of the region being extracted and a brightness value of an area surrounding the region is less than or equal to a predetermined threshold value.

By the way, an image processing device according to an aspect of the present invention comprises an image input unit into which a photographed image is inputted; and a determination unit using a brightness information corresponding to a brightness of a detection region within the photographed image, and a saturation information corresponding to a saturation of the detection region to make a determination regarding whether or not the detection region is a portion corresponding to a foreign object shown in the photographed image. Here, after the determination unit uses the brightness information to determine whether or not the detection region is a portion corresponding to the foreign object, the determination unit uses the saturation information to make a determination regarding whether or not the detection region is a portion corresponding to the foreign object.

The image processing device may be configured as follows: when a difference between a first saturation information corresponding to a saturation of the detection region and a second saturation information corresponding to a saturation of an area surrounding the detection region is within a predetermined range, the determination unit makes a determination that the detection region is a portion corresponding to the foreign object.

The image processing device may be configured as follows: when a difference between a first saturation information corresponding to a saturation of the detection region and a second saturation information corresponding to a saturation of an area surrounding the detection region is not within a predetermined range, the determination unit makes a determination that the detection region is not a portion corresponding to the foreign object.

The image processing device may be configured as follows: the determination unit uses a gradient between a brightness of the detection region and a brightness of an area surrounding the detection region to determine whether or not the detection region is a portion corresponding to the foreign object.

The image processing device may be configured as follows: the determination unit uses a ratio of a first saturation information corresponding to a saturation of the detection region and a second saturation information corresponding to a saturation of an area surrounding the detection region to make a determination regarding whether or not the detection region is a portion corresponding to the foreign object.

The image processing device may be configured as follows: when a second brightness information corresponding to a brightness of an area surrounding the detection region is not within a predetermined range, the determination unit makes a determination that the detection region is not a portion corresponding to the foreign object.

The image processing device may be configured as follows: when a standard deviation of a brightness of an area surrounding the detection region is not within a predetermined range, the determination unit makes a determination that the detection region is not a portion corresponding to the foreign object.

By the way, an image processing program according to an aspect of the present invention makes a computer execute the steps comprising: a step computing a first brightness value representing a brightness of each portion within an image, and a second brightness value representing a brightness of an area surrounding the each portion; a step computing a first color phase value representing a color phase within a region and a second color phase value representing a color phase of an area surrounding the region; and a step extracting a region comprising the each portion such that a difference between the first brightness value and the second brightness value is greater than or equal to a predetermined threshold value, and a difference between the first color phase value and the second color phase value is not greater than or equal to a predetermined threshold value.

By the way, an imaging device according to an aspect of the present invention comprises: an imaging unit capturing an image; a brightness computation unit computing a first brightness value representing a brightness of each portion within the image captured by the imaging unit and a second brightness value representing a brightness of an area surrounding the each portion; a color phase value computation unit computing a first color phase value representing a color phase of the each portion and a second color phase value representing a color phase of an area surrounding the each portion; and a region extraction unit extracting a region comprising the each portion such that a difference between the first brightness value and the second brightness value is greater than or equal to a predetermined threshold value, and a difference between the first color phase value and the second color phase value is not greater than or equal to a predetermined threshold value.

By the way, an image processing program according to an aspect of the present invention makes a computer execute the steps comprising: a step computing a brilliance gradient within an image based on an image information; a step computing a first color phase value and a second color phase value, the first color phase value representing a color phase inside a candidate region determined based on the brilliance gradient being computed, the second color phase value representing a color phase in an area surrounding the candidate region; and a step extracting a region from the candidate region such that a difference between the first color phase value and the second color phase value is less than or equal to a predetermined threshold value.

By the way, an imaging device according to an aspect of the present invention comprises an imaging unit capturing an image and generating an image information; a brilliance gradient computation unit computing a brilliance gradient within an image based on the image information; a color phase value computation unit computing a first color phase value and a second color phase value, the first color phase value representing a color phase inside a candidate region determined based on the brilliance gradient computed by the brilliance gradient computation unit, the second color phase value representing a color phase in an area surrounding the candidate region; and a region extraction unit extracting a region from the candidate region such that a difference between the first color phase value and the second color phase value is less than or equal to a predetermined threshold value.

By the way, a program according to an aspect of the present invention makes a computer execute the steps comprising: a step inputting a captured image; a step computing a brightness information of the captured image; a step computing a saturation information of the captured image; and a step using the brightness information and the saturation information to detect a foreign object information regarding a foreign object shown in the captured image.

By the way, a program according to an aspect of the present invention makes a computer execute the steps comprising: a step inputting a captured image; and a step using a brightness information corresponding to a brightness of a detection region inside the captured image and a saturation information corresponding to a saturation of the detection region to determine whether or not the detection region is a portion corresponding to a foreign object shown in the captured image.

By the way, an image processing device according to an aspect of the present invention comprises: an image input unit into which an image is imputed; a correction unit performing a first correction and a second correction, the first correction performed by using a brightness information corresponding to a brightness of the image and reducing an influence of a foreign object shown in the image with respect to a portion corresponding to the foreign object, and the second correction performed by using at least one of a saturation information corresponding to a saturation of the image and a color phase information corresponding to a color phase of the image and reducing an influence of a foreign object shown hi the image with respect to a portion corresponding to the foreign object.

The image processing device may be configured as follows: the image is processed with a non-linear correction with respect to a captured image obtained by performing a photo-electric conversion on an image of an optical system.

The image processing device may be configured as follows: the image processing device further comprises a determination unit determining whether or not the image has been processed with a non-linear correction. Here, when the determination unit determines that the image has been processed with a non-linear correction, the correction unit performs the first correction and the second correction.

The image processing device may be configured as follows: when the determination unit determines that the image has not been processed with a non-linear correction, the correction unit does not perform the second correction.

The image processing device may be configured as follows: the image processing device further comprises a determination unit determining whether a non-linear correction applied to the image is strong or weak. Here, when the determination unit determines that a strong non-linear correction has been applied to the image, the correction unit performs the first correction and the second correction, and, when the determination unit determines that a weak non-linear correction has been applied to the image, the correction unit does not perform the second correction.

The image processing device may be configured as follows: the correction unit computes a first correction amount and a second correction amount, and performs the first correction and the second correction based on a first correction amount and a second correction amount with respect to a plurality of portions corresponding to a plurality of foreign objects shown in the image. Here, the first correction amount is applied during the first correction individually with respect to each of the plurality of portions. The second correction amount is applied during the second correction.

By the way, an imaging device according to an aspect of the present invention comprises: an imaging unit capturing an image of an optical system and outputting a captured image; an image conversion unit outputting an image obtained by processing the captured image with a non-linear correction; and a correction unit performing a first correction and a second correction, the first correction performed by using a brightness information corresponding to a brightness of the image and reducing an influence of a foreign object shown in the image with respect to a portion corresponding to the foreign object, and the second correction performed by using at least one of a saturation information corresponding to a saturation of the image and a color phase information corresponding to a color phase of the image and reducing an influence of a foreign object shown in the image with respect to a portion corresponding to the foreign object.

By the way, a program according to an aspect of the present invention makes a computer execute the steps comprising: a step inputting an image; and a step performing a first correction and a second correction, the first correction performed by using a brightness information corresponding to a brightness of the image and reducing an influence of a foreign object shown in the image with respect to a portion corresponding to the foreign object, and the second correction performed by using at least one of a saturation information corresponding to a saturation of the image and a color phase information corresponding to a color phase of the image and reducing an influence of a foreign object shown in the image with respect to a portion corresponding to the foreign object.

DETAILED DESCRIPTION OF THE PREFERRED EMBODIMENTS

Hereunder, an embodiment of an image processing device, an image processing program, and an imaging device according to an aspect of the present invention is described with respect to the diagrams.

The following description aims to provide a detailed explanation in order to facilitate an understanding of a gist of the present invention. Therefore, unless specifically indicated, the following description does not limit the present invention in any way.

Hereunder, a first embodiment of the present invention is described in detail with reference to FIGS. 1-6.

Figure 1:
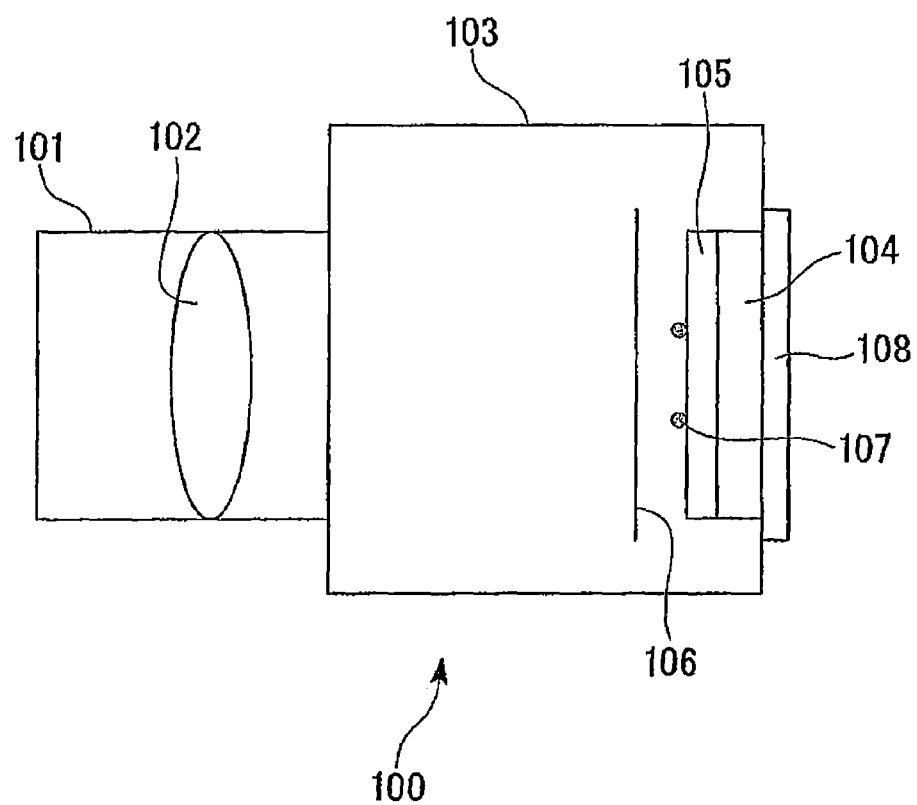
FIG. 1 is a diagram showing an example of a configuration of an imaging device according to a first embodiment of the present invention.

FIG. 1 is a diagram showing a configuration of an imaging device 100 according to the above embodiment. The imaging device 100 is a digital camera of a lens-exchanging type. The imaging device 100 comprises an optical system 101 including a lens 102 which is a cluster of a plurality of optical lens. A camera body 103 is equipped with the optical system 101. The camera body 103 comprises optical components such as a shutter 106 and an optical filter 105, as well as an imaging element 104. Examples of the imaging element 104 include a CCD (Charge Coupled Device) and a CMOS (Complimentary Metal Oxide Semiconductor). An image, formed on its image forming surface after being exposed via the optical system 101, is converted into an electric signal. Then, an image signal, which is the electric signal after undergoing the conversion, is outputted. The outputted image signal is converted to an image data. In this way, the outputted image signal is displayed on the monitor 108 equipped on the camera body 103. An example of the monitor 108 includes a liquid crystal display such as an LCD (Liquid Crystal Display).

Here, the optical system 101 may be attached to the camera body 103, and can also be removed from the camera body 103. When the optical system 101 is being attached or removed, a litter might enter the interior portion of the camera body 103. As a result, litter might attach to a litter on the imaging light path. FIG. 1 indicates a litter 107 attached to the optical filter 105. Such litter 107 obstructs light entering through the optical system 101. As a result, the litter 107 creates a shadow on an image formed on the imaging element 104. Therefore, a litter shadow is shown in the image data created by the imaging device 100. According to the imaging device 100 based on the above embodiment, a correction is made to detect and delete such litter shadow shown in the image data.

Figure 2:
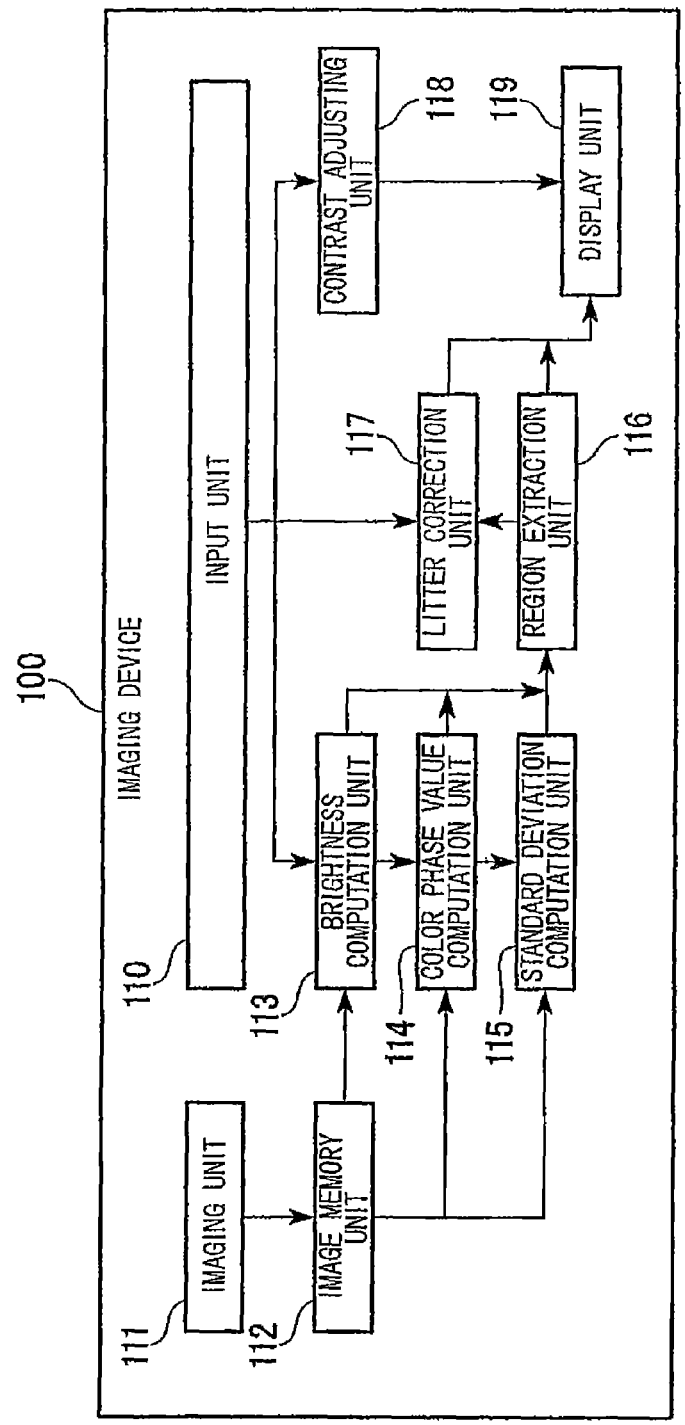
FIG. 2 is a block diagram showing an example of a configuration of an imaging device according to the above embodiment.

FIG. 2 is a block diagram showing a configuration of an imaging device 100 according to the above embodiment. The imaging device 100 comprises a microcomputer and CPU (Central Processing Unit) which controls the operation of each component based on a program stored in advance in its memory area. The imaging device 100 comprises an input unit 110, an imaging unit 111, an image memory unit 112, a brightness computation unit 113, a color phase value computation unit 114, a standard deviation computation unit 115, a region extraction unit 116, a litter correction unit 117, a contrast adjusting unit 118, and a display unit 119.

The input unit 110 receives an input of an operational information from a user. The input unit 110 includes, for instance, a command dial which mainly receives an input of information on adjusting the shutter speed while imaging, a sub-command dial which mainly receives an input of information on adjusting an aperture value while imaging, a play button which receives an input of a request for playing an image that was taken and stored, a delete button which receives an input of a request to delete an image that was taken and stored, and a determination button which selects a menu item displayed on the display unit 119.

The imaging unit 111 forms an image by driving the optical system 101 based on a predetermined control procedure, and by generating an image data based on an image signal outputted by the imaging element 104. Here, the image data generated by the imaging unit 111 is information such that the color of each pixel is expressed by the ROB colorimetric system.

The image memory unit 112 stores the image data created by the imaging unit 111.

The brightness computation unit 113 computes a first brightness value indicating a degree of brightness within a defined region included in the image data stored in the image memory unit 112. The brightness computation unit 113 also computes a second brightness value indicating a degree of brightness of a vicinity of the defined region. Here, the vicinity of the defined region indicates, for example, image elements within five pixels of the defined region. The brightness computation unit 113 computes a brilliance information (Y) indicating a degree of brilliance based on an ROB value of the image elements included in the image data. In addition, the brightness computation unit 113 computes a brilliance information based on an RGB value according to Equation (1) below:

Equation (1)

$$Y=(0.299 \times R+0.589 \times G+0.114 \times B)/255 \qquad (1)$$

According to Equation (1) above, the brightness computation unit 113 computes a brilliance information for each image element included in the image data stored in the image memory unit 112. Thus, the brightness computation unit 113 creates a brilliance plane corresponding to the image data. According to the example presented here, the brightness computation unit 113 computes a brilliance information as information indicating a degree of brightness of an image element. However, an application is also possible in which a luminosity, for instance, is computed.

The color phase value computation unit 114 computes a first color phase value indicating a color phase within a defined region and a second color phase value indicating a color phase in a vicinity of the defined region. The color phase value computation unit 114 computes a color phase value (Hue) based on an RGB value of an image element included in the image data. Here, the color phase value computation unit 114 computes a color phase value by converting an RGB value of an image element included in the image data into an HSV color system. The HSV color system is a model for representing a color by H (Hue: color phase), S (Saturation: chromaticness), and V (Value: luminosity). The color phase value computation unit 114 computes a color phase value (H) based on Equation (2) below.

Equation (2)

$$\left.\begin{aligned}
&V\max = \max\{R, G, B\} \\
&V\min = \min\{R, G, B\} \\
&V = V\max \\
&S = (V\max - V\min)/V\max \\
&H = \begin{cases} (\pi/3)(b-g) & R = V\max \\ (\pi/3)(2+r-b) & G = V\max \\ (\pi/3)(4+g-r) & B = V\max \end{cases} \\
&\text{Here,} \\
&r = (V\max - R)/(V\max - V\min) \\
&g = (V\max - G)/(V\max - V\min) \\
&b = (V\max - B)/(V\max - V\min)
\end{aligned}\right\} \qquad (2)$$

Here, when the inequality H<0 holds, $2\pi$ is added to H. When the equation Vmax=0 holds, then S=0 and H=(indefinite). According to Equation (2) above, the color phase value computation unit 114 computes a color phase value for each image element included in the image data stored in the image memory unit 112.

The standard deviation computation unit 115 obtains information on the level of discrepancy of the brightness of the image data by computing, for each image element included in the image data, a variation indicating a difference between a brightness value (i.e., brilliance information) of the image element and a brightness value (i.e., brilliance information) of a vicinity of the image element. The standard deviation computation unit 115 creates a matrix for each predetermined section for the brilliance plane computed by the brightness computation unit 113. The standard deviation computation unit 115 obtains information on the level of discrepancy of the brightness by computing a standard deviation (Ystd) wherein a center of the matrix is regarded as a pixel of interest. Here, an example of a predetermined section is a matrix with five rows of image elements and five columns of image elements. The standard deviation computation unit 115 computes the standard deviation based on Equation (3) below.

Equation (3)

$$std = \sqrt{\frac{1}{n-1} \sum_{1}^{n} (xi - \bar{x})^2} \quad (3)$$

Here, n indicates the number of elements in a matrix, xi indicates the value of the element of the matrix, x with a bar (−) on top indicates an average value of all of the elements included in the matrix to be processed. The standard deviation computation unit 115 computes the standard deviation for each image element of the brilliance plane computed by the brightness computation unit 113. In this way, the standard deviation computation unit 115 creates a standard deviation plane. The value of the standard deviation in the standard deviation plane becomes relatively large in a region in which the discrepancy of the level of brilliance is large. Meanwhile, the value of the standard deviation in the standard deviation plane becomes relatively small in a portion in which the discrepancy of the level of brilliance is small. Therefore, Ystd indicates a large value in a region in which the brilliance has changed due to the influence of a litter shadow. Meanwhile, Ystd indicates a small value in a uniform plane such as in a vacancy. In this example, the matrix computed by the standard deviation computation unit 115 had a dimension of five rows and five columns. However, the number of rows and columns in a matrix may be another optional and appropriate value. For example, when a matrix larger than a five-by-five matrix is set to be the matrix to be processed, it is possible to obtain a standard deviation plane in which the noise included in the brilliance information is eliminated due to averaging effects and the like. Here, an example is presented in which the discrepancy in the level of brightness of the image data is computed by calculating the standard deviation. However, it is also possible to use a dispersion obtained by computing a square value of the standard deviation.

The region extraction unit 116 extracts, from the image data to be processed, a region in which there is a high possibility that a litter shadow is shown. A plurality of predetermined conditions set for extracting a region of the litter shadow is already stored in the memory region of the region extraction unit 116. Based on the predetermined conditions, the region extraction unit 116 narrows down the region having a high possibility that the litter shadow is shown. Thus, the region extraction unit 116 determines that a region satisfying all of the conditions is the region in which a litter shadow is shown.

First, the region extraction unit 116 extracts, from the image data, a region satisfying a condition such that a standard deviation computed by the standard deviation computation unit 115 is greater than or equal to a predetermined threshold value. The region extraction unit 116 compares a standard deviation of an image element included in a standard deviation plane created by the standard deviation computation unit 115 and the predetermined threshold value of the standard deviation. When the standard deviation of the image element included in the standard deviation plane is greater than or equal to the predetermined threshold value, the region extraction unit 116 sets a value of the image element to 1. When the standard deviation of the image element included in the standard deviation plane is less than the predetermined threshold value, the region extraction unit 116 sets a value of the image element to 0. In this way, the region extraction unit 116 creates a binary format image. In other words, according to the binary format image, the image element of the region, in which the variation of the brilliance compared to the surrounding image element is large and the standard deviation is greater than or equal to a threshold value, is set to 1. Meanwhile, the image element of the region, in which the variation of the brilliance compared to the surrounding image element is small and the standard deviation is less than the threshold value, is set to 0. The region extraction unit 116 extracts, from the generated binary format image, the region in which the value of the image element is 1. The region extraction unit 116 performs a condition determination process, described below, based on a condition for determining whether or not the extracted region is a litter shadow. When a plurality of region of image element clusters, which are not positioned to be adjacent to one another, are extracted, the region extraction unit 116 performs the following condition determination process for each region that is extracted.

Incidentally, when a litter shadow is formed by a litter attached along an imaging optical path of the imaging device 100, the litter shadow affects the brilliance of the image. Meanwhile, the litter shadow does not affect the color phase. Using this characteristic, the region extraction unit 116 determines whether or not the extracted region is a litter shadow. In other words, the region extraction unit 116 refers to the brilliance plane generated by the brightness computation unit 113. Based on a condition that a difference between a brilliance of an image element of the extracted region and a brilliance of an image element of a vicinity of the extracted region is greater than or equal to a predetermined threshold value, and, that a difference between a color phase value computed by the color phase computation unit 114 for an image element of the extracted region and a color phase value computed by the color phase computation unit 114 for an image element of a vicinity of the extracted region is not greater than or equal to a predetermined threshold value, the region extraction unit 116 determines whether or not the extracted region satisfies the condition. When the extracted region satisfies this condition, the region extraction unit 116 determines that the region is a litter shadow. Meanwhile, when the extracted region does not satisfy the condition, the region extraction region 116 determines that the region is not a litter shadow. It is also possible to add a condition such that a brilliance of an image element of the extracted region is smaller than a brilliance of an image element of a vicinity of the extracted region. When a plurality of image elements are to be processed regarding an image element of the extracted region or the vicinity of the extracted region, it is possible to make a comparison based on an average value of the image elements included in each region.

Further, the region extraction unit 116 determines whether or not the extracted region is a litter shadow based on the size of the extracted region. For instance, when, as a result of comparing the number of image elements included in the extracted region and the lower limit value of the range of the number of image elements set to be the litter shadow, the number of image elements included in the extracted region is less than the lower limit value, the region extraction unit 116 determines that the region is not a litter shadow. This is because, when the size of the extracted region is too small, there is a possibility that the standard deviation of the region is determined to be greater than or equal to a threshold value due to noise. Meanwhile, when, as a result of comparing the number of image elements included in the extracted region and the upper limit value of the range of the number of image elements set to be the litter shadow, the number of image elements included in the extracted region is greater than or equal to the upper limit value, the region extraction unit 116 determines that the region is not a lifter shadow. This is because, when the size of the extracted region is too large, there is a possibility that the standard deviation of the region was determined to be greater than or equal to the threshold value because a photographic subject is present. In this way, the region extraction unit 116 determines whether or not the number of image elements included in the extracted region is within a predetermined range of the number of image elements. Thus, based on an additional condition that the number of image elements included in the extracted region is within the predetermined range of the number of image elements, the region extraction unit 116 determines that a region satisfying the condition is a litter shadow, and extracts the region.

Further, the region extraction unit 116 executes a determination process under an additional condition that the brightness value (brilliance information) of a region in a vicinity of the extracted region is greater than or equal to a predetermined threshold value. In this way, the region extraction unit 116 compares the brilliance information of the region in the vicinity of the extracted region and the predetermined threshold value. When the brilliance information is greater than or equal to the threshold value, the region extraction unit 116 determines that the region is a litter shadow. When the brilliance information is not greater than or equal to the threshold value, the region extraction unit 116 determines that the region is not a litter shadow.

Further, the region extraction unit 116 executes a determination process under an additional condition that a variation of a brightness of a region in a vicinity of the extracted region is less than or equal to a predetermined threshold value. The region extraction unit 116 refers to the standard deviation plane created by the standard deviation computation unit 115. When the standard variation is less than or equal to the threshold value, the region extraction unit 116 determines that the region is a litter shadow. When the standard deviation is not less than or equal to the threshold value, the region extraction unit 116 determines that the region is not a litter shadow.

Further, the region extraction unit 116 executes a determination process under an additional condition that a ratio of a brightness value of the extracted region and a brightness value of a region in a vicinity of the extracted region is less than or equal to a predetermined threshold value. The region extraction unit 116 refers to a brilliance plane created by the brightness computation unit 113, and computes a ratio of a brilliance of the extracted region and a brilliance of a region in a vicinity of the extracted region. When the computed ratio is less than or equal to the threshold value, the region extraction unit 116 determines that the region is a litter shadow. On the other hand, when the computed ratio is not less than or equal to the threshold value, the region extraction unit 116 determines that the region is not a litter shadow.

In addition, when the region extraction unit 116 performs the above condition determination process and determines that the extracted region is a litter shadow, the region extraction unit 116 computes a coordinate of the center of the extracted region in the image data. For example, the region extraction unit 116 displays a rectangular frame of a predetermined size at the computed coordinate of the center in the image data displayed on the display unit 119. By seeing the displayed frame, the user can be informed of the region determined to be a litter shadow.

The litter correction unit 117 performs a litter correction process to delete a litter shadow shown in the extraction region extracted by the region extraction unit 116. As described above, the extracted region, in which the litter shadow is shown, does not exhibit a change in the color phase compared to a region in a vicinity of the extracted region. Meanwhile, the extracted region, in which the litter shadow is shown, exhibits a change in the brilliance. Thus, the litter correction unit 117 deletes a litter shadow in the extracted region by, for example, enhancing a brilliance of an image element of the extracted region so that the brilliance becomes similar to a brilliance of an image element in a vicinity of the extracted region.

Figure 3A:
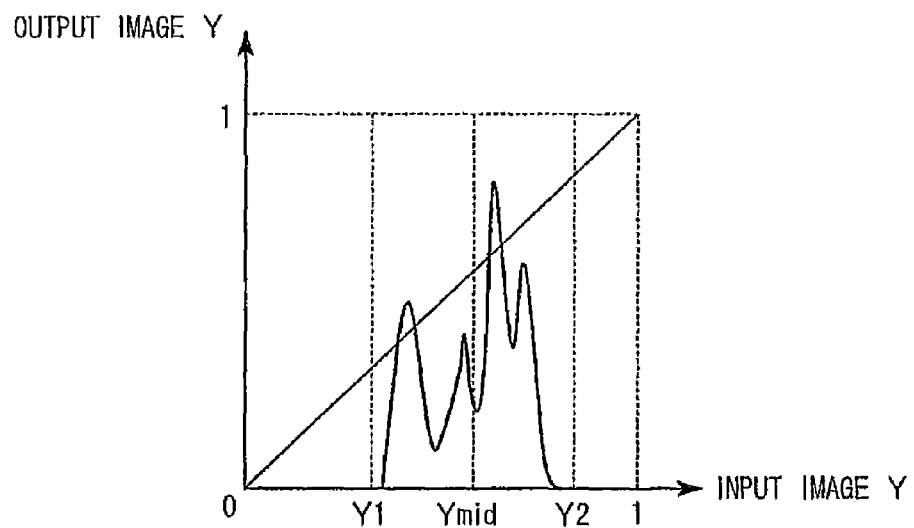
FIG. 3A is a block diagram showing a concept of adjusting a contrast according to the above embodiment.
Figure 3B:
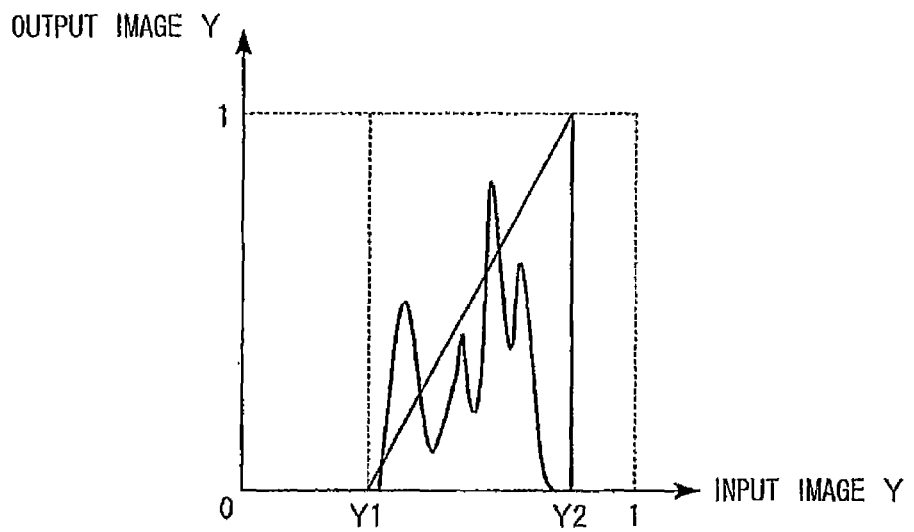
FIG. 3B is a block diagram showing a concept of adjusting a contrast according to the above embodiment.

The contrast adjusting unit 118 performs a process to enhance the contrast of the image data. For example, when the litter shadow is pale such that the difference between a brilliance of a image element of the region of the litter shadow and a brilliance of an image element in a vicinity of the region is too small for a human eye to recognize the difference, the user has difficulty recognizing that the litter shadow exists. Therefore, the contrast adjusting unit 118 enhances the contrast between a region of the litter shadow in the image data and a region in a vicinity of the litter shadow, thereby emphasizing a pale litter shadow. In this way, the contrast adjusting unit 118 displays the litter shadow to the display unit 119. As a result, the user can see and recognize the litter shadow more easily. For example, FIGS. 3A and 3B represent an example of a histogram and a tone curve of the extracted region extracted by the region extraction unit 116. In FIG. 3A, Y1 represents the minimum value of the brilliance, Y2 represents the maximum value of the brilliance, and Ymid represents the median value between Y1 and Y2. Here, the contrast adjusting unit 118 redistributes the brilliance between Y1 and Y2 on a 0-1 scale. Hence, as shown in FIG. 3B, the slope of the tone curve becomes 1/(Y2−Y1). Here, the contrast adjusting unit 118 can adjust the contrast by varying the interval between Y1 and Y2 according to the operational information entered by the user.

The display unit 119 is a screen displaying the image data. The display unit 119 corresponds to the monitor 108 in FIG. 1.

Figure 4:
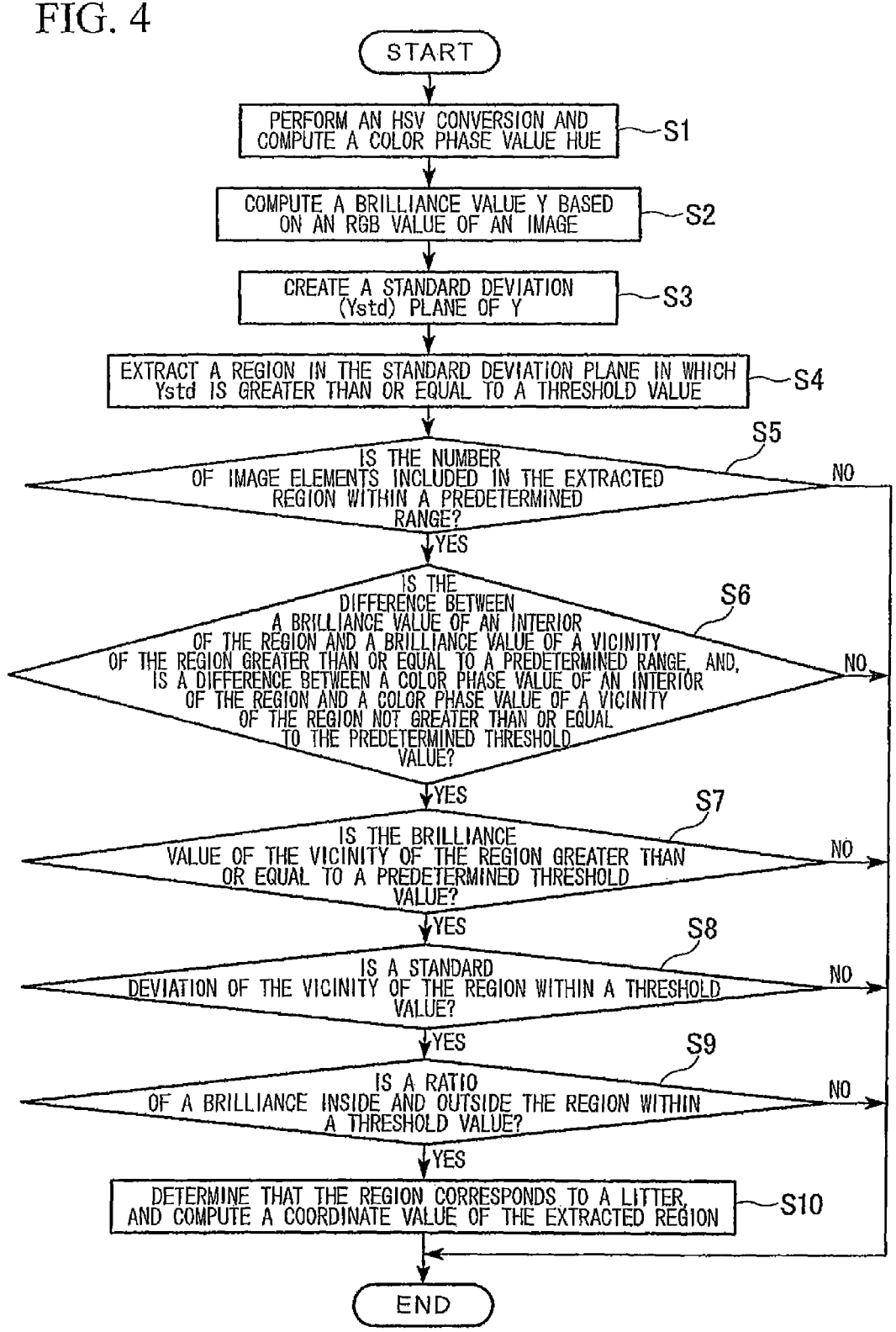
FIG. 4 is a flowchart showing an example of an operation of an imaging device according to the above embodiment.

Next, an example of an operation in which the imaging device 100 extracts a region in which a litter shadow is shown will be described with reference to the flowchart in FIG. 4. The imaging unit 111 captures the image, and the image data is generated. The image data is stored in the image memory unit 112. When the input unit 110 receives a selection from the user regarding the image data from which the litter is detected, the selected image data is read and outputted by the image memory unit 112, and is displayed on the display unit 119. Here, for example, when the image playing mode is changed to a "litter detection result displaying mode" according to the operational information entered by the user, the imaging device 100 begins a process of detecting a litter from the image data. First, the color phase value computation unit 114 performs an HSV conversion of the image data, and computes the color phase value (Hue) (step S1). The brightness computation unit 113 computes the brilliance information (Y) based on the ROB value of the image data, and creates a brilliance plane (step S2). The standard deviation computation unit 115 computes a standard deviation regarding a brilliance information of each image element of the brilliance plane, computed by the brightness computation unit 113 in step S2, and creates a standard deviation plane (step S3).

The region extraction unit 116 extracts a region in which the standard deviation (Ystd) in the created standard deviation plane is greater than or equal to a threshold value (step S4). Further, the region extraction unit 116 determines whether or not the number of image elements included in the extracted region is within the predetermined range (step S5). Here, when the region extraction unit 116 determines that the number of image elements included in the extracted region is not within the predetermined range (step S5: NO) the procedure is terminated. Meanwhile, when the region extraction unit 116 determines that the number of image elements included in the extracted region is within the predetermined range, the procedure proceeds to step S6.

Furthermore, the range extraction unit 116 determines whether or not the difference between the brilliance of the interior of the extracted region extracted in step S4 and a brilliance of a vicinity of the extracted region is greater than or equal to a predetermined range, and, whether or not a difference between a color phase value of the interior of the region and a color phase value of a vicinity of the region is not greater than equal to the predetermined threshold value (step S6). When the region extraction unit 116 determines whether or not the difference between the brilliance of the interior of the range and the brilliance of the vicinity of the range is not greater than or equal to a predetermined threshold value, or whether or not the difference between the color phase value of the interior of the region and the color phase of a surrounding region of the region is greater than or equal to a predetermined threshold value (step S6:NO), the procedure is terminated. Meanwhile, when the region extraction unit 116 determines that the difference between the brilliance of the interior of the region extracted in step S4 and the brilliance of the surrounding region of the region is greater than or equal to a predetermined threshold value, and, that the difference between the color phase value of the interior of the region and the color phase value of the surrounding region of the region is not greater than or equal to a predetermined threshold value, the procedure proceeds to step S7.

Further, the region extraction unit 116 refers to the brilliance plane created in step S3, and determines whether or not the brilliance information of the surrounding region of the extracted region extracted in step S4 is greater than or equal to a predetermined threshold value (step S7). When the region extraction unit 116 determines that the brilliance information of the surrounding region of the extracted region extracted in step S4 is not greater than or equal to the predetermined threshold value (step S7: NO), the procedure is terminated. Meanwhile, when the region extraction unit 116 determines that the brightness of the surrounding region of the extracted region is greater than or equal to the predetermined threshold value (step S7: YES), the procedure proceeds to step S8.

Next, the region extraction unit 116 determines whether or not the standard deviation of the surrounding region of the extracted region is within the threshold (step S8). When the region extraction unit 116 determines that the standard deviation of the surrounding region of the extracted region is not within the threshold (step S8: NO), the procedure is terminated. Meanwhile, when the region extraction unit 116 determines that the standard deviation of the surrounding region of the extracted region is within the threshold (step S8: YES), the procedure proceeds to step S9. In addition, the region extraction unit 116 determines whether or not the ratio of the brilliance in the surrounding region is within the threshold (step S9). When the region extraction unit 116 determines that the ratio of the brilliance in the surrounding region is not within the threshold (step S9: NO), the procedure is terminated. On the other hand, when the region extraction unit 116 determines that the ratio of the brilliance in the surrounding region is within the threshold (step S9: YES), the procedure proceeds to step S10. The region extraction unit 116 determines that a litter shadow is shown in the extracted region, computes the value of the coordinates of the extracted region, and outputs the result (step S10).

Among the image data displayed on the display unit 119, the region extraction unit 116 displays a rectangular frame on an extracted region which was determined to be the litter shadow. Here, when the region extraction unit 116 extracts a plurality of regions as regions of the litter shadow, a plurality of frames are displayed. Therefore, the user is able to see and recognize the amount of litter shadow that was detected. Thus, it is possible to adjust the timing of cleaning the optical component according to the amount of litter that was detected. In addition, when the input unit 110 receives an input of information indicating that an extracted region has been selected by the user, the contrast adjusting unit 118 emphasizes the contrast of the selected extracted region so that it becomes easier to display on the display unit 119. Therefore, even if the extracted litter shadow is pale, the user can see and recognize the litter shadow more easily. In addition, when an operational information from the user indicating a request for performing a litter correction is imputed to the input unit 110, the litter correction unit 117 performs a litter correction procedure with respect to the selected extracted region.

Figure 5:
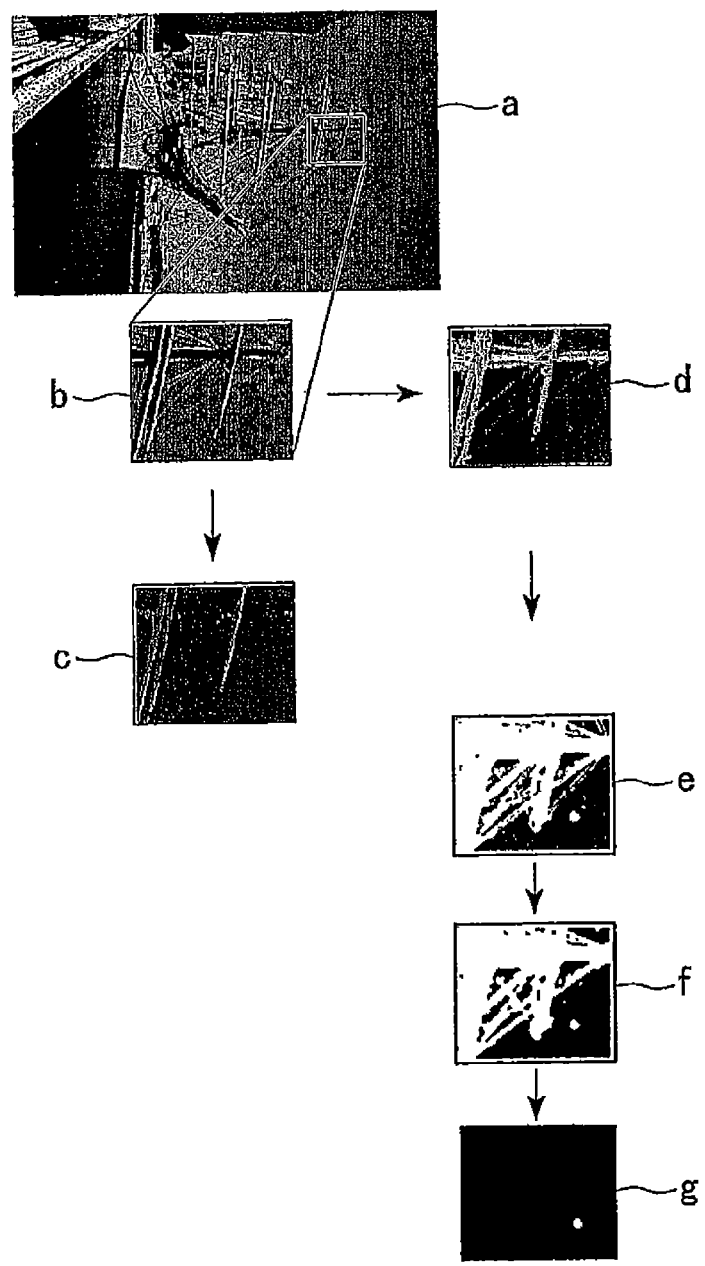
FIG. 5 is a diagram showing an example of an image data from which a litter shadow is detected by an imaging device according to the above embodiment.

FIG. 5 is a diagram showing an example of an image data from which a litter shadow region according to the above embodiment is extracted. Here, the image associated with the reference letter "a" is the image data to be corrected. A region of the litter shadow is extracted from the region associated with the reference letter "b" of the image data. Reference letter "c" shows an example in which a brilliance has been computed by the brightness computation unit 113 with respect to the region associated with the reference letter "b." Reference letter "d" shows an example in which a color phase value has been computed by the color phase value computation unit 114 with respect to the region associated with the reference letter "b." Reference letter "e" shows an example in which the standard deviation has been computed by the standard deviation computation unit 115. Reference letter "f" shows a binary format image based on the standard deviation computed by the standard deviation computation unit 115. According to such information, a condition determination process is executed by the region extraction unit 116, and a litter shadow associated with reference letter "g" is extracted.

Figure 6:
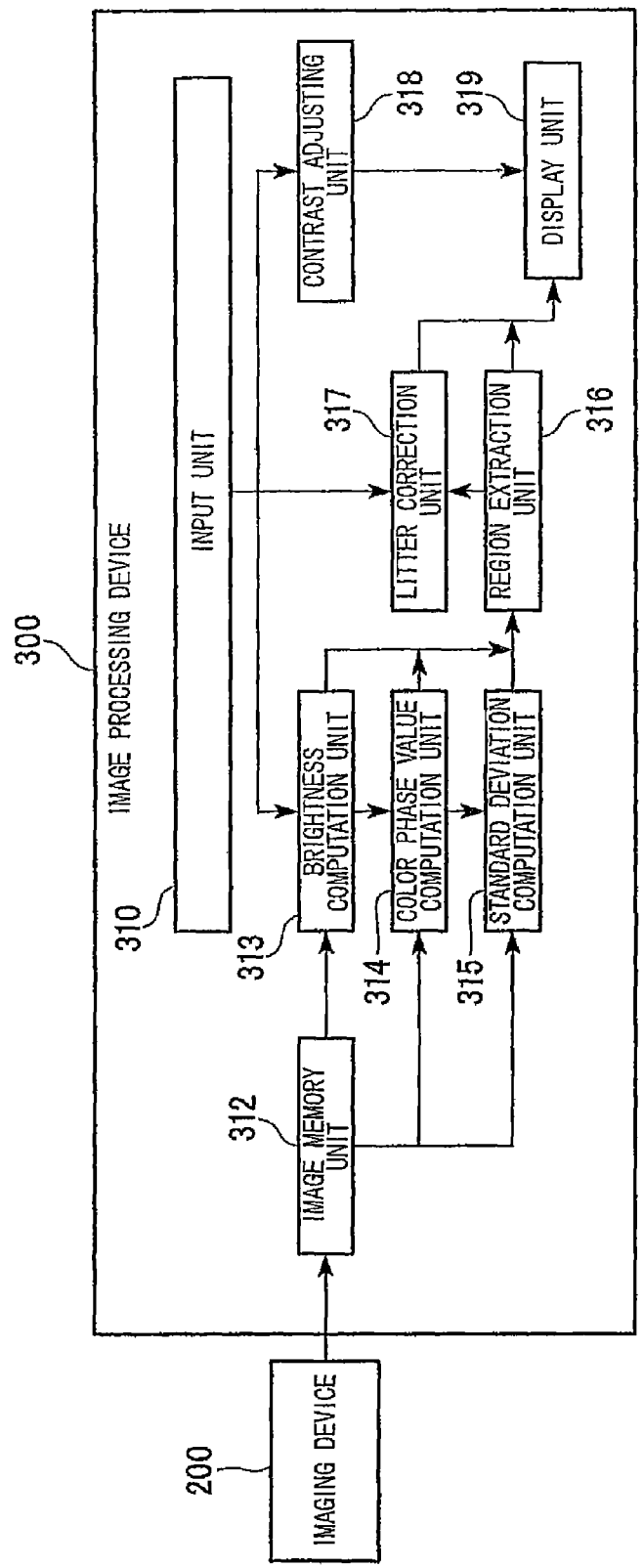
FIG. 6 is a diagram showing an example of a configuration of an image processing device according to the above embodiment.

Here, an example has been described in which the litter shadow is extracted and corrected by the imaging device 100. However, a configuration is possible in which the extraction and correction of the litter shadow is performed by a computer device different from the imaging device 100. FIG. 6 is a block diagram showing an imaging device 200 and an image processing device 300 according to such a configuration. The imaging device 200 is a digital camera which captures an image of the photographic subject and generates an image data. The image processing device 300 is a computer device which performs an extraction procedure and a correction procedure of a litter shadow with respect to the image data generated by the imaging device 200. The image processing device 300 comprises an input unit 310, an image memory unit 312, a brightness computation unit 313, a color phase value computation unit 314, a standard deviation computation unit 315, a region extraction unit 316, a litter correction unit 317, a contrast adjusting unit 318, and a display unit 319.

Each component of the image processing device 300 named the same as the component included in the imaging device 100 is configured similarly as well. However, the input unit 310 is a device such as a keyboard and a mouse. An image data taken and generated by the imaging device 200 is stored in the image memory unit 312. The display unit 319 is a screen such as a liquid crystal display.

Incidentally, the extraction procedure of the litter shadow according to the above embodiment may be performed by first compressing an image data (for example, to ¼), then extracting the litter shadow from the compressed image data. Meanwhile, the image data may be divided into regions (for example into an 8 by 16 region), and the litter shadow may be extracted from each of the divided regions. As a result, the image data with respect to which the procedure is performed becomes smaller in data capacity. Therefore, the procedure can be performed with a further reduced load.

According to the above embodiment, as described above, the litter shadow created by the litter attached along the imaging optical path inside the imaging device 100 affects the brilliance of the image. Meanwhile, the litter shadow does not bring about a change in the color phase. By using this characteristic, the litter shadow shown in the image can be efficiently and accurately removed.

Incidentally, the image memory unit 112 (image memory unit 312) is configured by a hard disc device, an optical magnetic disc device, a non-volatile memory such as a flash memory and the like, a recording medium such as a CD-ROM which can be read only, a volatile memory such as an RAM (Random Access Memory), or a combination of these.

Moreover, the brightness computation unit 113 (the brightness computation unit 313), the color phase value computation unit 114 (the color phase value computation unit 314), the standard deviation computation unit 115 (the standard deviation computation unit 315), the region extraction unit 116 (the region extraction unit 316), the litter correction unit 117 (the litter correction unit 317), and the contrast adjusting unit 118 (the contrast adjusting unit 318) may be executed by a specialized hardware, or may be configured by a memory and a CPU (i.e., a central computation device) so that a program for executing the operation of each unit is loaded in the memory and executed, thereby performing the operation of each unit.

In addition, a program for executing the operation of each unit may be stored in a recording medium which can be read by a computer. Next, the program stored in the recording medium may be read into a computer system and executed. Consequently, the operation of each unit may be performed. Incidentally, a "computer system" described above includes hardware such as an OS and peripheral devices.

In addition, if the "computer system" utilizes a www-system, the "computer system" also includes an environment for providing a web page (or an environment for displaying the web page).

In addition, a "recording medium which can be read by a computer" refers to a portable medium like a flexible disc, an optical magnetic disc, an ROM, and a CD-ROM, or a recording device such as a hard disc embedded in a computer system. Further, a "recording medium which can be read by a computer" includes, for example, a communication wire used to transmit a program via a network such as the Internet or a telecommunication network such as a telephone line, which dynamically retains a program for a short period of time. The "recording medium which can be read by a computer" also includes, for example, a volatile memory inside a computer system which retains a program for a certain period of time and becomes a server or a client. Further, the program may be configured to execute a part of the operation described above. The program may also be configured to execute the operation based on a combination with a program already recorded in the computer system.

Hereunder, a second embodiment of the present invention is described in detail with reference to FIGS. 7-10.

Figure 7:
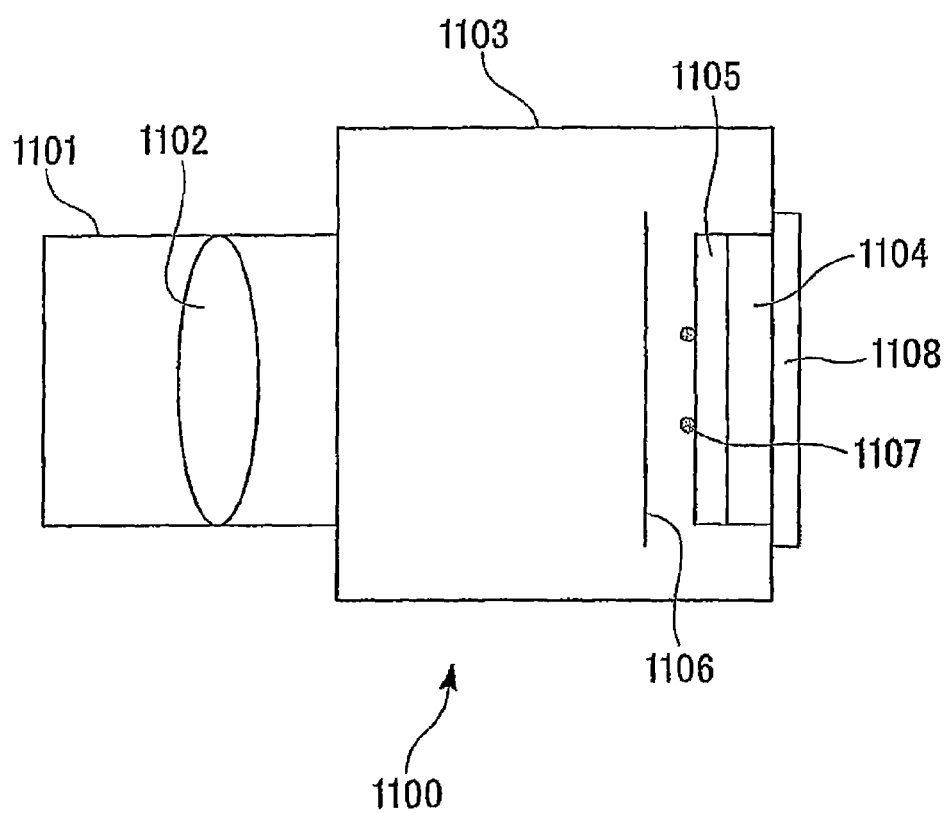
FIG. 7 is a diagram showing an example of a configuration of an imaging device according to a second embodiment of the present invention.

FIG. 7 is a diagram showing a configuration of an imaging device 1100 according to the above embodiment. The imaging device 1100 is a digital camera of a lens-exchanging type. The imaging device 1100 comprises an optical system 1101 including a lens 1102 which is a cluster of a plurality of optical lens. A camera body 1103 is equipped with the optical system 1101. The camera body 1103 comprises optical components such as a shutter 1106 and an optical filter 1105, as well as an imaging element 1104. Examples of the imaging element 1104 include a CCD (Charge Coupled Device) and a CMOS (Complimentary Metal Oxide Semiconductor). An image, formed on its image forming surface after being exposed via the optical system 1101, is converted into an electric signal. Then, an image signal, which is the electric signal after undergoing the conversion, is outputted. The outputted image signal is converted to an image data. In this way, the outputted image signal is displayed on the monitor 1108 equipped on the camera body 1103. An example of the monitor 1108 includes a liquid crystal display such as an LCD (Liquid Crystal Display).

Here, the optical system 1101 may be attached to the camera body 1103, and can also be removed from the camera body 1103. FIG. 7 indicates a litter 1107 attached to the optical filter 1105. Such litter 1107 obstructs light entering through the optical system 1101. As a result, the litter 1107 creates a shadow on an image formed on the imaging element 1104. Therefore, a litter shadow is shown in the image data created by the imaging device 1100. According to the imaging device 1100 based on the above embodiment, a correction is made to detect and delete such litter shadow shown in the image data.

Figure 8:
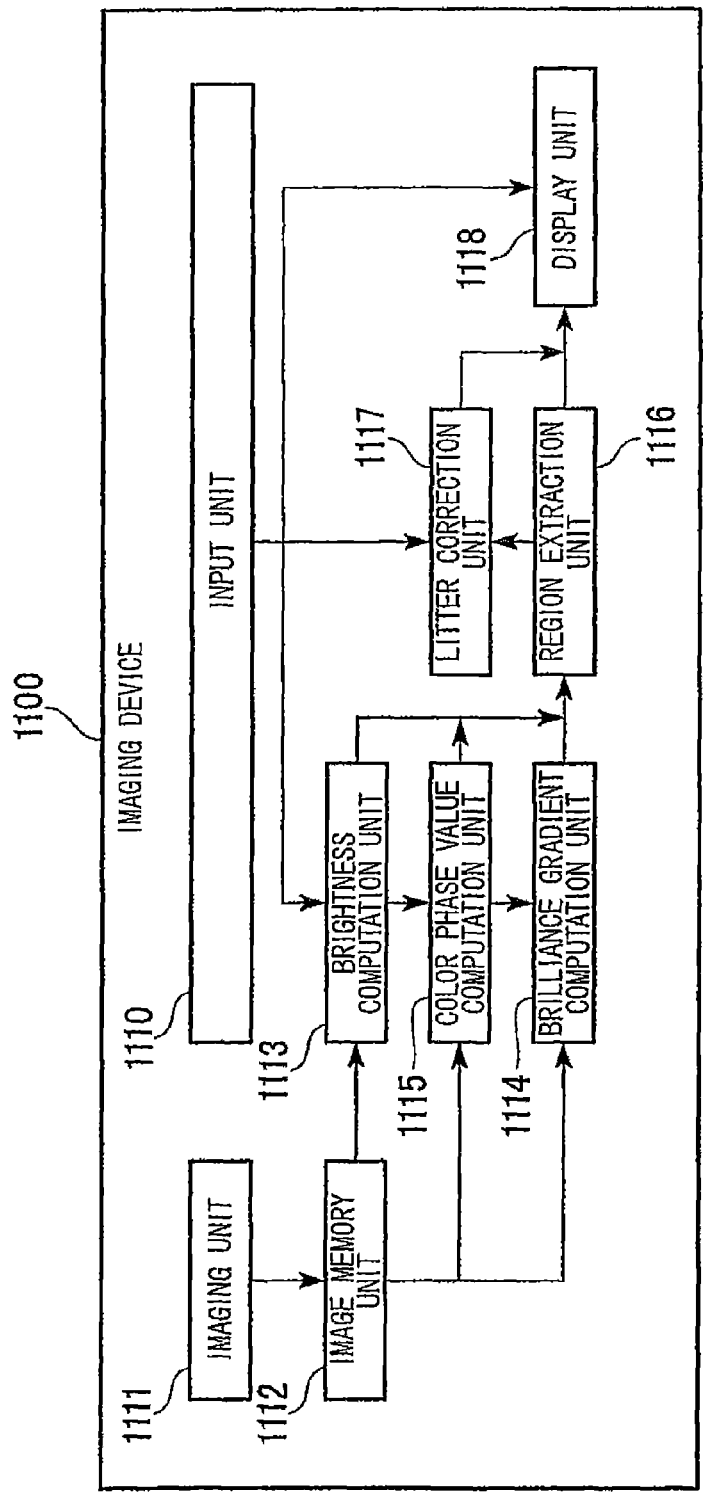
FIG. 8 is a block diagram showing an example of a configuration of an imaging device according to the above embodiment.

FIG. 8 is a block diagram showing a configuration of an imaging device 1100 according to the above embodiment. The imaging device 1100 comprises a microcomputer and CPU (Central Processing Unit) which controls the operation of each component based on a program stored in advance in its memory area. The imaging device 1100 comprises an input unit 1110, an imaging unit 1111, an image memory unit 1112, a brightness computation unit 1113, a brilliance gradient computation unit 1114, a color phase value computation unit 1115, a region extraction unit 1116, a litter correction unit 1117, and a display unit 1118.

The input unit 1110 receives an input of an operational information from a user. The input unit 1110 is, for example, a button configured so that a predetermined information is entered by the button being pressed. Alternatively, the input unit 1110 may be configured to be a touch panel which includes a screen such as the display unit 1118.

The imaging unit 1111 forms an image by driving the optical system 101 based on a predetermined control procedure, and by generating an image data based on an image signal outputted by the imaging element 1104. Here, the image data generated by the imaging unit 1111 is information such that the color of each pixel is expressed by the RGB colorimetric system, and then a gamma correction is applied. A gamma correction is a procedure to correct an error between a color information of an image data and a color generated based on a relationship with a gamma value according to an output device outputting the image data such as a screen or a printer. Here, when an image data is generated based on an image signal outputted by an imaging element 1104, a dark portion n the image may appear to be smudged when the image is outputted, due to the error described above. By correcting such an error with a gamma correction, it is possible to display an image with a color close to an image signal outputted by the imaging element 1104.

The image memory unit 1112 stores the image data created by the imaging unit 1111.

The brightness computation unit 1113 computes a degree of brightness within an image. Here, the brightness computation unit 1113 computes a brilliance (Y) for each image element based on an RGB value of an image element included in the image data. The brilliance (Y) is a value representing a degree of brightness. Here, the brightness computation unit 1113 computes the brilliance based on an RGB value according to Equation (4) below:

Equation (4)

$$Y=(0.299 \times R+0.589 \times G+0.114 \times B)/255 \quad (4)$$

According to Equation (4) above, the brightness computation unit 1113 computes a brilliance information for each image element included in the image data stored in the image memory unit 1112. Thus, the brightness computation unit 113 creates a brilliance plane corresponding to the image data. According to the example presented here, the brightness computation unit 113 computes a brilliance as information indicating a degree of brightness of an image element. However, an application is also possible in which a luminosity, for instance, is computed.

The brilliance gradient computation unit 1114 performs an inverse gamma correction of the image information, and computes a brilliance gradient based on the image information which has undergone an inverse gamma correction. As described above, the image data stored in the image memory unit 1112 created by the imaging unit 1111 is information after a gamma correction has been applied. Such gamma correction is performed for an output operation. Therefore, a value processed with a gamma correction becomes an error for another operation. Hence, the brilliance gradient computation unit 1114 performs an inverse gamma correction computing a brilliance of an image data before a gamma correction process. The brilliance gradient computation unit 1114 computes a brilliance Y', processed with an inverse gamma correction, based on Equation (5) below. Here, γ represents a gamma value which is a correction coefficient of a gamma correction performed by the imaging unit 1111.

Equation (5)

$$Y'(Y)^\gamma \quad (5)$$

In addition, the brilliance gradient computation unit 1114 applies a differentiation filter with respect to a brilliance plane of Y' computed by Equation (5) based on each image element included in the image data. In this way, the brilliance gradient computation unit 1114 computes a differential ($\Delta_x f(i, j)$) between adjacent image elements in a lateral direction (for instance, toward the right) for each image element (f(i, j)). The brilliance gradient computation unit 1114 also computes a differential ($\Delta_y f(i, j)$) between adjacent image elements in a longitudinal direction (downward, for example). Based on the computed differentials, the brilliance gradient computation unit 1114 computes a brilliance gradient (Ygrad) based on Equation (6) below. The brilliance gradient (Ygrad) is a value indicating a gradient of a brilliance Y' of a brilliance plane.

Equation (6)

$$Y\text{grad}=\sqrt{(\Delta_x f(i,j))^2+(\Delta_y f(i,j))^2} \quad (6)$$

Here, the brilliance gradient computation unit 1114 generates a brilliance gradient plane by computing a brilliance gradient for each image element of the brilliance plane. A brilliance gradient of a brilliance gradient plane shows a relatively high value at a portion having a large amount of change in brilliance due to the existence of a photographic subject or a litter shadow. Meanwhile, a brilliance gradient of a brilliance gradient plane shows a relatively low value at a uniform plane such as a vacancy.

The color phase value computation unit 1115 computes a first color phase value indicating a color phase of a region inside a candidate region which is set based on a brilliance gradient computed by the brilliance gradient computation unit 1114. The color phase value computation unit 1115 also computes a second color phase value indicating a color phase of a region in a vicinity of the candidate region. Here, a vicinity of a region indicates, for example, image elements within five pixels of the image element of the region. In this case, a candidate region extracted by the region extraction unit 1116, described below, based on a brilliance gradient computed by the brilliance gradient computation unit 1113 will be processed. The color phase value computation unit 1115 computes a color phase value (Hue) based on an RGB value of an image element included in the image data. Here, the color phase value computation unit 1115 computes a color phase value by converting an RGB value of an image element included in the image data into an HSV color system. The HSV color system is a model for representing a color by H (Hue: color phase), S (Saturation: chromaticness), and V (Value: luminosity). The color phase value computation unit 1115 computes a color phase value (H) based on Equation (7) below.

Equation (7)

$$\begin{aligned}V\max &= \max\{R, G, B\} \\ V\min &= \min\{R, G, B\} \\ V &= V\max \\ S &= (V\max - V\min)/V\max \\ H &= \begin{cases} (\pi/3)(b-g) & R = V\max \\ (\pi/3)(2+r-b) & G = V\max \\ (\pi/3)(4+g-r) & B = V\max \end{cases} \\ \text{Here,} & \\ r &= (V\max - R)/(V\max - V\min) \\ g &= (V\max - G)/(V\max - V\min) \\ b &= (V\max - B)/(V\max - V\min)\end{aligned} \quad (7)$$

Here, when the inequality H<0 holds, $2\pi$ is added to H. When the equation Vmax=0 holds, then S=0 and H=(indefinite).

The region extraction unit 1116 extracts, from the image data to be processed, a region in which a litter shadow is shown. Here, a plurality of predetermined conditions set for extracting a region of the litter shadow is already stored in the memory region of the region extraction unit 1116. Based on the predetermined conditions, the region extraction unit 1116 narrows down the region having a high possibility that the litter shadow is shown. Thus, the region extraction unit 1116 determines that a region satisfying all of the conditions is the region in which a litter shadow is shown.

First, the region extraction unit 1116 determines a candidate region based on a brilliance gradient computed by the brilliance gradient computation unit 1114. Here, the region extraction unit 1116 extracts a candidate region under the condition that a brilliance gradient of the brilliance gradient plane created by the brilliance gradient computation unit 1114 is greater than or equal to a threshold value. For example, the region extraction unit 1116 stores in advance, a threshold value of a brilliance gradient determining whether a portion is at an edge. Thus, the region extraction unit 1116 compares the threshold value with the value of the brilliance gradient for each image element in the brilliance gradient plane. When the region extraction unit 1116 determines that the brilliance gradient is greater then or equal to the threshold value, the value "1" is set. Meanwhile, when the region extraction unit 1116 determines that the brilliance gradient is less than the threshold value, the value "0" is set. In this way, the region extraction unit 1116 forms a binary format image. The region extraction unit 1116 extracts, from the generated binary format image, a region in which the value of the image element is "1" as a candidate region. The region extraction unit 1116 performs a condition determination process, described below, based on a condition for determining whether or not the extracted candidate region is a litter shadow. Here, when a plurality of region of image element clusters, which are not positioned to be adjacent to one another, are extracted as a candidate region, the region extraction unit 1116 performs the following condition determination process for each candidate region that is extracted.

First, as a condition determination process, the region extraction unit 1116 determines whether or not the size of the candidate region is greater than or equal to a predetermined threshold. Here, a lower limit value and an upper limit value of the number of image elements set to be a litter shadow is already stored in the region extraction unit 1116. When, as a result of comparing the number of image elements included in the candidate region and the lower limit value of the range of the number of image elements set to be the litter shadow, the number of image elements included in the candidate region is less than the lower limit value, the region extraction unit 1116 determines that the candidate region is not a litter shadow. This is because, when the size of the candidate region is too small, there is a possibility that the brilliance gradient of the candidate region is determined to be greater than or equal to a threshold value due to noise. Meanwhile, when, as a result of comparing the number of image elements included in the candidate region and the upper limit value of the range of the number of image elements set to be the litter shadow, the number of image elements included in the candidate region is greater than or equal to the upper limit value, the region extraction unit 1116 determines that the region is not a litter shadow. This is because, when the size of the candidate region is too large, there is a possibility that the brilliance gradient of the candidate region was determined to be greater than or equal to the threshold value because a photographic subject is present.

Incidentally, when a litter shadow is formed by a litter attached along an imaging optical path of the imaging device 1100, the litter shadow affects the brilliance of the image element. Meanwhile, the litter shadow does not affect the color phase. Using this characteristic, the region extraction unit 1116 determines whether or not the candidate region is a litter shadow. In other words, based on a condition that a difference between a brilliance of an image element included in the candidate region computed by the brightness computation unit 1113 and a brilliance of an image element of a vicinity of the candidate region is greater than or equal to a predetermined threshold value, and, that a difference between a color phase value computed by the color phase computation unit 1115 for an image element included in the candidate region and a color phase value computed for an image element in a vicinity of the candidate region is less than or equal to a predetermined threshold value, the region extraction unit 1116 determines whether or not the candidate region satisfies the condition. When the extracted candidate region satisfies this condition, the region extraction unit 1116 determines that the candidate region is a litter shadow. Meanwhile, when the extracted candidate region does not satisfy the condition, the region extraction region 1116 determines that the candidate region is not a litter shadow. It is also possible to add a condition such that a brilliance of an image element of the candidate region is smaller than a brilliance of an image element of a vicinity of the candidate region. When a plurality of image elements are to be processed regarding an image element of the candidate region or the vicinity of the candidate region, it is possible to make a comparison based on an average value of the image elements included in each candidate region.

Further, the region extraction unit 1116 executes a determination process under an additional condition that the brightness value of a region in a vicinity of the candidate region is greater than or equal to a predetermined threshold value. In this way, the region extraction unit 1116 compares the brilliance of the region in the vicinity of the candidate region and the predetermined threshold value of the brilliance. When the brilliance is greater than or equal to the threshold value, the region extraction unit 1116 determines that the candidate region is a litter shadow. When the brilliance is not greater than or equal to the threshold value, the region extraction unit 1116 determines that the region is not a litter shadow.

Further, the region extraction unit 1116 executes a determination process under an additional condition that a variation of a brightness of a region in a vicinity of the candidate region is less than or equal to a predetermined threshold value. The region extraction unit 1116 refers to the brilliance gradient plane created by the brilliance gradient computation unit 1114. When the brilliance gradient is less than or equal to the threshold value, the region extraction unit 1116 determines that the candidate region is a litter shadow. When the brilliance gradient is not less than or equal to the threshold value, the region extraction unit 1116 determines that the candidate region is not a litter shadow.

Further, the region extraction unit 1116 executes a determination process under an additional condition that a ratio of a brightness value of the extracted candidate region and a brightness value of a region in a vicinity of the extracted candidate region is less than or equal to a predetermined threshold value. For instance, the region extraction unit 1116 refers to a brilliance plane created by the brightness computation unit 1113, and computes a ratio of a brilliance of the extracted candidate region and a brilliance of a region in a vicinity of the extracted candidate region. When the computed ratio is less than or equal to the threshold value, the region extraction unit 1116 determines that the candidate region is a litter shadow. On the other hand, when the computed ratio is not less than or equal to the threshold value, the region extraction unit 1116 determines that the region is not a litter shadow.

In addition, when the region extraction unit 1116 performs the above condition determination process and determines that the candidate region is a litter shadow, the region extraction unit 1116 computes a coordinate of the center of the candidate region in the image data. In addition, the region extraction unit 1116 displays a rectangular frame of a predetermined size at the computed coordinate of the center in the image data displayed on the display unit 1118. By seeing the displayed frame, the user can be informed of the region determined to be a litter shadow.

The litter correction unit 1117 performs a litter correction process to delete a litter shadow shown in the region of the litter shadow extracted by the region extraction unit 1116. Here, as described above, the region in which the litter shadow is shown does not exhibit a change in the color phase compared to a region in a vicinity of the region in which the litter shadow is shown (hereinafter may be referred to as a "litter shadow region"). Meanwhile, the region in which the litter shadow is shown exhibits a change in brilliance. Thus, the litter correction unit 1117 deletes a litter shadow in the litter shadow region by, for example, enhancing a brilliance of an image element of the litter shadow region so that the brilliance becomes similar to a brilliance of an image element in a vicinity of the litter shadow region.

The display unit 1118 is a screen displaying the image data. The display unit 1118 corresponds to the monitor 1108 in FIG. 7.

Figure 9:
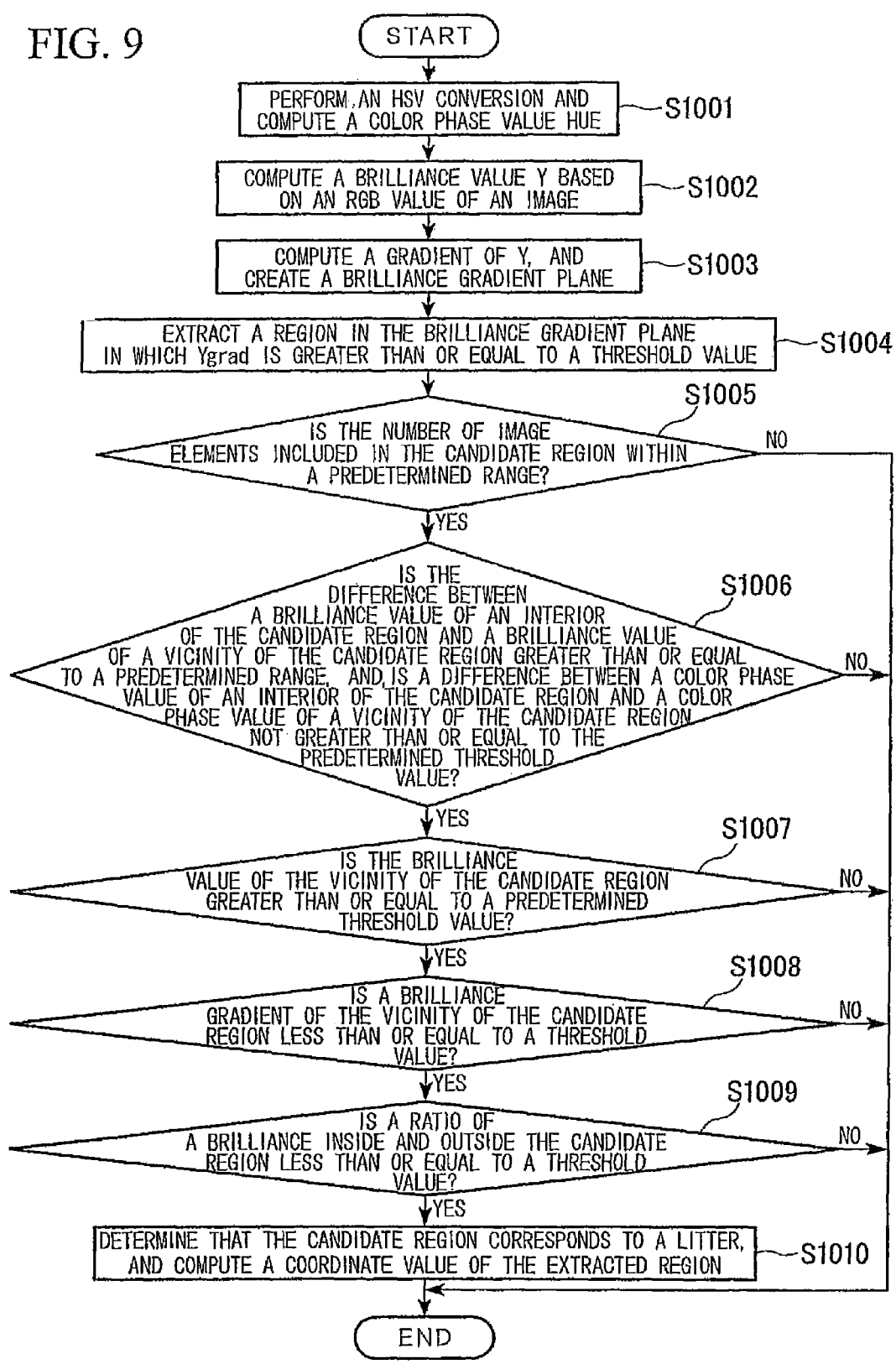
FIG. 9 is a flowchart showing an example of an operation of an imaging device according to the above embodiment.

Next, an example of an operation in which the imaging device 1100 extracts a region in which a litter shadow is shown will be described with reference to the flowchart in FIG. 9. Here, the imaging unit 1111 captures the image, and the image data is generated. The image data is stored in the image memory unit 1112. When the input unit 1110 receives a selection from the user regarding the image data from which the litter is detected, the selected image data is read and outputted by the image memory unit 1112, and is displayed on the display unit 1118. Here, for example, when the image playing mode is changed to a "litter detection result displaying mode" according to the operational information entered by the user, the imaging device 1100 begins a process of detecting a litter from the image data. First, the color phase value computation unit 1115 performs an HSV conversion of the image data, and computes the color phase value (Hue) (step S1001). The brightness computation unit 1113 computes the brilliance (Y) based on the RGB value of the image data, and creates a brilliance plane (step S1002). The brilliance gradient computation unit 1114 performs an inverse gamma correction on the image data, and creates a brilliance gradient plane based on the inverse-gamma-corrected brilliance (Y') (step S1003).

The region extraction unit 1116 extracts a region in which the brilliance gradient (Ygrad) in the created brilliance gradient plane is greater than or equal to a threshold value (step S1004). Further, the region extraction unit 1116 determines whether or not the number of image elements included in the extracted region is within the predetermined range (step S1005). Here, when the region extraction unit 1116 determines that the number of image elements included in the extracted region is not within the predetermined range (step S1005: NO) the procedure is terminated. Meanwhile, when the region extraction unit 1116 determines that the number of image elements included in the extracted region is within the predetermined range (step S1005: YES), the procedure proceeds to step S1006.

Furthermore, the range extraction unit 1116 determines whether or not the difference between the brilliance of the interior of the candidate region extracted in step S1004 and a brilliance of a vicinity of the candidate region is greater than or equal to a predetermined range, and, whether or not a difference between a color phase value of the interior of the candidate range and a color phase value of a vicinity of the candidate range is less than the predetermined threshold value (step S1006). When the region extraction unit 1116 determines whether or not the difference between the brilliance of the interior of the candidate range and the brilliance of the vicinity of the candidate range is less than a predetermined threshold value, or whether or not the difference between the color phase value of the interior of the candidate region and the color phase of a surrounding region of the candidate region is greater than or equal to a predetermined threshold value (step S1006: NO), the procedure is terminated. Meanwhile, when the region extraction unit 1116 determines that the difference between the brilliance of the interior of the candidate region extracted in step S1004 and the brilliance of the surrounding region of the candidate region is greater than or equal to a predetermined threshold value, and, that the difference between the color phase value of the interior of the candidate region and the color phase value of the surrounding region of the region is less than a predetermined threshold value, the procedure proceeds to step S1007.

Further, the region extraction unit 1116 determines whether or not the brilliance of the surrounding region of the candidate region extracted in step S4 is greater than or equal to a predetermined threshold value (step S1007). When the region extraction unit 1116 determines that the brilliance of the surrounding region of the candidate region is less than the predetermined threshold value (step S7: NO), the procedure is terminated. Meanwhile, when the region extraction unit 1116 determines that the brightness of the extracted surrounding region is greater than or equal to the predetermined threshold value (step S1007: YES), the procedure proceeds to step S1008.

Next, the region extraction unit 1116 determines whether or not the brilliance gradient of the surrounding region is less than or equal to the threshold value (step S1008). When the region extraction unit 1116 determines that the brilliance gradient of the surrounding region is not less than or equal to the threshold value (step S1008: NO), the procedure is terminated. Meanwhile, when the region extraction unit 1116 determines that the brilliance gradient of the surrounding region is less than or equal to the threshold (step S1008: YES), the procedure proceeds to step S1009. In addition, the region extraction unit 1116 determines whether or not the ratio of the brilliance in the candidate region and in the surrounding region is less than or equal to the threshold value (step S1009). When the region extraction unit 1116 determines that the ratio of the brilliance in the candidate region and in the surrounding region is not less than or equal to the threshold value (step S1009: NO), the procedure is terminated. On the other hand, when the region extraction unit 1116 determines that the ratio of the brilliance in the candidate region and in the surrounding region is less than or equal to the threshold value (step S1009: YES), the procedure proceeds to step S1010. The region extraction unit 1116 determines that a litter shadow is shown in the candidate region, computes the value of the coordinates of the litter shadow region, and outputs the result (step S1010).

Among the image data displayed on the display unit 1118, the region extraction unit 1116 displays a rectangular frame on an extracted region with a center at a coordinate of the computed litter shadow region. Here, when the region extraction unit 1116 extracts a plurality of regions as litter shadow regions, a plurality of frames are displayed. Therefore, the user is able to see and recognize the amount of litter shadow that was detected. Thus, it is possible to adjust the timing of cleaning the optical component according to the amount of litter that was detected. In addition, when an operational information from the user indicating a request for performing a litter correction is imputed to the input unit 1110, the litter correction unit 1117 performs a litter correction procedure with respect to the selected extracted region.

Here, the imaging device 1100 may, for example, magnify an image inside the rectangular frame displayed by the region extraction unit 1116 as a litter region, and display the image to the display unit 1118. As a result, even when the lifter shadow is small, the user is able to better see and recognize the litter shadow. In addition, the imaging device 1100 may, for example, enhance the contrast between the litter region and its surrounding region, according to an input of an operational information by the user, and display the resulting image on the display unit 1118. As a result, even though the litter shadow is pale and the difference between the brilliance of an image element of the litter shadow region and the brilliance of an image element of the surrounding area of the litter shadow region is small so that it is difficult for the human eye to recognize, the user is able to better see and recognize the litter shadow.

Incidentally, a plurality of conditions for the region extraction unit 1116 to determine the litter shadow region from the candidate region have been described. However, it is not necessary that a region satisfying all of the above conditions be extracted as a litter shadow. For example, according to the image from which the litter shadow is extracted, or according to the detection accuracy that is demanded, it is possible to set up an optional condition and perform the extraction process of the litter shadow.

In addition, when the region extraction unit 1116 extracts an edge portion as a candidate region based on a brilliance gradient computed by the brilliance gradient computation unit 1114, and when a litter shadow shaped like a circle is extracted, for example, only an edge portion of the litter shadow will be extracted as a candidate region, while an inner side of the edge portion will not be recognized as a candidate region. In this way, a candidate region shaped like a doughnut, with a hole formed in its center portion, may be extracted. Thus, the region extraction unit 1116 performs a process (i.e., closing) in which the candidate region is expanded based on the brilliance gradient is first expended, and is then contracted. In this way, the region extraction unit 1116 fills up the hole in the candidate region. Alternatively, the region extraction unit 1116 may perform a process (i.e., opening) in which the candidate region is contracted, and is then expanded. In this way, small continuing components due to noise will be removed.

Figure 10:
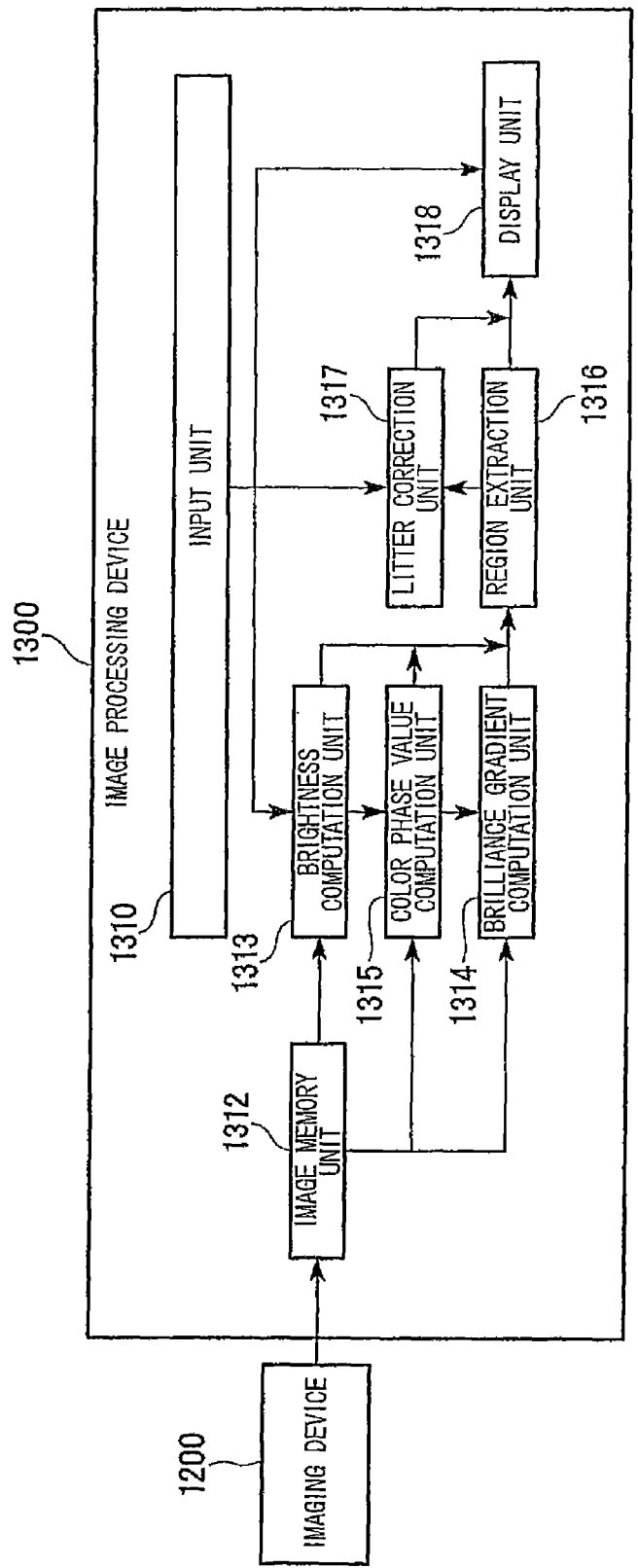
FIG. 10 is a diagram showing an example of a configuration of an image processing device according to the above embodiment.

Here, an example has been described in which the litter shadow is extracted and corrected by the imaging device 1100. However, a configuration is possible in which the extraction and correction of the litter shadow is performed by a computer device different from the imaging device 1100. FIG. 10 is a block diagram showing an imaging device 1200 and an image processing device 1300 according to such a configuration. The imaging device 1200 is a digital camera which captures an image of the photographic subject and generates an image data. The image processing device 1300 is a computer device which performs an extraction procedure and a correction procedure of a litter shadow with respect to the image data generated by the imaging device 1200. The image processing device 1300 comprises an input unit 1310, an image memory unit 1312, a brightness computation unit 1313, a color phase value computation unit 1314, a variation computation unit 1315, a region extraction unit 1316, a litter correction unit 1317, and a display unit 1318.

Each component of the image processing device 1300 named the same as the component included in the imaging device 1100 is configured similarly as well. However, the input unit 1310 is a device such as a keyboard and a mouse. An image data taken and generated by the imaging device 1200 is stored in the image memory unit 1312. The display unit 1318 is a screen such as a liquid crystal display.

Incidentally, the extraction procedure of the litter shadow according to the above embodiment may be performed by first compressing an image data (for example, to ¼), then extracting the litter shadow from the compressed image data. Meanwhile, the image data may be divided into regions (for example into an 8 by 16 region), and the litter shadow may be extracted from each of the divided regions. As a result, the image data with respect to which the procedure is performed becomes smaller in data capacity. Therefore, the procedure can be performed with a further reduced load.

According to the above embodiment, as described above, the litter shadow created by the litter attached along the imaging optical path inside the imaging device affects the brilliance of the image. Meanwhile, the litter shadow does not bring about a change in the color phase. By using this characteristic, the litter shadow shown in the image can be efficiently and accurately removed.

Incidentally, the image memory unit 1112 (image memory unit 1312) is configured by a hard disc device, an optical magnetic disc device, a non-volatile memory such as a flash memory and the like, a recording medium such as a CD-ROM which can be read only, a volatile memory such as an RAM (Random Access Memory), or a combination of these.

Moreover, the brightness computation unit 1113 (the brightness computation unit 1313), the brilliance gradient computation unit 1114 (the brilliance gradient computation unit 1314), the color phase value computation unit 1115 (the color phase value computation unit 1315), the region extraction unit 1116 (the region extraction unit 1316), and the litter correction unit 1117 (the litter correction unit 1317) may be executed by a specialized hardware, or may be configured by a memory and a CPU (i.e., a central computation device) so that a program for executing the operation of each unit is loaded in the memory and executed, thereby performing the operation of each unit.

In addition, a program for executing the operation of each unit may be stored in a recording medium which can be read by a computer. Next, the program stored in the recording medium may be read into a computer system and executed. Consequently, the operation of each unit may be performed. Incidentally, a "computer system" described above includes hardware such as an OS and peripheral devices.

In addition, if the "computer system" utilizes a www-system, the "computer system" also includes an environment for providing a web page (or an environment for displaying the web page). In addition, a "recording medium which can be read by a computer" refers to a portable medium like a flexible disc, an optical magnetic disc, an ROM, and a CD-ROM, or a recording device such as a hard disc embedded in a computer system. Further, a "recording medium which can be read by a computer" includes, for example, a communication wire used to transmit a program via a network such as the Internet or a telecommunication network such as a telephone line, which dynamically retains a program for a short period of time. The "recording medium which can be read by a computer" also includes, for example, a volatile memory inside a computer system which retains a program for a certain period of time and becomes a server or a client. Further, the program may be configured to execute a part of the operation described above.

The program may also be configured to execute the operation based on a combination with a program already recorded in the computer system.

Hereunder, a third embodiment of the present invention is described in detail with reference to FIGS. 11-16.

Figure 11:
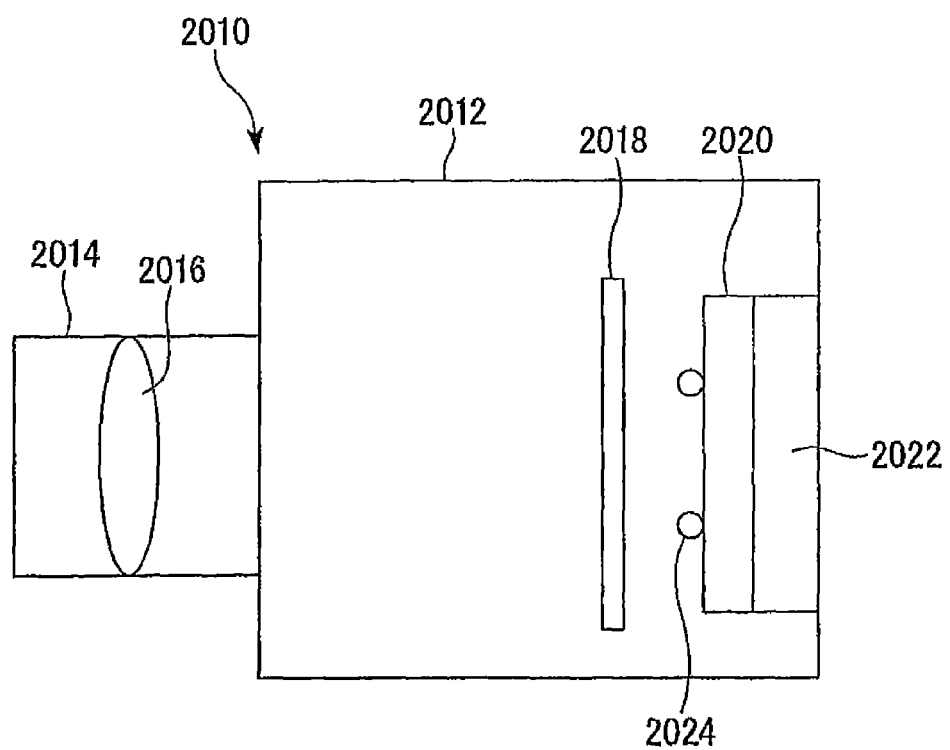
FIG. 11 is a skeletal cross-sectional diagram of a camera comprising an image processing device according to a third embodiment of the present invention.

FIG. 11 is a diagram showing a configuration of a camera 2010 comprising an image processing device according to the above embodiment. The camera 2010 comprises a lens tube part 2014 equipped with an optical system 2016 and the like. The camera 2010 also comprises a camera main body part 2012 equipped with an imaging element 2022 and the like. According to the present embodiment, a lens-exchange type camera is given as an example of an equipment comprising an image processing device. The lens-exchange type camera is such that the lens tube part 2014 can be freely attached to the camera main body part 2012 and can also be freely detached from the camera main body part 2012. However, it should be noted that an equipment comprising an image processing device according to the present embodiment is not limited to the lens-exchange type camera. For example, a camera such that the lens tube part 2014 is integrated with the camera main body part 2012, a video camera, a cellular phone, and a (personal computer) that can process an image data are also possibilities.

The camera main body part 2012, shown in FIG. 11, comprises a shutter 2018, an optical filter 2020, an imaging element 2022, and the like. The shutter 2018 adjusts the exposure time by blocking or letting through an imaging light from the optical system 2016 to the imaging element 2022. In addition, the optical filter 2020 comprises an optical low pass filter and the like, which prevents the occurrence of false colors (color moiré), for example.

The imaging element 2022 may obtain an image data by performing a photoelectric conversion on a light led by the optical system 2016. However, as shown in FIG. 11, when a foreign object 2024 such as litter and the like is attached to a component such as the optical filter 2020 through which the imaging light passes through and is present along an optical path of the imaging light, an image data obtained by the imaging element 2022 may include an image element influenced by the foreign object 2024 such as litter. An example of an image element influenced by the foreign object 2024 is an image element with a color (luminosity and the like) that is different from the original color in the imaging light due to the imaging light being blocked from passing through due to the foreign object 2024. A camera 2010 according to the present embodiment can, as described below, perform an imaging processing operation in which an image element influenced by the foreign object is detected. In addition, as described below, the camera 2010 can perform an image processing operation with respect to an image including an image element influenced by the foreign object 2024 by reducing the influence of the foreign object 2024 or eliminating the influence of the foreign object 2024.

Figure 12:
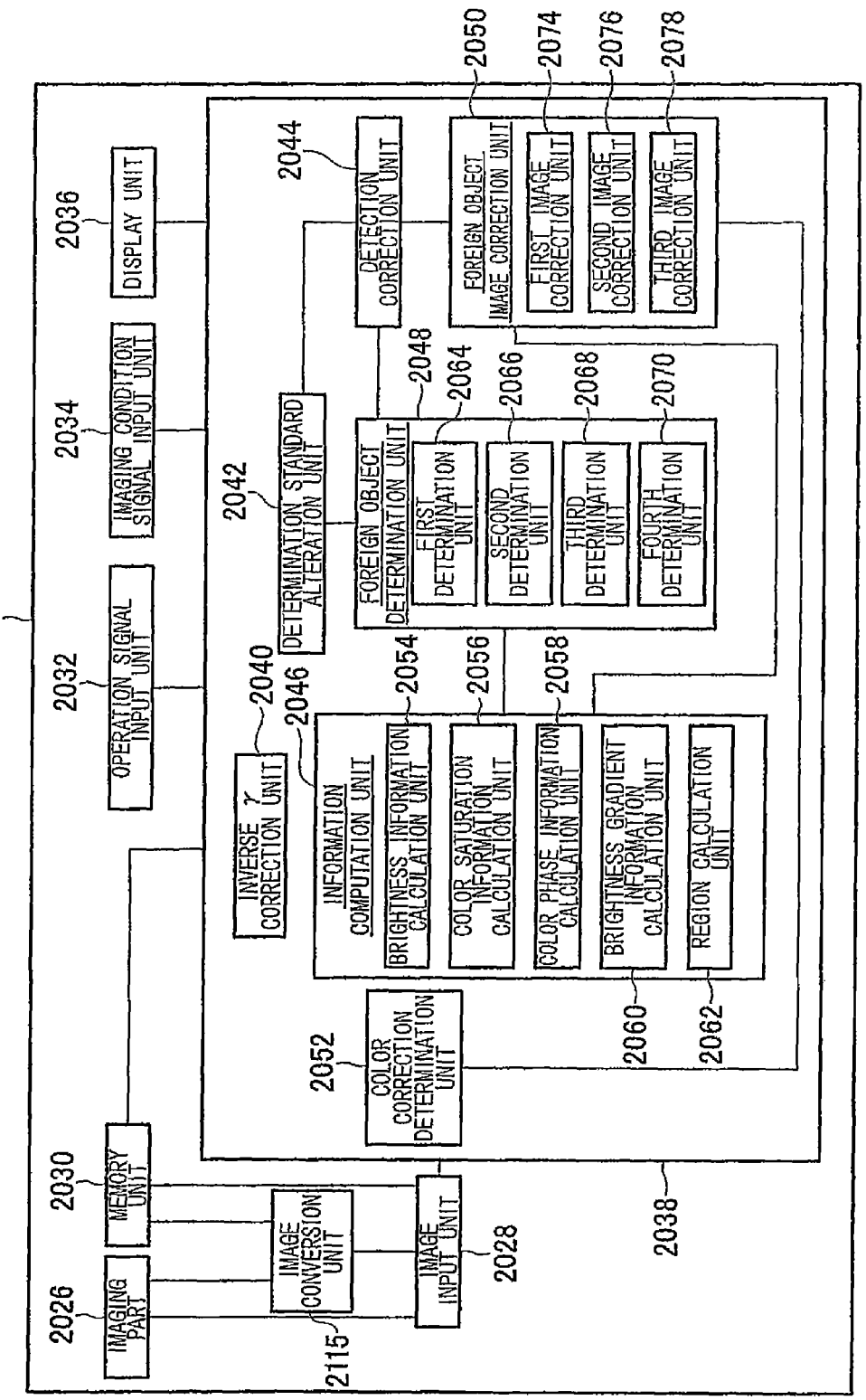
FIG. 12 is an overall block diagram of a camera shown in FIG. 11.

FIG. 12 is a skeletal block diagram indicating a configuration of an image processing device included in a camera 2010 shown in FIG. 11. The camera 2010 comprises an imaging part 2026, including an imaging element 2022 and the like shown in FIG. 11. The camera 2010 also comprises an image processing device which performs an image processing operation of an image taken by the imaging unit 2026 and the like. An image processing device included in the camera 2010 comprises, for example, an image conversion unit 2115, an image input unit 2028, a memory unit 2030, an operation signal input unit 2032, an imaging condition signal input unit 2034, a display unit 2036, a calculation unit 2038, and the like.

An image taken by the imaging unit 2026 is inputted into the image input unit 2028 in the form of an image data. An example of the image data is an RGB data. However, there is no particular limitation on the data format of the image. The image input unit 2028 outputs the inputted image to the calculation unit 2038. The calculation unit 2038 performs an image processing operation on the image inputted via the image input unit 2028. Incidentally, the image input unit 2028 may receive an input of, not only the image taken by the imaging unit 2026, but also an image taken by another imaging device. In addition, the image which undergoes an image processing operation performed by the calculation unit 2038 is not limited to an image taken by the imaging unit 2026, and may also include an image taken by another imaging device.

Furthermore, the image input unit 2028 receives an input of, not only an image obtained by undergoing a photoelectric conversion by the optical system 2016, but also an image that has already undergone an image processing operation by the image conversion unit 2115 by performing a γ correction and the like to the image. The image conversion unit 2115 performs, for example, an image processing operation such as a γ correction, a change in the format in which an image is saved, and a compression of a data, with respect to an image obtained by performing a photoelectric conversion of an image by the optical system 2016. As a result, when the image is displayed on a display device such as a liquid crystal display, the image conversion unit 2115 can correct the image so that the image is displayed more vividly, or is displayed with a more natural hue. In addition, as a result of the image conversion unit 2115 compressing the image, the camera can save a greater amount of images to a memory card and the like (not drawn in the diagram). An image processing performed by the image conversion unit 2115 with respect to an image includes a linear correction and a non-linear correction.

The calculation unit 2038 comprises an information calculation unit 2046, a foreign object determination unit 2048, and a foreign object image correction unit 2050. The information calculation unit 2046 may analyze an image and calculate data regarding a color of the image and the like. The foreign object determination unit 2048 may use data calculated by the information calculation unit 2046 and may determine whether or not a predetermined detection area is a portion corresponding to a foreign object such as a litter shown in the image. Furthermore, the foreign object image correction unit 2050 identifies a portion corresponding to a foreign object shown in the image based on a determination by the foreign object determination unit 2048, and may perform an image processing operation to the image reducing the influence of the foreign object. In addition, the foreign object image correction unit 2050 may use data calculated by the information calculation unit 2046, and may perform an image processing operation reducing the influence of the foreign object.

The information calculation unit 2046 comprises a brightness information calculation unit 2054, a color saturation information calculation unit 2056, a color phase information calculation unit 2058, a brightness gradient information calculation unit 2060, and a region calculation unit 2062. Each calculation component 2054, 2056, 2058, 2060, and 2062 included in the information calculation unit 2046 performs an arithmetic processing on the image, and outputs data for each calculation component 2054, 2056, 2058, 2060, and 2062.

The brightness information calculation unit 2054 calculates a brightness information corresponding to a brightness of an image. The brightness information calculated by the brightness information calculation unit 2054 may be a brilliance information of the image, a luminosity information of the image, or both the brilliance information and the luminosity information.

The brightness information calculation unit 2054 uses, for example, Equation (8) below, and calculates a brilliance value Y for each image element based on an RGB value for each image element of the image.

Equation (8)

$$Y=(0.299\times R+0.589\times G+0.114\times B)/255 \qquad (8)$$

In addition, the brightness information calculation unit 2054 creates a brilliance plane corresponding to the image, based on the brilliance value Y of the image element. Therefore, the brilliance information computed by the brightness information calculation unit 2054 includes the brilliance value Y of each image element, the position of each image element, and a brilliance plane comprising the brilliance value Y.

The brightness information calculation unit 2054 may calculate a brightness information instead of the brilliance information, or in addition to the brilliance information. The luminosity information may be obtained by performing an HSV conversion on the RGB data. The HSV conversion is a process in which an RGB data is converted to a color phase (Hue), a color saturation (Saturation), and a luminosity (Value). The luminosity V, the color phase H, and the color saturation S for each image element of the image may be obtained from the ROB value of each image element according to equations (9-1) to (9-10) below.

Equations (9-1)-(9-10)

$$V=V\mathrm{max} \qquad (9\text{-}1)$$

$$S=(V\mathrm{max}-V\mathrm{min})/V\mathrm{max} \qquad (9\text{-}2)$$

$$H=(\pi/3)(b-g)(\text{when } R=V\mathrm{max}) \qquad (9\text{-}3)$$

$$H=(\pi/3)(2+r-b)(\text{when } G=V\mathrm{max}) \qquad (9\text{-}4)$$

$$H=(\pi/3)(4+g-r)(\text{when } B=V\mathrm{max}) \qquad (9\text{-}5)$$

Here, $$V\mathrm{max}=\mathrm{max}\{R,G,B\} \qquad (9\text{-}6)$$

$$V\mathrm{min}=\mathrm{min}\{R,G,B\} \qquad (9\text{-}7)$$

$$r=(V\mathrm{max}-R)/(V\mathrm{max}-V\mathrm{min}) \qquad (9\text{-}8)$$

$$g=(V\mathrm{max}-G)/(V\mathrm{max}-V\mathrm{min}) \qquad (9\text{-}9)$$

$$b=(V\mathrm{max}-B)/(V\mathrm{max}-V\mathrm{min}) \qquad (9\text{-}10)$$

Incidentally, when a conversion is performed based on Equations (9-3) to (9-5) and H<0, then $2\pi$ is added to H. Further, when Vmax=0, then S=0, and H=(indefinite).

The brightness information calculation unit 2054 uses the above Equations (9-1) and (9-6), and computes a luminosity value V for each image element from the RGB value of each image element of the image. In addition, the brightness information calculation unit 2054 creates a brightness plane corresponding to the image plane, based on the luminosity value V of an image element. Therefore, the luminosity information computed by the brightness information calculation unit 2054 includes the luminosity value V of each image element, the position of each image element, and a luminosity plane created by the luminosity value V.

The color saturation information calculation unit 2056 calculates a color saturation information corresponding to a color saturation of an image. The color saturation information calculation unit 2056 uses, for example, Equations (9-2), (9-6), and (9-7) shown above, and calculates the color saturation S of each image element from the RGB value of each image element of the image. In addition, the color saturation information calculation unit 2056 creates a color saturation plane corresponding to the image plane, based on the color saturation S of the image element. Therefore, the color saturation information computed by the color saturation information calculation unit 2056 includes the color saturation S of each image element, the position of each image element, and a color saturation plane created based on the color saturation S.

The color phase information calculation unit 2058 calculates a color phase information corresponding to a color phase of the image. The color phase information calculation unit 2058 uses, for example, Equations (9-3) through (9-5) and Equations (9-6) through (9-10), and calculates the color phase H of each image element from the ROB value of each image element of the image. In addition, the color phase information calculation unit 2058 creates a color phase plane corresponding to the image plane, based on the color phase H of the image element. Therefor; the color phase information calculated by the color phase information calculation unit 2058 includes the color phase H of each image element, the position of each element, and a color phase plane created by the color phase H.

The brightness gradient information calculation unit 2060 calculates a brightness gradient information corresponding to a gradient of a brightness of the image from the brilliance plane or the luminosity plane computed by the brightness information calculation unit 2054. Examples of the brightness gradient information computed by the brightness gradient information calculation unit 2060 include a brilliance gradient information and a luminosity gradient information.

In this case, it is preferable that the brightness gradient information calculation unit 2060 compute a brightness gradient information based on a brilliance plane or a luminosity plane processed with an inverse $\gamma$ correction by the inverse $\gamma$ correction unit 2040. Since the image is often saved in a $\gamma$-corrected condition in accordance with a display device and the like, there is a high possibility that a $\gamma$ correction is performed for an image which is inputted to the calculation unit 2038 via the image input unit 2028. Therefor, as a result of the inverse $\gamma$ correction unit 2040 performing an inverse correction on the brilliance plane and the luminosity plane, these brightness information may be made closer to the original brightness information of the RAW data.

Referring to a brilliance plane and a luminosity plane before an inverse $\gamma$ correction as YP1 and VP1 respectively, and referring to a brilliance plane and a luminosity plane after an inverse $\gamma$ correction as YP2 and VP2 respectively, an inverse $\gamma$ correction performed by the inverse $\gamma$ correction unit 2040 is expressed as follows in Equations (10-1) and (10-2).

Equations (10-1), (10-2)

$$YP1=(YP1)^{\gamma} \qquad (10\text{-}1)$$

$$VP1=(VP1)^{\gamma} \qquad (10\text{-}2)$$

The brightness gradient information calculation unit 2060 computes a brightness gradient value Vgrad(i, j) for each position (image element) within the image based on, for example, the luminosity plane VP2. The brightness gradient information calculation unit 2060 applies a differential filter in the longitudinal direction and the lateral direction with respect to the luminosity plane VP2, computes a differential $\Delta yf(i, j)$ in the longitudinal direction and a differential $\Delta xf(i, j)$ in the lateral direction, and computes the luminosity gradient value Vgrad(i, j) for each position using the computed differentials. Referring to the luminosity value V of each image element included in the luminosity plane VP2 as V(i, j), the luminosity gradient value Vgrad(i, j) is computed according to the following Equations (11-1)-(11-3).

Equations (11-1)-(11-3)

$$\Delta_x f(i,j) = V(i,j) - V(i-1,j) \quad (11\text{-}1)$$

$$\Delta_y f(i,j) = V(i,j) - V(i,j-1) \quad (11\text{-}2)$$

$$V\text{grad}(i,j) = \sqrt{(\Delta_x f(i,j))^2 + (\Delta_y f(i,j))^2} \quad (11\text{-}3)$$

Here, "i" in Equations (11-1)-(11-3) represents a position of the image element in the lateral direction, while "j" represents a position of the image element in the longitudinal direction. The brightness gradient information calculation unit 2060 creates a luminosity gradient plane corresponding to the image plane based on the luminosity gradient value Vgrad(i, j) of each position. Therefore, the luminosity gradient information computed by the brightness gradient information calculation unit 2060 includes the luminosity gradient value Vgrad(i, j) and the luminosity gradient plane.

In addition, the brightness gradient information calculation unit 2060 may compute a brilliance gradient information instead of the luminosity gradient information or in addition to the luminosity gradient information based on the brilliance plane YP2. The brilliance gradient information includes the brilliance gradient value Ygrad(i, j) and the brilliance gradient plane. The brilliance gradient information is computed similar to the luminosity gradient information as described above.

The region calculation unit 2062 calculates a detection region in order to detect whether or not a foreign object is shown. The region calculation unit 2062 may compute the detection region by using, for example, a brightness gradient information computed by the brightness gradient information calculation unit 2060.

As long as the detection region is a part of the image, there is no particular limitation on the detection region. However, it is preferable that the detection region is set to a region in which there is a high possibility that a foreign object is shown. Here, according to the luminosity gradient plane computed by the brightness gradient information calculation unit 2060, a portion corresponding to an edge of the photographed subject or a portion in which a foreign object is shown tend to have a relatively large luminosity gradient value Vgrad (i, j). On the other hand, a portion corresponding to a vacant space or an inner part of the photographed subject tends to have a relatively small luminosity gradient value Vgrad (i, j).

Thus, the region calculation unit 2062 according to the present embodiment may compute a binary format image in which the luminosity gradient plane is expressed in a binary format, and set a continuous region, in which image elements with a high luminosity gradient value Vgrad (i, D is linked, as a detection region. In other words, the region calculation unit 2062 sets a predetermined threshold value with respect to the luminosity gradient plane, replaces the value of the image element having a luminosity gradient value greater than the threshold value to "1," replaces the value of the image element having a luminosity gradient value less than the threshold value to "0," and thus computes a binary format image.

Moreover, based on the computed binary format image, the region calculation unit 2062 extracts the image element with the value "1," and sets the image elements with the value "1" as the detection region. As long as image elements with the value "1" are positioned continuously, the region calculation unit 2060 specifies the cluster of image elements as one detection region. Meanwhile, when a cluster of image elements with the value "1" is linked with another cluster of image elements with the value "1" via an image element with the value "1," the region calculation unit 2062 specifies these two regions as separate detection regions.

As described above, the region calculation unit 2062 may compute a detection region from the luminosity gradient plane. At the same time, the region calculation unit 2062 may compute a detection region from the brilliance gradient plane computed by the brightness information calculation unit 2054. The region calculation unit 2062 may compute the detection region by computing a binary format image from the brilliance gradient plane in a manner similar to the luminosity gradient plane.

The foreign object detection unit 2048 uses each information computed by the information calculation unit 2046, and determines whether or not each detection region is a portion corresponding to a foreign object shown in the image. The foreign object detection unit 2048 includes a first determination unit 2064, a second determination unit 2066, a third determination unit 2068, and a fourth determination unit 2070. The first to fourth determination units 2064-2070 each uses a separate determination standard and determines whether or not a detection region being evaluated is a portion corresponding to a foreign object shown in the image.

The first determination unit 2064 determines whether or not a detection region is a portion corresponding to a foreign object shown in the image, based on the size of the detection region that is being evaluated. According to an image processing device based on the present embodiment, the detection region and the size of the detection region that is being evaluated by the foreign object determination unit 2048 is computed by the region calculation unit 2062 using the brightness gradient information computed by the brightness gradient information calculation unit 2060. Therefore, when the region calculation unit 2062 is computing the detection region based on the brilliance gradient plane, for example, the first determination unit 2064 performs the determination using information such as the brilliance gradient value of each image element and the like. Meanwhile, when the region calculation unit 2062 is computing the detection region from the luminosity gradient plane, the first determination unit 2064 performs the determination using information such as the luminosity gradient information of each image element and the like.

As long as the size of the detection region computed by the region calculation unit 2062 is within a predetermined range, the first determination unit 2064 may determine that the detection region is a portion corresponding to the foreign object shown in the image. In addition, when the size of the detection region computed by the region calculation unit 2062 is large enough to exceed a predetermined range or is smaller than a predetermined range, the first determination unit 2064 may determine that the detection region is not a portion corresponding to a foreign object shown in the image.

The range of the size of the detected region, with which the first determination unit 2064 uses to determine that a foreign object is shown in the detected region, is set according to the size of the image and the conditions in which the image was photographed. An example of the lower limit value is 25 pixels, and an example of the upper limit value is 300 pixels.

The second determination unit 2066 uses the color saturation information corresponding to the color saturation of the detection region and determines whether or not the detection region is a portion corresponding to a foreign object shown in the image. The second determination unit 2066 may use the color saturation value S computed by the color saturation information calculation unit 2056 and the color saturation plane to determine whether or not the detected region is a portion corresponding to a foreign object shown in the image. The second determination unit 2066 according to the present embodiment examines the difference between the first color saturation information corresponding to the color saturation of the detection region and the second color saturation information corresponding to the color saturation of a region in the vicinity of the detection region. When the difference between the first color saturation information and the second color saturation information is within a predetermined range, the second determination unit 2066, the second determination unit 2066 determines that the detection region which is being evaluated is a portion corresponding to the foreign object. Further, when the difference between the first color saturation information and the second color saturation information is not within a predetermined range, the second determination unit 2066 may determine that the detection region that is being evaluated is not a portion corresponding to the foreign object.

Here, the first color saturation information may be set as, for example, an average value of the color saturation value S of the image elements included in the detection region. In addition, the second color saturation information may be set as an average value of the color saturation value S of an image element of a region in the vicinity of the detection region. An example of a region in the vicinity of the detection region is a region surrounding the detection region while contacting the outer peripheral of the detection region. The size of the region in the vicinity of the detection region may be roughly the same as the detection region.

There is no particular limitation on the numerical range with which the second determination unit 2066 determines that the detection region that is being evaluated is a region in which the foreign object is shown. In addition, the numerical range, according to which it is determined that a foreign object is shown in a region, may be set based on the magnitude (absolute value) of the difference in the color saturation value S. Alternatively, the numerical range may be set based on a ratio of the first color saturation information and the second color saturation information.

For example, when the average value S1 of the color saturation value S of the image element included in the detection region is 0.95-2 times the average value S2 of the color saturation value S of the image element of the region in the vicinity of the detection region, the second determination unit 2066 determines that the detection region which is being evaluated is a region in which the foreign object is shown. This is because, when an object is shown in the image not as a litter but as a photographed subject, the object strongly influences the color saturation information, whereas a foreign object shown in the image hardly influences the color saturation. Therefore, when the litter is not shown in the detection region, the difference between the first color saturation information and the second color saturation information is large. On the other hand, when a litter is shown in the detection region, the difference between the first color saturation information and the second color saturation information is small.

The second determination unit 2066 may determine whether or not the detection region is a portion corresponding to a foreign object shown in the image using not only the color saturation information as described above, but also a brightness information corresponding to the brightness of the detection region. When a determination is made using the brightness information, the second determination unit 2066 may use the brightness value V computed by the brightness information calculation unit 2054 and the luminosity plane to determine whether or not the detection region is a portion corresponding to a foreign object shown in the image. In addition, the second determination unit 2066 may determine whether or not the detection region is a portion corresponding to a foreign object shown in the image by using a brilliance value Y computed by the brightness information calculation unit 2054 and the brilliance plane.

The second determination unit 2066 according to the present embodiment examines, for instance, the difference between a first luminosity information corresponding to the luminosity of the detection region and a second luminosity information corresponding to the luminosity of the region in the vicinity of the detection region. When the difference between the first luminosity information and the second luminosity information is not within a predetermined range, the second determination unit 2066 determines that the detection region which is being evaluated is a portion corresponding to the foreign object.

Here, the first luminosity information may be set, for example, as an average value of the luminosity value V of the image element included in the detection region. Further, the second luminosity information may be set as the average value of the luminosity value V of the image element in the region in the vicinity of the detection region. For example, when the average value V1 of the luminosity value V of the image element included in the detection region is less than 0.975 times the average value V2 of the luminosity value V of the image element of the region in the vicinity of the detection region, the second determination unit 2066 determines that a foreign object is shown in the detection region which is being evaluated. This is because, when a foreign object is shown, the color saturation and the color phase are hardly affected, whereas the brightness is strongly influenced by the presence of the foreign object.

Moreover, the second determination unit 2066 may determine whether or not the detected region is a portion corresponding to a foreign object shown in the image by using a color phase information corresponding to the color phase of the detection region in addition to using the determination made based on the color saturation information. When the color phase information is used to perform the determination, the second determination unit 2066 may use the color phase value H computed by the color phase information calculation unit 2058 and the color phase plane to determine whether or not the region is a portion corresponding to a foreign object shown in the image.

The second determination unit 2066 according to the present embodiment, for example, examines the difference between a first color phase information corresponding to the color phase of the detection region and a second color phase information corresponding to the color phase of the region in the vicinity of the detection region. When the difference between the first color phase information and the second color phase information is within a predetermined range, the second determination unit 2066 determines that the detection region which is being evaluated is a portion corresponding to the foreign object.

Here, a first color phase information may be set as an average value of the color phase value H of the image element included in the detection region. In addition, the second color phase information may be set as an average value of the color phase value H of the image element in the region in the vicinity of the detection region. For example, when the average value H1 of the color phase value H of the image element included in the detection region is 0.94-1.06 times the average value H2 of the color phase value H of the image element in the region in the vicinity of the detection region, the second determination unit 2066 determines that the detection region which is being evaluated is a region in which a foreign object is shown. This is because an object shown in the image not as a litter but as a photographed subject strongly influences the color phase information, whereas, a foreign object shown in the image hardly influences the color phase.

When the second luminosity information corresponding to the brightness of the region in the vicinity of the detection region is not within a predetermined range, the third determination unit 2068 determines that the detection region which is being evaluated is not a portion corresponding to the foreign object. In addition, when the second luminosity information corresponding to the luminosity of the region in the vicinity of the detection region is within a predetermined range, the third determination unit 2068 determines that the detection region which is being evaluated is a portion corresponding to the foreign object. Examples of the brightness information used by the third determination unit 2068 includes the second luminosity information, which is an average value of the luminosity value V of the image element of the region in the vicinity of the detection region, and the second brilliance information, which is an average value of the brilliance value Y of the image element of the region in the vicinity of the detection region.

For example, when the average value V2 of the luminosity value V of the image element included in the region in the vicinity of the detection region is less than or equal to 60, the third determination unit 2068 determines that the detection region is not a portion corresponding to the foreign object. This is because, when the brightness of the region in the vicinity of the detection region is less than a predetermined value, the influence to the image exerted by the foreign object shown in the object is considered to be small, even though a foreign object is shown in the detection region.

When the standard deviation of the brightness of the region in the vicinity of the detection region is not within a predetermined range, the fourth determination unit 2070 determines that the detection region which is being evaluated is not a portion corresponding to the foreign object. Meanwhile, when the standard deviation of the brightness of the region in the vicinity of the detection region is within a predetermined range, the fourth determination unit 2070 determines that the detection region which is evaluated is not a portion corresponding to the foreign object. Examples of the standard deviation of the brightness of the region in the vicinity of the detection region includes the standard deviation of the luminosity value V of the image element of the region in the vicinity of the detection region, and a standard deviation of the brilliance value Y of the image element of a region in the vicinity of the detection region.

For example, the fourth determination unit 2070 computes the standard deviation Vstd of the brightness of the region in the vicinity of the detection region based on the luminosity value V(i, j) of the image element included in the region in the vicinity of the detection region, as well as the average value V2 of the luminosity value V(i, j) of the image element included in the region in the vicinity of the detection region, by using Equation (12) below.

Equation (12)

$$Vstd = \sqrt{\frac{1}{n-1}\sum_{1}^{n}(V(i,j)-V2)^2} \quad (12)$$

Here, "n" in Equation (12) indicates the number of image elements included in the region in the vicinity of the detection region. The threshold value based on which the fourth determination unit 2070 determines whether or not a foreign object is shown in the detection region is set appropriately according to the condition in which the image is photographed. For example, when the standard deviation Vstd of the brightness of the region in the vicinity of the detection region is greater than or equal to 0.6, the fourth determination unit 2070 may determine that the detection region is not a portion corresponding to a foreign object shown in the image. This is because, when the standard deviation of the brightness of the region in the vicinity of the detection region is large, it is highly likely that a high luminosity gradient value or a brilliance gradient value in the detection region is obtained not due to the foreign object being shown, but due to the photographed subject light.

The fourth determination unit 2070 may compute the standard deviation of the brightness of the region in the vicinity of the detection region based on the brilliance value Y of the image element included in the region in the vicinity of the detection region. Even when the standard deviation computed from the brilliance information is used, the fourth determination unit 2070 may determine whether or not the detection region which is being evaluated is a portion corresponding to the foreign object, in a manner similar to the case in which the standard deviation was computed using the luminosity information.

As described above, each of the first to fourth determination units 2064-2070 included in the foreign object determination unit 2048 may independently determine whether or not the detection region that is being evaluated is a portion corresponding to the foreign object shown in the image. The foreign object determination unit 2048 may output all of the determination result of the first to fourth determination units 2064-2070 to the detection correction unit 2044 and the foreign object image correction unit 2050. In addition, the foreign object determination unit 2048 may use the determination result of the first to fourth determination unit 2064-2070 and make a comprehensive determination on whether or not a foreign object is shown in each detection region. The foreign object determination unit 2048 may further output the result of the comprehensive determination to the detection correction unit 2044 and the foreign object image correction unit 2050.

For example, when one or more of the first to fourth determination units 2064-2070 determines that the detection region which is being evaluated is not a portion corresponding to the foreign object, the foreign object determination unit 2048 makes a comprehensive determination that the detection region which is being evaluated is not a portion corresponding to the foreign object. Alternatively, when all of the first to fourth determination units 2064-2070 determine that the detection region which is being evaluated is a portion corresponding to the foreign object, the foreign object determination unit 2048 makes a comprehensive determination that the detection region which is being evaluated is a portion corresponding to the foreign object.

The foreign object image correction unit 2050 performs a correction on the portion corresponding to the foreign object shown in the image in order to reduce the influence of the foreign object by using the determination result of the foreign object determination unit 2048 and the data computed by the information calculation unit 2046. In addition, the foreign object image correction unit 2050 may perform a correction to reduce the influence of the foreign object on the image based not on the determination result of the foreign object determination unit 2048 but based on a correction result which is a determination result which is corrected by the detection correction unit 2044.

The detection correction unit 2044 may correct the determination of the foreign object determination unit 2048 according to the operation signal entered by the calculation unit 2038 via the operation signal input unit 2032. For example, the detection correction unit 2044 corrects at least one of the threshold values used in the first to fourth determination unit 2064-2070 of the foreign object determination unit 2048 based on the operation signal. In this way, the detection correction unit 2044 again determines whether or not the detection region is a portion corresponding to the foreign object, and can correct the determination of the foreign object determination unit 2048.

Figure 15:
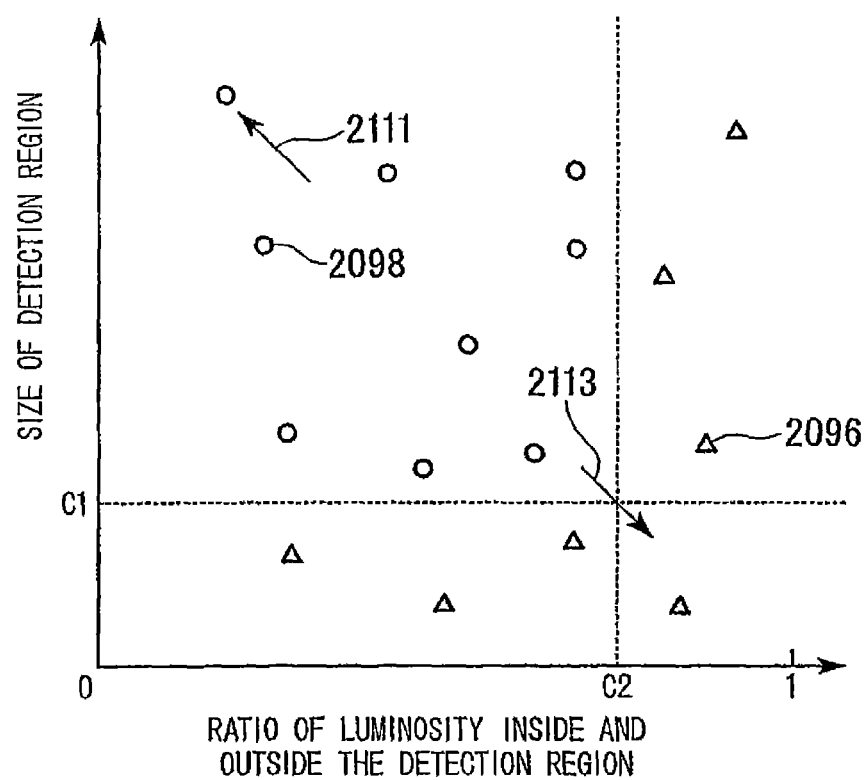
FIG. 15 is a conceptual diagram showing an adjusting process of a foreign object detection level of an image processing device according to the above embodiment.

FIG. 15 is a conceptual diagram showing a correction process of the decision executed by the detection correction unit 2044. FIG. 15 plots the detection region computed by the region calculation unit 2062 according to the size of the detection region and the ratio of the luminosity of the interior and the exterior of the detection region (the ratio of the first luminosity information and the second luminosity information).

The circle 2098 and the triangle 2096 in FIG. 15 each corresponds to one detection region. Here, the circle 2098 corresponds to a detection region which is determined again by the detection correction unit 2044 to be a portion corresponding to the foreign object. Further, the triangle 2096 corresponds to a detection region which is determined again by the detection correction unit 2044 not to be a portion corresponding to the foreign object.

According to the example shown in FIG. 15, the detection correction unit 2044 shown in FIG. 12 corrects the determination made by the first determination unit 2064 (a determination based on the size of the detection region) and the determination made by the second determination unit 2066 (a determination based on the difference between the luminosity of the detection region and the luminosity of the region in the vicinity of the detection region). The detection correction unit 2044 may alter the threshold value C1 concerning how large the detection region is, as well as the threshold value C2 concerning the ratio of the luminosity in the interior and exterior of the detection region, based on an operational signal. This is because the threshold value C1 concerning the size of the detection region and the threshold value C2 concerning the ratio of the luminosity of the interior and the exterior of the detection region have a large influence on the detection sensitivity.

Here, among the detection region indicated by the triangle 2096 and the circle 2098 in FIG. 15, those plotted in the upper left direction indicated by the arrow 2111 are considered to be the portion corresponding to the foreign object that has a salient influence on the image. This is because, the larger the size of the detection region and the greater the difference between the luminosity of the detection region and the region in its vicinity is large (the ratio of the luminosity (first luminosity information/second luminosity information) is small), the more salient the detection region is likely to be. On the other hand, the detection region plotted in the lower right direction indicated by the arrow 2113 is considered to have a small influence on the photographed image. This is because, the smaller the size of the detection region determined to be the foreign object, and the smaller the difference between the luminosity of the detection region and the luminosity of the region in the vicinity of the detection region, the less salient the detection region is.

The detection correction unit 2044 shown in FIG. 12 may increase the threshold value C1 indicated in FIG. 15 according to the operational signal from the input unit 2032. As a result, the detection correction unit 2044 determines again that only the detection region larger than the threshold value C1 is a portion corresponding to a foreign object. In this way, the incidence of erroneous detection of the foreign object is reduced. Meanwhile, the detection correction unit 2044 may decrease the threshold value C1 indicated in FIG. 15 according to the operational signal from the input unit 2032. As a result, it is possible to reduce the incidence of failing to detect a foreign object. Furthermore, the detection correction unit 2044 may adjust the detection sensitivity as in the case of the threshold C1, by increasing and decreasing the threshold value C2 according to the operational signal.

The detection correction unit 2044 may independently alter the values of the threshold C1 and the threshold C2. However, the detection correction unit 2044 may also alter the values of the threshold C1 and the threshold C2 according to a parameter using a predetermined function (such as a linear function and the like) in which the threshold value C1 and the threshold value C2 are variables. The threshold variable that the detection correction unit 2044 alters is not limited to the threshold value C1 concerning the size of the detection region nor the threshold value C2 concerning the ratio of the luminosity of the interior and the exterior of the detection region.

For example, a threshold value at which the detection correction unit 2044 changes may be a threshold value concerning the color saturation S of the second determination unit 2066, a threshold value concerning the brilliance Y of the second determination unit 2066, a threshold value concerning the color phase H of the second determination unit 2066, a threshold value concerning a luminosity V of the region in a surrounding region according to the third determination unit 2068, or a threshold value concerning a standard deviation Vstd of a brightness of a surrounding region according to the fourth determination unit 2070. In addition, the detection correction unit 2044 may change the computation result and the determination result of the information calculation unit 2046 and the foreign object determination unit 2048 by changing the threshold value concerning the luminosity gradient value Vgrad (i, j) of the region calculation unit 2062. The detection correction unit 2044 corrects the determination result of the foreign object determination unit 2048 by changing these threshold values. As a result, the image processing device according to the present embodiment may perform a detection of foreign objects in accordance with the preference of the user.

The detection correction unit 2044 may display to the display unit 2036, the determination result of the foreign object determination unit 2048 and/or the position of the detection region which is determined again by the detection correction unit 2044 to be a portion corresponding to a foreign object, in a manner such that the determination result and/or the position of the detection region overlap with the photographed image. As a result, the user of the camera 2010 may obtain a visual representation of the sensitivity with which the image processing device detects a foreign object, and can make the detection correction unit 2044 correct a determination according to the preference of the user. In addition, the detection correction unit 2044 may receive an input of the operation signal. The operation signal corrects the determination of whether the detection region is a portion corresponding to the foreign object. This correction is made as the user directly specifies and corrects the position of the detection region in the photographed image. As a result, the detection correction unit 2044 may correct the determination in better alliance with the preference of the user.

In addition, the detection correction unit 2044 may output to the memory unit 2030, a corrected determination standard which is a determination standard that has been corrected, or a data (i.e., a foreign object map) created by reflecting a correspondence of the determination of the detection correction unit 2044 to the data of the detection region as shown in FIG. 15. The corrected determination standard includes the threshold value C1 and the threshold value C2. In addition, the data reflecting a correspondence of the determination result of the detection correction unit 2044 to the data of the detection region includes a categorization of the detection region as shown in FIG. 15, a value of the size or the luminosity ratio of the detection region, and the position of the detection region. The memory unit 2030 may store the corrected determination standard, which has undergone a correction process by the detection correction unit 2044, and/or the data of the detection region, and outputs to the determination standard alteration unit 2042 based on need.

The determination standard alteration unit 2042 may alter an initial determination standard based on the corrected determination standard. The initial determination standard is a determination standard used when the Erg to fourth determination units 2064-2068 of the foreign object determination unit 2048 performs a determination based on the corrected determination standard. The determination standard alteration unit 2042 may alter the initial determination standard of the foreign object determination unit 2048 so that the initial determination standard becomes closer to the corrected determination standard.

The initial determination standard is a determination standard concerning a determination performed by the foreign object determination unit 2048 before the detection correction unit 2044 performs a correction. The corrected determination standard is a determination standard used when the detection correction unit 2044 performs a corrected determination. Therefore, the determination standard alteration unit 2042 may make the initial determination standard of the foreign object determination unit 2048 closer to the preference of the user of the camera 2010. Therefore, according to the image processing device based on the present embodiment, the foreign object may be detected efficiently according to the preference of the user. Incidentally, the determination standard alteration unit 2042 may compute an average value of a plurality of corrected determination standard stored in the memory unit 2030. Then, the determination standard alteration unit 2042 may alter the initial determination standard of the foreign object determination unit 2048 based on the average value of the corrected determination standard.

In addition, the determination standard alteration unit 2042 may alter the initial determination standard of the foreign object determination unit 2048 by using an accumulated data. The accumulated data is obtained by accumulating a data, created by reflecting the determination result of the detection correction unit 2044 to the data of the detection region, for over a plurality of determinations. For example, the determination standard alteration unit 2042 computes from the accumulated data of the foreign object map, a range such that a portion of a detection region (the circle 2098 of FIG. 15) determined to be a portion corresponding to a foreign object is greater than a portion of a detection region (the triangle 2096 of FIG. 15) determined not to be a portion corresponding to the foreign object. Further, the determination standard alteration unit 2042 alters the initial determination standard of the foreign object determination unit 2048 based on a range computed from the accumulated data of the foreign object map. As a result, the determination standard alteration unit 2042 can make the initial determination standard of the foreign object determination unit 2048 closer to the preference of the user of the camera 2010.

The foreign object image correction unit 2050 performs an image correction on the portion corresponding to the foreign object shown in the photographed image in order to reduce the influence of the foreign object. The foreign object image correction unit 2050 performs the image correction based on the determination made by the foreign object determination unit 2048 and a determination corrected by the detection correction unit 2044. The foreign object image correction unit 2050 according to the present embodiment comprises a first image correction unit 2074, a second image correction unit 2076, and a third image correction unit 2078.

The first image correction unit 2074 may perform a first correction on the portion corresponding to the foreign object shown in the photographed image in order to reduce the influence of the foreign object, using the luminosity information computed by the brightness information calculation unit 2054. The first image correction unit 2074 performs a first image correction using the luminosity plane and the luminosity V of each image element computed by the brightness information calculation unit 2054.

The first image correction unit 2074 performs a standardization (normalization) procedure of a regional luminosity V. Thus, the first image correction unit 2074 computes a luminosity transparency rate signal VT (i, j) for the detection region that will be corrected. In this way, the first image correction unit 2074 creates a luminosity transparency rate map (luminosity gain map) for the detection region that will be corrected. Here, the detection region that will be corrected by the first image correction unit 2074 is a detection region determined to be a portion corresponding to the foreign object by the foreign object determination unit 2048 or the detection correction unit 2044.

The luminosity transparency rate signal VT (i, j) is obtained by calculating a relative ratio between the luminosity V (i, j) of the image element of interest (i, j) (hereinafter may also referred to as an attention image element or a pixel of interest) in the detection region and an average value of a luminosity of a local region including the image element of interest (i, j). Thus, the first image correction unit 2074 according to the present embodiment may compute the luminosity transparency rate signal VT (i, j) according to the Equation (13) below.

Equation (13)

$$VT(i, j) = \frac{V(i, j)}{\left(\sum_{m=i-\alpha}^{i+\alpha} \sum_{n=j-\beta}^{j+\beta} V(i+m, j+n)\right) / (2\alpha+1)(2\beta+1)} \quad (13)$$

In Equation (13) above, $\alpha$ and $\beta$ correspond to a range used to obtain the local average. $\alpha$ indicates the number of image elements spreading out in the left and right directions from the image element of interest (i, j). $\beta$ indicates the number of image elements spreading out in the upper and lower directions from the image element of interest (i, j). Regarding the computation of the luminosity transparency rate signal VT (i, j), it is possible to set the range from which the local average is taken to approximately three times the range presumed to include a foreign object. However, there is no particular limitation on the range from which the local average is taken. For example, regarding the computation of the luminosity transparency rate signal VT (i, j), the first image correction unit 2074 may set the values of α and β (the number of image elements) to be α=(36 to 55) and β=(36 to 55).

Figure 14A:
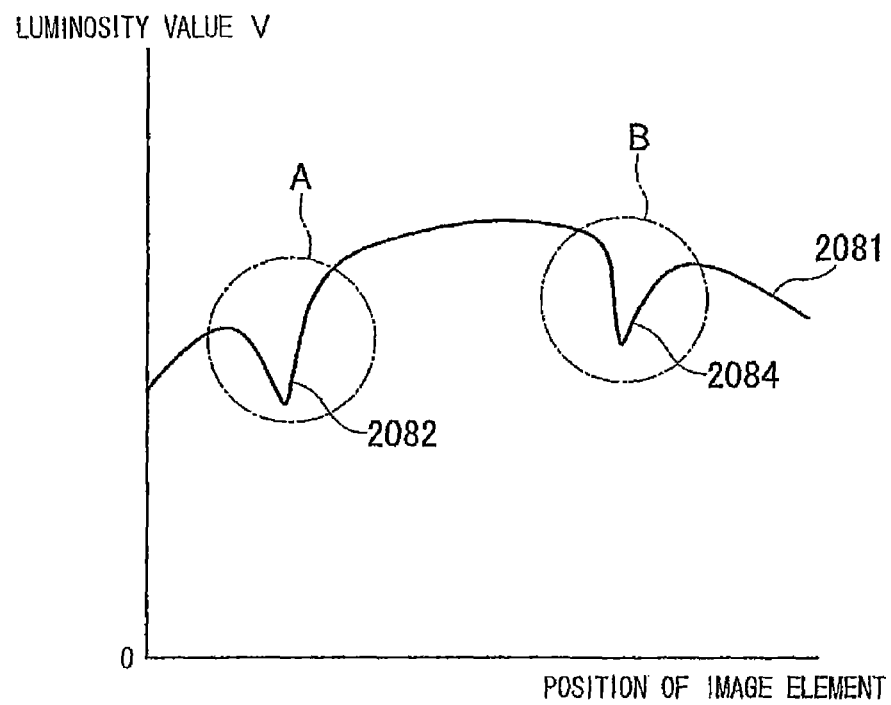
FIG. 14A is a conceptual diagram showing a creation process of a gain map.
Figure 14B:
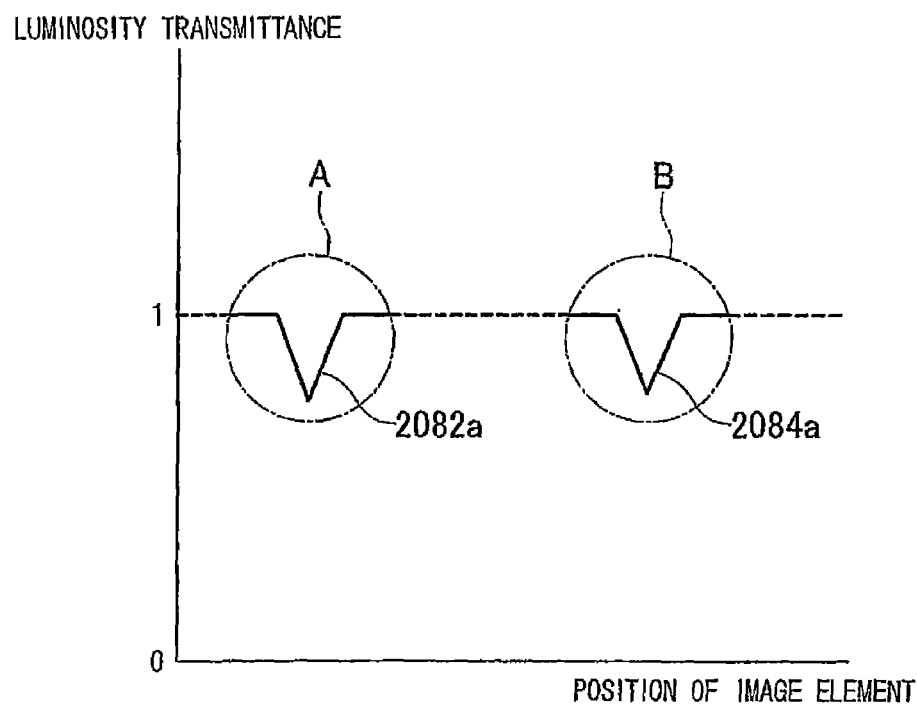
FIG. 14B is a conceptual diagram showing a creation process of a gain map.

FIGS. 14A and 14B are conceptual diagrams illustrating the generation of a luminosity transparency rate map performed by the first image correction unit 2074. FIG. 14A indicates a change in the luminosity V of the photographed image in the left and right directions in the luminosity plane. There are concave portions 2082 and 2084 in the luminosity plane (curve) 2081 shown in FIG. 14A. The concave portions 2082 and 2084 are such that the luminosity V is low compared to the surrounding portions, and the luminosity gradient Vgrad (i, j) is large. In FIG. 14A, the detection region which will be corrected by the first image correction unit 2074 is the detection region A and the detection region B corresponding to the concave portions 2082 and 2084.

The first image correction unit 2074 shown in FIG. 12 computes a luminosity transparency rate signal VT (i, j) for each image element included in the detection region A of the luminosity plane (curve) shown in FIG. 14A and each element included in the detection region B. FIG. 14B shows a luminosity transparency rate map computed by the luminosity plane (curve) shown in FIG. 14A. Only the decrease in luminosity due to the foreign object is extracted from the concave portions 2082 and 2084 of the luminosity plane shown in FIG. 14A by a localized normalization process. In the luminosity transparency rate map shown in FIG. 14B, the concave portions are replaced with concave portions 2082a and 2082b of the luminosity transparency rate. In this way, the first image correction unit 2074 creates a luminosity transparency rate map for the detection region determined to be a portion corresponding to the foreign object. The first image correction unit 2074 may calculate a first correction amount (i.e., a luminosity gain), which is the amount of correction performed by the first image correction, independently for each detection region by generating a gain map for each detection region.

Furthermore, the first image correction unit 2074 executes a first image correction to reduce or eliminate the influence of a foreign object with respect to the portion corresponding to the foreign object shown in the photographed image by using the position information of each detection region and the luminosity transparency rate map of each detection region. The first image correction unit 2074 performs a gain correction by multiplying the luminosity V (i, j) of each image element included in the detection region with an inverse number of the luminosity transparency rate signal VT (i, j). In other words, the first image correction unit 2074 performs a gain correction on the luminosity V of the image element included in the detection region corresponding to the foreign object shown in the photographed image. In this way, the first image correction unit 2074 reduces or eliminates a change in the luminosity caused by the foreign object being shown in the photographed image. For instance, the first image correction unit 2074 computes a corrected luminosity VC(i, j) using the Equation (14).

Equation (14)

$$VC(i,j)=V(i,j)/VT(i,j) \quad (14)$$

In this way, the first image correction unit 2074 corrects the luminosity plane of the photographed image by replacing the luminosity V (i, j) of the detection region to a luminosity VC (i, j) which has undergone a gain correction. As a result, the first image correction unit 2074 corrects the luminosity plane of the photographed image by replacing the luminosity V (i, j) of the detection region with the gain corrected luminosity VC (i, j). As a result, the first image correction unit 2074 may reduce or eliminate a change in the luminosity of the photographed image due to the foreign object shown in the image.

The second image correction unit 2076 uses the color saturation information computed by the color saturation information calculation unit 2056 and perform a second image correction on the portion corresponding to the foreign object shown in the photographed image to reduce the influence of this foreign object. The second image correction unit 2076 performs a second image correction using the color saturation plane and the color saturation S of each image element computed by the color saturation information calculation unit 2056.

In a manner similar to the first image correction unit 2074, the second image correction unit 2076 performs a standardization (normalization) procedure of a local color saturation 8, computes the color saturation transparency rate signal ST (i, j) with respect to the detection region that will be corrected, and generates a color saturation transparency rate map (color saturation gain map) regarding the detection region that will be corrected. Similar to the case of the first image correction unit 2074, the detection region that will be corrected by the second image correction unit 2076 is the detection region that was determined by the foreign object determination unit 2048 or the detection correction unit 2044 to be a portion corresponding to the foreign object.

The equation for computing the color saturation transparency rate signal ST (i, j) can be obtained by replacing the luminosity transparency rate signal VT (i, j) and the luminosity V (i, j) in Equation (13) to a color saturation transparency rate signal ST (i, j) and a color saturation S(i, j). In addition, similar to the first image correction unit 2074, the second image correction unit 2076 creates a color saturation transparency rate map with respect to the detection region determined to be a portion corresponding to the foreign object. The second image correction unit 2076 may compute the second correction amount (i.e., the color saturation gain) independently for each detection region by creating a gain map for each detection region. The second correction amount is the amount of correction executed in the second image correction.

Similar to the first image correction unit 2074, the second image correction unit 2076 performs a second image correction on the portion corresponding to the foreign object shown in the photographed image in order to reduce or eliminate the influence of the foreign object by using the position information of each detection region and the color saturation transparency rate map of each detection region. The second image correction unit 2076 performs a gain correction by multiplying an inverse number of the color saturation transparency rate signal ST (i, j) with the color saturation S (i, j) of each image element included in the detection region. For example, the second image correction unit 2076 computes the corrected color saturation SC (i, j) by using the Equation (15) below.

Equation (15)

$$SC(i,j)=S(i,j)/ST(i,j) \quad (15)$$

In this way, the second image correction unit 2076 corrects the color saturation plane of the photographed image by replacing the color saturation S(i, j) of the detection region with the gain corrected color saturation SC (i, j). As a result, the second image correction unit 2076 can reduce or eliminate the change in the color saturation in the photographed image caused by the foreign object.

The third image correction unit 2078 can perform a third image correction on the portion corresponding to the foreign object shown in the photographed image in order to reduce the influence of the foreign object, by using a color phase information computed by the color phase information calculation unit 2058. The third image correction unit 2078 performs a third image correction by using the color phase plane and the color phase H of each image element computed by the color phase information calculation unit 2058.

In a manner similar to the first image correction unit 2074, the third image correction unit 2078 performs a standardization (normalization) procedure of a local color phase H, computes the color phase transparency rate signal HT (i, j) with respect to the detection region that will be corrected, and generates a color phase transparency rate map (color phase gain map) regarding the detection region that will be corrected. Similar to the case of the first image correction unit 2074, the detection region that will be corrected by the third image correction unit 2078 is the detection region that was determined by the foreign object determination unit 2048 or the detection correction unit 2044 to be a portion corresponding to the foreign object.

The equation for computing the color phase transparency rate signal ITT (i, j) can be obtained by replacing the luminosity transparency rate signal VT (i, j) and the luminosity V (i, j) in Equation (13) to a color phase transparency rate signal HT (i, j) and a color phase H(i, j). In addition, similar to the first image correction unit 2074, the third image correction unit 2078 creates a color phase transparency rate map with respect to the detection region determined to be a portion corresponding to the foreign object. The third image correction unit 2078 may compute the third correction amount (i.e., the color phase gain) independently for each detection region by creating a gain map for each detection region. The third correction amount is the amount of correction executed in the third image correction.

Similar to the first image correction unit 2074, the third image correction unit 2078 performs a third image correction on the portion corresponding to the foreign object shown in the photographed image in order to reduce or eliminate the influence of the foreign object by using the position information of each detection region and the color phase transparency rate map of each detection region. The third image correction unit 2078 performs a gain correction by multiplying an inverse number of the color phase transparency rate signal HT (i, j) with the color phase H (i, j) of each image element included in the detection region. For example, the third image correction unit 2078 computes the corrected color phase HC (i, j) by using the Equation (16) below.

Equation (16)

$$HC(i,j)=H(i,j)/HT(i,j) \quad (16)$$

In this way, the third image correction unit 2078 corrects the color phase plane of the photographed image by replacing the color phase H(i, j) of the detection region with the gain corrected color phase HC (i, j). As a result, the third image correction unit 2076 can reduce or eliminate the change in the color phase in the photographed image caused by the foreign object.

When the color correction determination unit 2052, for example, determines that the photographed image that is currently planning to be corrected is an image processed with a non-linear correction such as a PEG image, the foreign object image correction unit 2050 performs an HSV correction correcting the photographed image with a first to third image correction executed by the first to third image correction units 2074-2078.

According to the HSV correction performed by the first to third image correction units 2074-2078, the photographed image is HSV-converted, a gain map is created independently for each of the luminosity plane, the color saturation plane, and the color phase plane, and an image correction is performed. Therefore, even in a case in which a non-linear correction is applied to a color of a photographed image, the HSV correction performed by the first to third image correction units 2074-2078 makes it possible to correct the change of the color due to the foreign object while maintaining a high degree of harmony with the coloring of the surrounding regions.

Incidentally, when the color correction determination unit 2052 determines that the photographed image which is planning to be corrected is an image that has not been processed with a non-linear correction such as a RAW image, the foreign object image correction unit 2050 may perform a general correction using only the brilliance. Here, it is also possible to perform a correction using only the luminosity.

In general, a correction of the brilliance is made as follows. A standardization (normalization) procedure is applied to a localized brilliance Y, and for each detection region that will be corrected, a brilliance transparency rate signal YT (i, j) is computed. Thus, a brilliance transparency rate map (brilliance gain map) is generated for the detection region that will be corrected. The equation for computing the brilliance transparency rate signal YT (i, j) may be obtained by replacing the luminosity transparency rate signal VT (i, j) and the luminosity V (i, j) in Equation (13) with the brilliance transparency rate signal YT (i, j) and the brilliance value Y (i, j).

A gain correction is performed by multiplying the inverse number of the brilliance transparency rate signal YT (i, j) with each of the R value R (i, j), the G value (i, j), and the B value B (i, j) of each image element included in the detection region. For example, a corrected R value RC (i, j), G value GC (i, j), and B value BC (i, j) are computed using the Equations (17-1) to (17-3) below.

Equations (17-1)-(17-3)

$$RC(i,j)=R(i,j)/YT(i,j) \quad (17\text{-}1)$$

$$GC(i,j)=G(i,j)/YT(i,j) \quad (17\text{-}2)$$

$$BC(i,j)=B(i,j)/YT(i,j) \quad (17\text{-}3)$$

In this way, the photographed image can be corrected by replacing the ROB value of each image element included in the detection region with the gain-corrected R value RC (i, j), G value GC (i, j), and B value BC (i, j), which is a normal correction performed using only the brilliance.

Incidentally, the normal correction using only the brilliance is performed by using only the gain map of the brilliance (YT (i, j)) as indicated in Equations (17-1)-(17-3). Therefore, when an image that has been non-linearly corrected is processed with a normal correction that uses only the brilliance, either of the ROB values (RC (i, j), GC (i, j), and BC (i, j)) of the image element after the correction becomes a value that is different from the ROB value of the image element in the surrounding area. In this way, a correction vestige may be created.

In addition, such a problem is more likely to occur when a strong non-linear correction is applied to the photographed image to be corrected. Moreover, the format of the non-linear correction applied on the photographed image may differ depending on the type of imaging devices such as a camera. Meanwhile, according to the HSV correction based on the above embodiment, each of a luminosity gain map, a color saturation gain map, and a color phase gain map are generated to perform the correction, as indicated in Equations (14) to (16). As a result, the gain-corrected image element is corrected to be a color that is close to that of the image element in a surrounding region. Further, even if a on-linear correction has been applied to the photographed image to be corrected, the HSV correction prevents problems such as the correction vestige being created on the photographed image that was corrected. In addition, this effect can be attained regardless of the format of the non-linear correction that has been applied to the image to be corrected. In other words, the same effect as described above in the present embodiment can be expected for images other than a JPEG that has been non-linearly corrected.

Incidentally, according to the HSV correction performed by the foreign object image correction unit 2050, the corrected photographed image may be generated by combining the luminosity plan, the color saturation plane, and the color phase plane that have been corrected by the first to third image correction unit 2074-2078. However, the image correction made by the second image correction unit 2074 or the third image correction unit 2078 may be omitted. In other words, according to the HSV correction by the foreign object image correction unit 2050, a gain correction may not be performed on either one of the color saturation plane or the color phase plane. Instead, the corrected photographed image may be generated by combining the color saturation plane or the color phase plane, which has not been gain-corrected, with the corrected luminosity plane and the like.

According to the present embodiment, a correction based on the color saturation using the second image correction unit 2076 is combined with the correction based on the luminosity using the first image correction unit 2074 (including the correction based on the brilliance). As a result, compared to a normal correction using only the brilliance, the accuracy with which a foreign object is removed and corrected increases especially with respect to a non-linearly corrected image. In addition, according to the present embodiment, the correction based on the color phase using the third image correction unit 2078 is combined with the correction based on the luminosity using the first image correction unit 2074 (including the correction based on the brilliance). As a result, compared to a normal correction using only the brilliance, the accuracy with which a foreign object is removed and corrected increases especially with respect to a non-linearly corrected image.

Incidentally, according to the HSV correction, the foreign object image correction unit 2050 may compute the first to third correction amount, which are the correction amount regarding the first to third image correction, independently for each detection region. By computing the correction amount independently for each detection region, the image processing device according to the present embodiment may reduce the amount of computation compared to the case in which the correction amount is computed for the entire photographed image. In addition, the first image correction unit of the foreign object image correction unit 2050 may perform the image correction using the brilliance information instead of the luminosity information.

The color correction determination unit 2052 determines whether or not the photographed image, which is to be corrected by the foreign object image correction unit 2050 by removing the influence of the foreign object, has been non-linearly corrected with respect to a photographed image obtained by applying a photoelectric conversion on the image by the optical system 2016 of the camera 2010. The color correction determination unit 2052 determines whether or not the photographed image, which is to be corrected by the foreign object image correction unit 2050 by removing the influence of the foreign object, has been non-linearly corrected, and outputs the determination result to the foreign object image correction unit 2050.

When the color correction determination unit 2052 determines that the photographed image that is to be currently corrected has been non-linearly corrected, the foreign object image correction unit 2050 performs the HSV correction according to the first to third image correction units 2074-2078. Thus, the foreign image correction unit 2050 performs a correction to reduce the influence of the foreign object. On the other hand, when the color correction determination unit 2052 determines that the photographed image to be presently corrected has not been non-linearly corrected, the foreign object image correction unit 2050 does not perform the image correction by the first to third image correction units 2074-2078. Instead, the foreign object image correction unit 2050 may perform a normal correction using only the brilliance, and thus may perform a correction reducing the influence of the foreign object from the foreign object image correction unit 2050.

In addition, the color correction determination unit 2052 may determine the degree of strength of the non-linear correction that is applied to the photographed image that is to be corrected by the foreign object image correction unit 2050 removing the influence of the foreign object. Thus, the color correction determination unit 2052 may determine the degree of strength of non-linear correction that is applied to the photographed image that is to be corrected by the foreign object image correction unit 2050 removing the influence of the foreign object, and outputs the determination result to the foreign object image correction unit 2050.

In this case, when the color correction determination unit 2052 determines that a strong non-linear correction has been applied to the photographed image that is presently being corrected, the foreign object image correction unit 2050 performs the HSV correction by the first to third image correction unit 2074-2078, and performs a correction to reduce the influence of a foreign object from the foreign object image correction unit 2050. On the other hand, when the color correction determination unit 2052 determines that a weak non-linear correction has been applied to the photographed image that is presently being corrected, the foreign object image correction unit 2050 does not perform the image correction by the first to third image correction units 2074-2078 and instead performs a normal correction using only the brilliance, and thus performs a correction to reduce the influence of the foreign object on the foreign object image correction unit 2050.

The memory unit 2030 stores a corrected determination standard which has been corrected by the detection correction unit 2044, data of the detection region, and conditions for photographing the photographed image. The memory unit 2030 comprises nonvolatile memory and the like. The operation signal input unit 2032 is an input unit which receives an input of an operation signal corresponding to an operation performed by a user to specify a portion corresponding to a foreign object shown in the photographed image. The operation signal input unit 2032 receives an input of operation signal to alter, for example, a threshold value (determination standard) used by the first to fourth determination units 2064-2070 of the foreign object determination unit 2048 such as a threshold value C1 concerning the size of the detection region, a threshold value C2 concerning the ratio of the luminosity in the interior and exterior of the detection region.

The operation signal input unit 2032 includes a user interface for the user to input an operation signal to the image processing device. Examples of the user interface includes, for example, a button equipped on the camera main body 2012 (see FIG. 11), a cross-shaped key, and a rotating-style selector. The detection correction unit 2044 may correct the determination Made by the foreign object determination unit 2048 according to the operation signal inputted to the computation unit 2038 via the operation signal input unit 2032.

The imaging condition signal input unit 2034 receives an input of an imaging condition concerning the photographed image that will be evaluated by the foreign object determination unit 2048 and the photographed image that is processed with an image correction by the foreign object image correction unit 2050. The imaging condition that is inputted to the imaging condition signal input unit 2034 includes, for example, a focus value or an imaging sensitivity when the image is photographed, or the type of optical system or the focal length that were used when the image was photographed.

The detection correction unit 2044 may store to the memory unit 2030, a corrected determination standard of a data concerning the foreign object map shown in FIG. 15 in correspondence with the imaging condition that has been inputted via the imaging condition signal input unit 2034. In addition, the determination standard alteration unit 2042 may alter the initial determination standard, which is a determination standard used when the first to fourth determination unit 2064-2070 of the foreign object determination unit 2048 makes a determination. Here, the determination standard alteration unit 2042 may alter the initial determination standard for each imaging condition based on the corrected determination standard corresponding to the imaging condition. The foreign object detection sensitivity according to the preference of the user may change according to the imaging condition. The image processing device including the imaging condition signal input unit 2034 may make the initial determination standard of the foreign object determination unit 2048 closer to the preference of the user of the camera 2010.

In addition, when a foreign object positioned at a particular place in the optical filter 2020 continues to be attached there, it is highly likely that the foreign object will continue to be shown at a specific location of the photographed image when the imaging condition is the same. Therefore, by saving data concerning the foreign object map according to the imaging condition, the image processing device based on the present embodiment may easily specify the position at which the foreign object that the user identified is shown in the photographed image.

The display unit 2036 comprises, for example, a liquid crystal display device and the like equipped to a camera main body part 2012 (see FIG. 11). The display unit 2036 may display the position of the detection region which was determined again by the detection correction unit 2044 to be a portion corresponding to the foreign object in a manner such that the detection region overlaps with the photographed image.

Figure 13A:
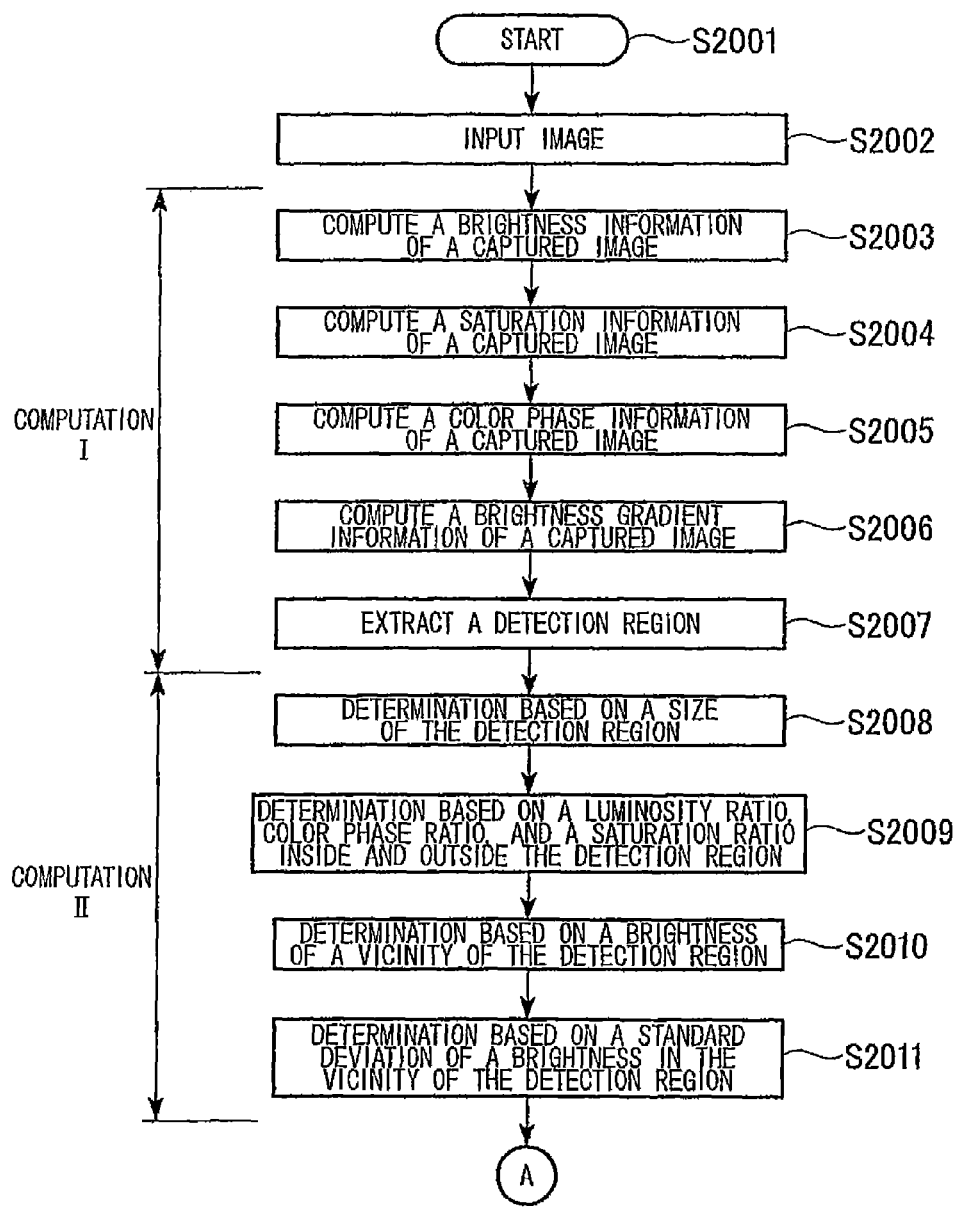
FIG. 13A is a flowchart showing a first half portion of an example of an image processing computation performed by an image processing device according to the above embodiment.
Figure 13B:
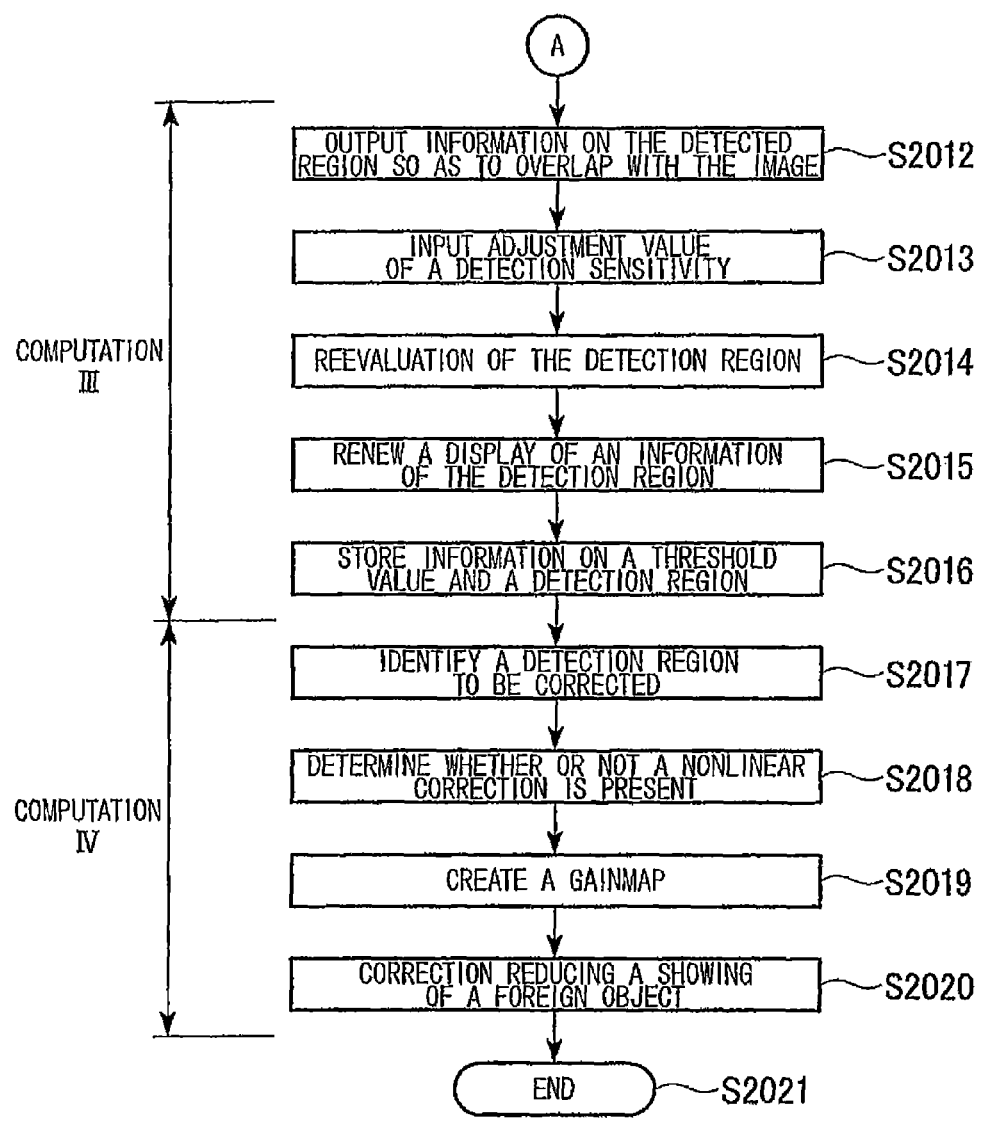
FIG. 13B is a flowchart showing a latter half portion of an example of an image processing computation performed by an image processing device according to the above embodiment.

FIGS. 13A and 13B show a flowchart indicating an example of an image processing operation performed by the camera 2010 shown in FIG. 12. FIG. 13A shows a first half portion of the image processing operation. FIG. 13B shows a second half of the image processing operation. As indicated in FIGS. 13A and 13B, the image processing operation includes a calculation I including steps S2003-S2007, a calculation II including steps S2008-S2011, a calculation III including steps S2012-S2016, and a calculation IV including steps S2017-S2020.

In the calculation I, the calculation computes information concerning the color of the photographed image, such as the brightness information and the color saturation information. In the calculation II, the calculation unit 2038 uses the information computed in the calculation I, and calculates a foreign object information concerning the foreign object that is shown in the photographed image, such as the position of the foreign object shown in the photographed image. In addition, in the calculation II, the calculation unit 2038 uses the information computed in the calculation I, and determines whether or not the detection region inside the photographed image is a portion corresponding to the foreign object shown in the photographed image.

In the calculation III, the calculation unit 2038 inputs the operation signal of the user via the operation signal input unit 2032, and performs a calculation to correct the determination made in the calculation II in accordance with the inputted operation signal. In the calculation IV, the calculation unit 2038 specifies the detection region in which the foreign object is shown based on the determination result made by the calculation II or the calculation III. Then, the calculation unit 2038 uses the information computed in the calculation I and performs an image correction with respect to the portion corresponding to the foreign object shown in the photographed image, in order to reduce the influence of the foreign object. In the calculation IV, the calculation unit 2038 performs a first image correction (i.e., an image correction performed by the first image correction unit 2074) using the brightness information computed in the calculation I, in order to reduce the influence of the foreign object. Furthermore, in the calculation IV, a second image correction (i.e., an image correction performed by the second image correction unit 2076) using the color saturation information computed in the calculation I to reduce the influence of the foreign object, and a third image correction (i.e., an image correction performed by the third image correction unit 2078) using the color phase information computed in the calculation I to reduce the influence of the foreign object, are performed.

The image processing device equipped in the camera 2010 shown in FIG. 12 starts the series of image processing operations in step S2001, as indicated in FIG. 13A. In step S2002, the photographed image, taken by the imaging unit 2026, is inputted to the calculation unit 2038 via the image input unit 2028.

Figure 16:
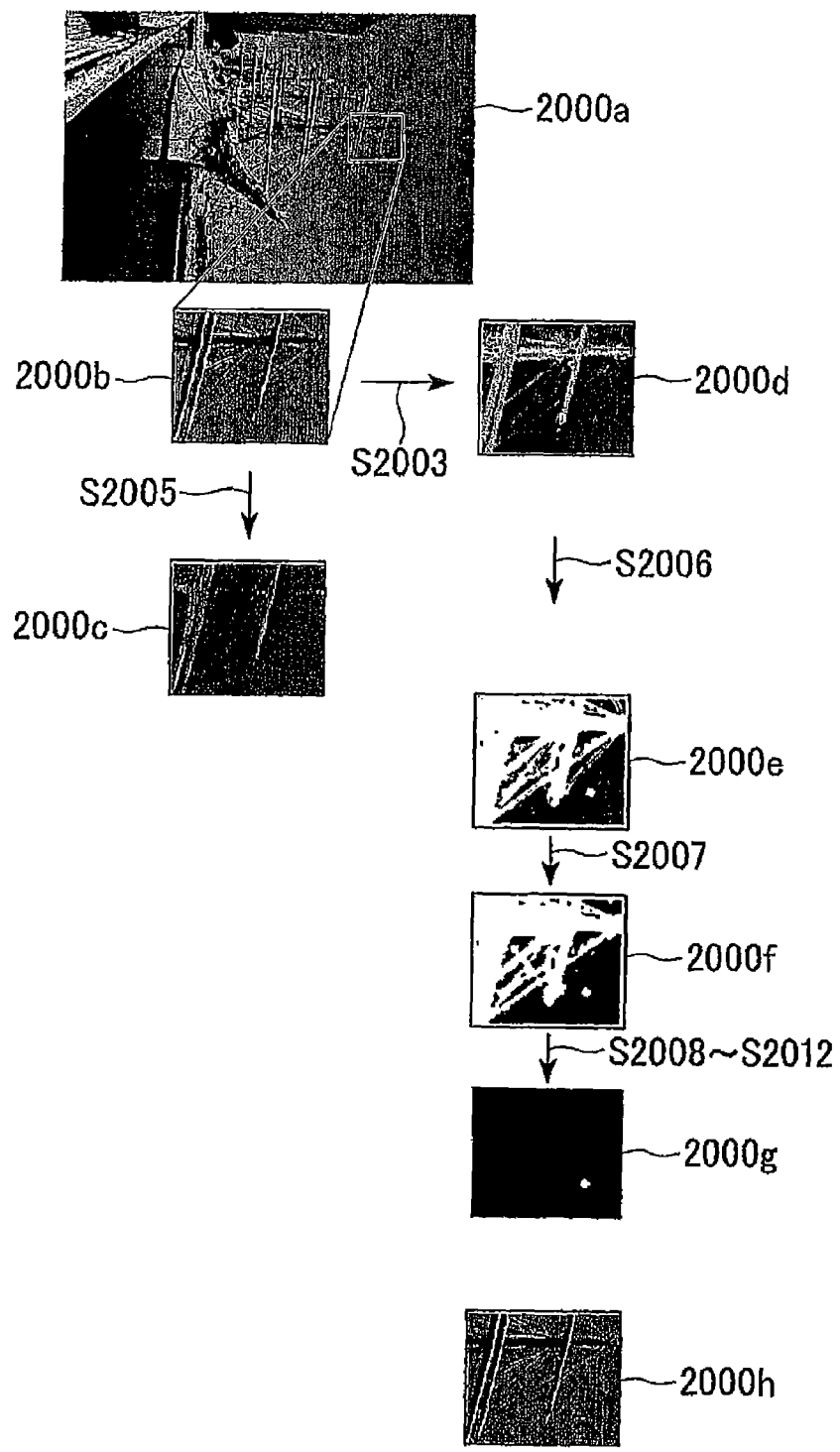
FIG. 16 is a conceptual diagram showing an image and the like computed by an image processing device according to the above embodiment.

FIG. 16 illustrates the image processing operation performed by the camera 2010 shown in FIG. 12, by showing the photographed image 2000$b$ (reference numeral 2000$b$) as an example. The photographed image 2000$b$ is a part of the photographed image indicated by the reference numeral 2000$a$. In step S2002 shown in FIG. 13A, the photographed image 2000$b$ is inputted to the calculation unit 2038.

In steps S2003-S2007 shown in FIG. 13A, the information calculation unit 2046 of the calculation unit 2038 shown in FIG. 12 computes information concerning the color of the photographed image. In step S2003, the brightness information calculation unit 2054 of the information calculation unit 2046 computes a brightness information corresponding to the brightness of the photographed image. The brightness information computation unit 2054 may compute the brilliance plane of the photographed image, or the luminosity plane of the photographed image. However, in step S2003 indicated in FIG. 13A, the brightness information calculation unit 2054 calculates the luminosity plane using the Equations (9-1) and (9-6) mentioned above.

In step S2003, the color saturation information calculation unit 2056 of the information calculation unit 2046 uses the Equations (9-2), (9-6), and (9-7) mentioned above to compute the color saturation plane. In addition, in step S2005, the color phase plane is computed using the Equations (9-3)-(9-5) and (9-6)-(9-10) mentioned above.

As shown in FIG. 16, in step S2003, the luminosity plane 2000$d$ (reference numeral 2000$d$) of the photographed image 2000*b* is computed from the photographed image 2000*b*. In addition, in step S2004, the color saturation plane (not diagramed) of the photographed image 2000*b* is computed from the photographed image 2000*b*. Further, in step S2005, the color phase plane 2000*c* of the photographed image 2000*b* is computed from the photographed image 2000*b*.

In step S2006 shown in FIG. 13A, the brightness gradient information calculation unit 2060 of the information calculation unit 2046 computes the brightness gradient information corresponding to the brightness gradient of the photographed image. The brightness gradient information calculation unit 2060 may compute the brilliance gradient plane of the photographed image or may compute the luminosity gradient plane of the photographed image. However, in step S2006 shown in FIG. 13A, the brightness gradient information computation unit 2060 uses the data of the luminosity plane computed in step S2003 and Equation (11) described earlier, in order to compute the luminosity gradient plane.

In step S2007 indicated in FIG. 13A, the region calculation unit 2062 of the information calculation unit 2046 computes the detection region. The region calculation unit 2062 computes a binary format image using the luminosity gradient plane computed by the brightness gradient information calculation unit 2060, and computes the detection region. The region calculation unit 2062 identifies a region in which image elements having a luminosity gradient value greater than the threshold value are positioned continuously as one detection region.

In step S2006, the luminosity gradient plane 2000*e* (reference numeral 2000*e*) of the photographed image 2000*b* is computed from the luminosity plane 2000*d* (reference numeral 2000*d*) of the photographed image 2000*b*, as indicated in FIG. 16. Further, in step S2007, the binary format image 2000*f* (reference numeral 2000*f*) is computed from the luminosity gradient plane 2000*e*.

In steps S2008-S2011 shown in FIG. 13A the foreign object determination unit 2048 of the calculation unit 2038 shown in FIG. 12 uses the information computed by the information calculation unit 2046 and, for each detection region specified by the region calculation unit 2062, determines whether or not the detection region is a portion corresponding to a foreign object.

In step S2008 shown in FIG. 13A, the first determination unit 2064 of the foreign object determination unit 2048 refers to the size of the detection region that is being evaluated in order to determine whether or not the detection region is a portion corresponding to the foreign object shown in the image. The first determination unit 2064 may use the binary format image 2000*f* to compute the size of the detection region from the number of image elements and the like included in the detection region. In addition, when the size of the detection region computed based on the binary format image 2000*f* is not within a predetermined range, the first determination unit 2064 determines that the detection region that is being evaluated is not a portion corresponding to the foreign object.

In step S2009 shown in FIG. 13A, the second determination unit 2066 of the foreign object determination unit 2048 uses the color saturation information corresponding to the color saturation of the detection region, the color phase information corresponding to the color phase of the detection region, and the luminosity information corresponding to the luminosity of the detection region, and determines whether or not the detection region is a portion corresponding to a foreign object shown in the image.

In step S2009, the second determination unit 2066 first uses the luminosity plane computed by the brightness information calculation unit 2054 and evaluates the difference between the first luminosity information corresponding to the luminosity of the detection region and the second luminosity information corresponding to the luminosity of the region in the vicinity of the detection region. In step S2009, the second determination unit 2066 sets the average value of the luminosity value V of the image elements included in the detection region as the first luminosity information, and sets the average value of the luminosity value V of the image elements included in the region in the vicinity of the detection region as the second luminosity information. When the ratio of the first luminosity information and the second luminosity information is not within a predetermined range, the second determination unit 2066 determines that the detection region that is being evaluated is not a portion corresponding to the foreign object.

Next, the second determination unit 2066 uses the color saturation plane computed by the color saturation information computation unit 2056 and evaluates a difference between the first color saturation information corresponding to the color saturation of the detection region and a second color saturation information corresponding to the color saturation of the region in the vicinity of the detection region. In step S2009, the second determination unit sets the average value of the color saturation value S of the image elements included in the detection region as the first color saturation information, and sets the average value of the color saturation value S of the image elements included in the region in the vicinity of the detection region as the second color saturation information. When the ratio of the first color saturation information and the second color saturation information is not within a predetermined range, the second determination unit 2066 determines that the detection region that is being evaluated is not a portion corresponding to the foreign object.

Further, the second determination unit 2066 uses the color phase plane computed by the color phase information calculation unit 2058 to evaluate the difference between the first color phase information corresponding to the color phase of the detection region and the second color phase information corresponding to the color phase of the region in the vicinity of the detection region. In step S2009, the second determination unit 2066 sets the average value of the color phase value H of the image elements included in the detection region as the first color phase information, and sets the average value of the color phase value H of the image elements included in the region in the vicinity of the detection region as the second color phase information. When the ratio between the first color phase information and the second color phase information is not within a predetermined range, the second determination unit 2066 determines that the detection region that is being evaluated is not a portion corresponding to the foreign object.

In step S2010 shown in FIG. 13A, the third determination unit 2068 of the foreign object determination unit 2048 uses the brightness information corresponding to the brightness of the region in the vicinity of the detection region to determine whether or not the detection region is a portion corresponding to the foreign object shown in the image. The third determination unit 2068 uses the luminosity plane computed by the brightness information calculation unit 2054 and computes the second luminosity information corresponding to the luminosity of the region in the vicinity of the detection region. Similar to the second determination unit 2066, the third determination unit 2068 sets the average value of the luminosity value V of the image elements included in the region in the vicinity of the detection region as the second luminosity information. When the second luminosity information is not within a predetermined range, the third determination unit 2068 determines that the detection region that is being evaluated is not a portion corresponding to the foreign object.

In step S2011 shown in FIG. 13A, the fourth determination unit 2070 of the foreign object determination unit 2048 determines, from the standard deviation of the brightness of the region in the vicinity of the detection region, whether or not the detection region is a portion corresponding to the foreign object shown in the image. The fourth determination unit 2070 uses the luminosity plane computed by the brightness information calculation unit 2054 and the Equation (12) described above, in order to compute the standard deviation of the luminosity of the region in the vicinity of the detection region. When the standard deviation of the brightness of the region in the vicinity of the detection region is not within a predetermined range, the fourth determination unit 2070 determines that the detected region which is being evaluated is not a portion corresponding to the foreign object.

In steps S2008 to S2012, only the detection region in which the foreign object is shown is extracted from the binary format image 2000f by removing the detection region that do not correspond to the foreign object such as the binary format image 2000g indicated with the reference numeral 2000g, as shown in FIG. 13B.

Incidentally, the determination corresponding to steps S2008-S2011 of FIG. 13A may be conducted with respect to all of the detection regions included in the photographed image 2000b. However, the determination corresponding to steps S2009-S2011 may be performed only for the region that was not determined not to be the portion corresponding to the foreign object in the immediately proceeding steps S2009-S2011. The foreign object determination unit 2048 determines that the portion corresponding to a foreign object is the only detection region that was not determined in either of steps S2008-S2011 not to be a portion corresponding to the foreign object.

In addition, after the foreign object determination unit 2048 performs a determination in sequence from step S2008 to step S2011 for one detection region, the foreign object determination unit 2048 may perform the determination for another detection region in sequence from step S2008 to S2011. In this case, the determination concerning one detection region is made such that, once the detection region that is being evaluated is determined not to be a portion corresponding to a foreign object in either one step included in steps S2008 to S2011, the rest of the determination (step) regarding this detection region is skipped, and a determination concerning another detection region may be commenced. In this case, the foreign object determination unit 2048 determines that a portion corresponding to the foreign object is a detection region that was being evaluated in step S2011, and that was not determined not to be a portion corresponding to a foreign object in step S2011. Since the foreign object determination unit 2048 can skip the determination corresponding to steps S2009-S2011, the image processing device may reduce the amount of computation performed by the foreign object determination unit 2048.

After the calculation unit 2038 has completed the calculation II including steps S2007-S2011 in FIG. 13A, the calculation unit 2038 carries out the calculation III including steps S2012-S2016 in FIG. 13B. Incidentally, according to the setting and the like of the user, once the calculation unit 2038 has completed the calculation II including steps S2007-S2011 in FIG. 13A, the calculation unit 2038 may skip the calculation III, and may execute the calculation IV including steps S2017-S2020 in FIG. 13B.

In steps S2012-S2016 shown in FIG. 13B, the correction determination unit 2044 and the like of the calculation unit 2038 inputs the operation signal of the user via the operation signal input unit 2032, and according to the inputted operation signal, a calculation is performed to correct the determination made in steps S2008-S2011.

In step S2012 shown in FIG. 13B, the detection correction unit 2044 displays to the display unit 2036, the determination result of the foreign object determination unit 2048 such that the determination result overlaps with the photographed image. As shown in the image indicated with the reference numeral 2000h in FIG. 16, the display unit 2036 receives an instruction from the detection correction unit 2044, and displays the detection region, determined to be a portion corresponding to the foreign object in the foreign object determination unit 2048 in a manner such that the detection region is overlapped with the photographed image 2000b, and that the detection region is distinguished from the other detection region. According to the image indicated with the reference numeral 2000h, among the detection regions extracted by the region calculation unit 2062, only the position of the detection region determined to be a portion corresponding to the foreign object in the foreign object determination unit 2048 is displayed using a triangular figure.

In step S2013 shown in FIG. 13B, the operation signal for correcting the determination made in the foreign object determination unit 2048 is inputted to the detection correction unit 2044 of the calculation unit 2038 via the operation signal input unit 2032. In step S2013, the user refers to the determination result displayed on the display unit 2036, operates the user interface included in the operation signal input unit 2032, and may input the operation signal for correcting the determination made by the foreign object determination unit 2048.

When the user decides that the detection sensitivity of the foreign object obtained by the determination of the foreign object determination unit 2048 is too low, the user inputs an operation signal to alter the threshold value that is used in the determination, so that a determination will be performed again with a higher detection sensitivity compared to the determination performed by the foreign object determination unit 2048. For example, the user may input an operation signal to reduce the threshold value C1 (see FIG. 16) concerning the size of the detection region, or an operation signal to increase the threshold value C2 concerning the ratio of the luminosity regarding the interior and the exterior of the detection region (i.e., make the threshold value C2 closer to 1) (see FIG. 16).

On the other hand, when the user decides that the detection sensitivity of the foreign object obtained by the determination of the foreign object determination unit 2048 is too high, the user inputs an operation signal to alter the threshold value that is used in the determination, so that a determination will be performed again with a lower detection sensitivity compared to the determination performed by the foreign object determination unit 2048. For example, the user may input an operation signal to increase the threshold value C1 (see FIG. 16) concerning the size of the detection region, or an operational signal to reduce the threshold value C2 concerning the ratio of the luminosity regarding the interior and the exterior of the detection region (i.e., make the threshold value C2 closer to 0) (see FIG. 16).

In step S2014 shown in FIG. 13B, the detection correction unit 2044 alters the threshold value used in the determination made in the foreign object determination unit 2048 according to the operation signal inputted to the calculation unit 2038 via the operation signal input unit 2032 and determines again whether or not the detection region is a portion corresponding to the foreign object. In other words, in step S2014, the detection correction unit 2044 uses the threshold value which was altered according to the operation signal, and corrects the determination performed in the first to fourth determination units 2064-2070 in the foreign object determination unit 2048.

For example, in step S2013, when an operation signal to reduce the threshold value C1 (see FIG. 16) concerning the size of the detection region is inputted, the detection correction unit 2044 corrects the determination made by the foreign object determination unit 2048 as described below. In other words, the detection correction unit 2044 reduces the threshold value C1 of the first determination unit 2064 according to the operation signal. Then, the detection correction unit 2044 makes the foreign object determination 2048 execute again the calculation II including steps S2008-S2011. The detection correction unit 2044 identifies the detection region, which was determined by the re-calculation to be a portion corresponding to the foreign object, to be a detection region which was determined again to be a portion corresponding to the foreign object.

In step S2015 shown in FIG. 13B, the detection correction unit 2044 updates what is displayed on the display unit 2036. In other words, based on the determination corrected by the detection correction unit 2044 the display unit 2036 displays the detection region which was determined again in step S2014 to be a portion corresponding to the foreign object in a manner such that the detection region overlaps with the photographed image.

The user refers to the display unit 2036, the content of which was updated in step S2015, and when the user decides that the detection result re-evaluated by the detection correction unit 2044 is appropriate, the user inputs an operation signal ending the re-evaluation of the detection region to the camera 2010. In this case, the detection correction unit 2044 proceeds with the operation of step S2016. In addition, when the user decides that the determination result re-evaluated by the detection correction unit 2044 is inappropriate, the user inputs an operation signal to the detection correction unit 2044 to re-execute the re-evaluation of the detection region. In this case, the detection correction unit 2044 re-executes the procedure concerning steps S2013-S2015.

In step S2016 shown in FIG. 13B, the detection correction unit 2044 outputs the threshold value used during the re-evaluation, and the position of the detection region determined in the re-evaluation to be a portion corresponding to the foreign object, and the like, to the memory unit 2030. The memory unit 2030 stores data such as the threshold value used during the re-evaluation, and the position of the detection region which was determined to be a portion corresponding to the foreign object and the like. Then, based on necessity, the memory unit 2030 may output the stored data to the determination standard alteration unit 2042.

In steps S2017-S2020 shown in FIG. 13B, the foreign object image correction unit 2050 of the calculation unit 2038 uses the information computed by the brightness information calculation unit 2054 to perform an image correction with respect to the detection region determined by the detection correction 2044 to be a portion corresponding to a foreign object, in order reduce the influence of the foreign object from the photographed image.

In step S2017, the foreign object image correction unit 2050 specifies the detection region that was determined by the detection correction unit 2044 to be a portion corresponding to the foreign object to be a region that will be corrected in order to reduce the influence of the foreign object from the photographed image. In step S2018, the color correction determination unit 2052 determines whether or not the photographed image that is about to be presently corrected has been non-linearly corrected by the image conversion unit 2015.

When it is determined in step S2018 that the photographed image has been non-linearly corrected, an image correction by the first to third image correction units 2074-2078 of the foreign object image correction unit 2050 is performed in steps S2019 and S2020. Here, in step S2019, the first to third image correction units 2074-2078 of the foreign object image correction unit 2050 uses the luminosity information computed by the brightness information calculation unit 2054, the color saturation information computed by the color saturation information calculation unit 2056, and the color phase information computed by the color phase information calculation unit 2058 to create a gain map of the region to be corrected. The first to third image correction unit 2074-2078 of the foreign object image correction unit 2050 uses the information computed by the information calculation unit 2046 and Equation (13) described above to create a luminosity transparency rate map, a color saturation transparency rate map, and a color phase transparency rate map.

In step S2020, the first to third image correction unit 2074-2078 of the foreign object image correction unit 2050 uses the luminosity transparency rate map, the color saturation transparency rate map, the color phase transparency rate map, and Equations (14)-(16) to perform a gain correction of the luminosity plane, the color saturation plane, and the color phase plane of the photographed image. Furthermore, the foreign object image correction unit 2050 creates a corrected photographed image by combining the luminosity plane, color saturation plane, and color phase plane which have been gain-corrected by the first to third image correction units 2074-2078.

When it is determined in step S2018 that the photographed image has not been non-linearly corrected, a normal correction using only the brilliance may be performed in steps S2019 and S2020.

In step S2021, a procedure is performed to save the corrected photographed image generated by step S2020, and the series of image processing operations is completed.

As described above, the image processing device according to the present embodiment comprises a foreign object determination unit 2048 which uses the brightness information of the detection region and the color saturation information of the detection region to determine whether or not the detection region is a portion corresponding to the foreign object shown in the photographed image. The foreign object determination unit 2048 evaluates the detection region by using not only the brightness information of the detection region but also the color saturation information. Therefore, the foreign object determination unit 2048 can precisely determine whether or not a foreign object is shown in the detection region. This is because of the feature that the foreign object shown in the photographed image has little influence on the color saturation and the color phase, but has a strong influence on the brightness. Further, the precision of the foreign object determination unit 2048 is also made possible because, in order to detect the change in color from the photographed image caused by the foreign object shown in the photographed image, it is effective to make the determination while combining the color saturation information and the brightness information.

Incidentally, the image processing device according to the present embodiment may more precisely determine whether or not a foreign object is shown in the detection region by evaluating the detection region by using the color phase information of the detection region in addition to the brightness information of the detection region and the color saturation information of the detection region. In addition, by making the determination using the brightness information of the region in the vicinity of the detection region and the standard deviation of the brightness of the region in the vicinity of the detection region, the image processing device according to the present embodiment may more precisely determine whether or not a foreign object is shown in the detection region. This is because, in a dark portion of the photographed image and a portion in which there is a large discrepancy in the luminosity, an edge of the photographed subject may be erroneously detected as an edge due to the foreign object being shown in the photographed image. Further, in these portions, even if an edge exists due to the foreign object being shown in the photographed image, it is relatively hard to distinguish. Further, after a determination is made based on a brightness information, the image processing device according to the present embodiment may make a determination based on a color saturation information or a color phase information. In this way, the image processing device according to the present embodiment can supplement or evaluate the determination based on the brightness information by using the color saturation information or the color phase information.

The image processing device according to the present embodiment comprises a detection correction unit 2044 which corrects the determination made by the foreign object determination unit 2048 based on the operation signal by the user. Therefore, the image processing device according to the present embodiment may detect the foreign object shown in the photographed image at a detection level that is in accordance with the preference of the user. In addition, the image processing device according to the present embodiment possesses a display unit 2036 which displays the detection result before and after the correction by the detection correction unit 2044. Therefore, it is possible to prevent erroneous detections of foreign objects as well as an omission in detecting a foreign object since the user can adjust the detection level by referring to what is displayed in the display unit 2036.

In addition, the image processing device according to the present embodiment comprises a determination standard alteration unit 2042 which alters an initial determination standard based on a corrected determination standard by the detection correction unit 2044. The initial determination standard is a determination standard used when the first to fourth determination units 2064-2068 of the foreign object determination unit 2048 makes a determination. The determination standard alteration unit 2042 can make the initial determination standard of the foreign object determination unit 2048 closer to the preference of the user of the camera 2010. Therefore, the image processing device according to the present embodiment can effectively detect a foreign object according to the preference of the user. Incidentally, the detection correction unit 2044 may correct the threshold value used when the region calculation unit 2062 generates a binary image. Further, the determination standard alteration unit 2042 may alter the threshold value used when the region calculation unit 2062 generates a binary format image. The image processing device according to the present embodiment may make the sensitivity of detecting the foreign object more appropriate by correcting the threshold value used when the region calculation unit 2062 generates a binary format image or by feeding back the threshold value.

The image processing device according to the present embodiment comprises a foreign object image correction unit 2050 which performs an image correction to reduce the influence of the foreign object shown in the photographed image by adding to the gain correction of the luminosity gain map, a gain correction by the color saturation gain map and/or a gain correction by the color phase gain map. Therefore, even in a case in which the photographed image that is to be corrected has been non-linearly corrected, the image processing device according to the present embodiment correct the change in the color due to foreign object shown in the photographed image, while maintaining a high degree of consistency with the color of the surrounding region. In addition, even in a case in which the photographed image that is to be corrected has been non-linearly corrected, the image processing device according to the present embodiment can prevent a correction vestige from being created on the photographed image after the correction is made.

Incidentally, in the above embodiment, a description of an imaging device has been given with a camera 2010 equipped with an image processing device as an example. However, an imaging device comprising an image processing device is not limited to a still camera and includes a video camera, a portable phone, and the like. In addition, a program for executing the image processing operation described above is not limited a program executed in a computer equipped on a still camera, a video camera, and a portable phone, and may includes a program which can be executed in a computer in order to perform other image processing operations.

Hereinafter, a fourth embodiment of the present invention is described with reference to the figures.

Figure 17:
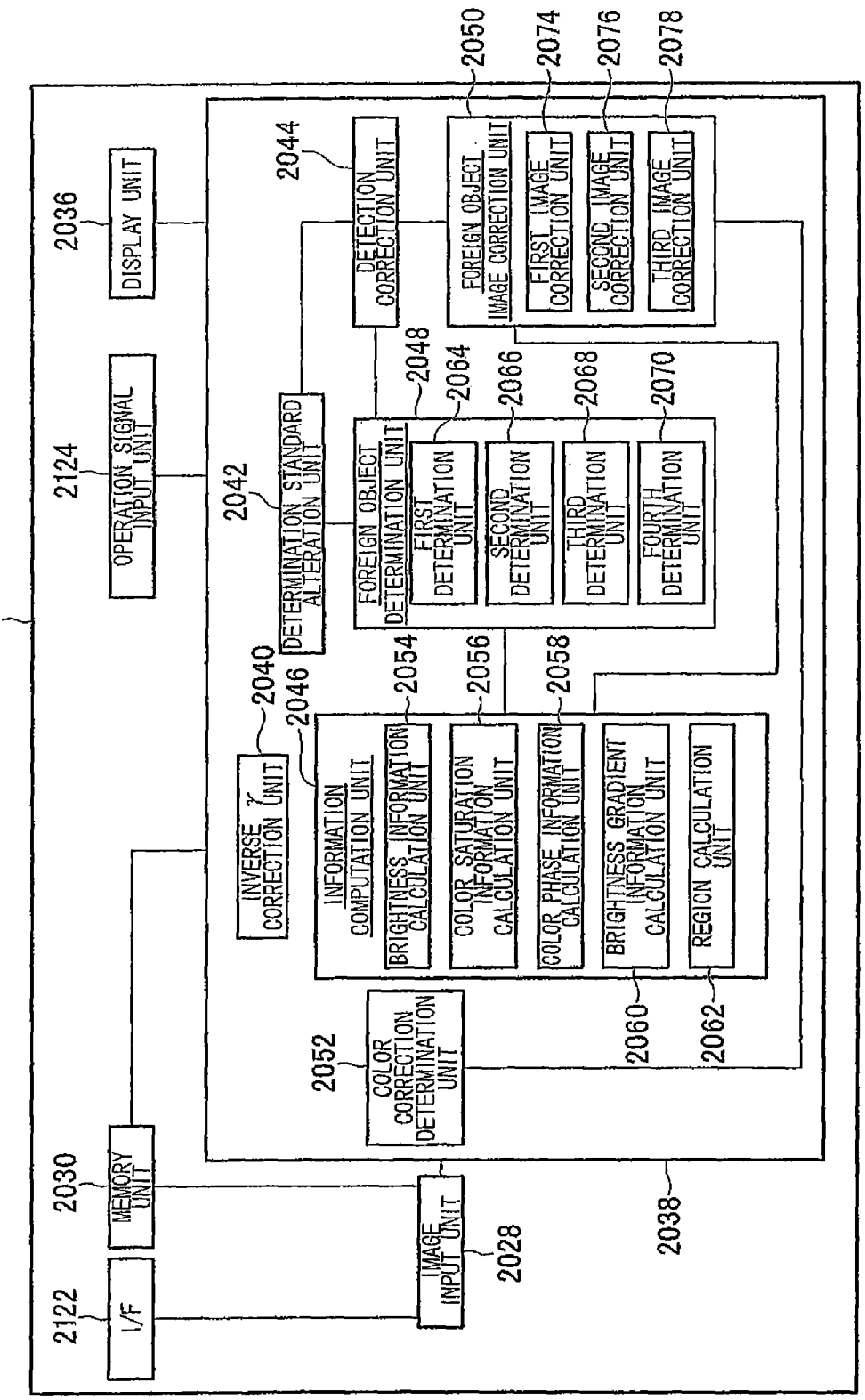
FIG. 17 is a block diagram of a computer comprising an image processing device according to a fourth embodiment of the present invention.

FIG. 17 is a block diagram of a computer 2120 such as a personal computer comprising an image processing device according to the present embodiment. The computer 2120 does not include an imaging unit 2026, an operation signal input unit 2032, an imaging condition signal input unit 2023, and an image conversion unit 2115. Instead, the computer 2120 includes, as shown in FIG. 17, an I/F (interface) 2122 and an operation signal input unit 2124. Other than the imaging unit 2026 shown in FIG. 12, the computer 2120 shown in FIG. 17 is configured in a manner similar to the camera 2010 shown in FIG. 12. Therefore, a configuration which is similar to that of the camera 2010 shown in FIG. 12 is indicated using the same reference numeral used in FIG. 12, and an explanation is omitted.

The computer 2120 comprises an I/F 2122 for connecting with a memory card, a camera, and a portable phone and the like. A photographed image is inputted to an image input unit 2028 of the computer 2120 from the I/F 2122 and/or a memory unit 2030 included in the computer 2120. Similar to the calculation unit 2038 of the camera 2010 in FIG. 12, a calculation unit 2038 shown in FIG. 17 performs a image process of a photographed image inputted via the image input unit 2028. Incidentally, the calculation unit 2038 may receive an input of the imaging conditions as well as the photographed image via the I/F 2122 and the like. The calculation unit 2038 may be a specialized circuit comprising an information calculation unit 2046 existing in the interior of the calculation unit 2038, a foreign object determination unit 2048, and a foreign object image correction unit 2050. However, it is preferred that the calculation unit 2038 include a memory unit, which stores a program for executing these features, and a central information processing device (CPU), which executes the program stored in the memory unit.

Similar to the operation signal input unit 2032 according to the third embodiment, the operation signal input unit 2124 is an input unit which receives an input of an operation signal corresponding to an operation performed by the user in order to identify the portion corresponding to the foreign object shown in the photographed image. Examples of the operation signal input unit 2124 includes a keyboard, a mouse, a touch pad, and the like. However, there is no particular limitation on the operation signal input unit 2124.

With respect to the photographed image inputted via the image input unit 2028, the calculation unit 2038 of the computer 2120 may detect a foreign object shown in the photographed image and perform an image correction reducing the influence of the foreign object shown in the photographed image, in a manner similar to the calculation unit 2028 according to the third embodiment. Therefore, an image processing device included in the computer 2120 attains an effect similar to an image processing device included in the camera 2010 according to the third embodiment.

Hereunder, a fifth embodiment of the present invention is described in detail with reference to the figures.

Figure 18:
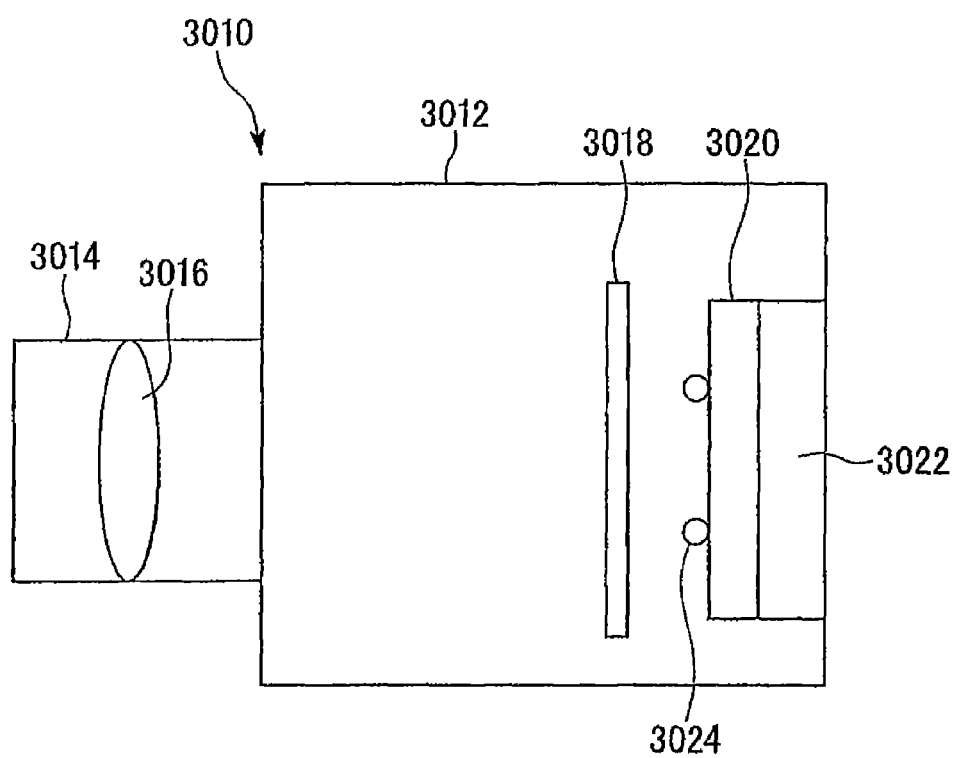
FIG. 18 is a skeletal cross-sectional diagram of a camera comprising an image processing device according to a fifth embodiment of the present invention.

FIG. 18 is a diagram showing a configuration of a camera 3010 comprising an image processing device according to the above embodiment. The camera 3010 comprises a lens tube part 3014 equipped with an optical system 3016 and the like. The camera 3010 also comprises a camera main body part 3012 equipped with an imaging element 3022 and the like. According to the present embodiment, a lens-exchange type camera is given as an example of an equipment comprising an image processing device. The lens-exchange type camera is such that the lens tube part 3014 can be freely attached to the camera main body part 3012 and can also be freely detached from the camera main body part 3012. However, it should be noted that an equipment comprising an image processing device according to the present embodiment is not limited to the lens-exchange type camera. For example, a camera such that the lens tube part 3014 is integrated with the camera main body part 3012, a video camera, a cellular phone, and a PC (personal computer) that can process an image data are also possibilities.

The camera main body part 3012, shown in FIG. 18, comprises a shutter 3018, an optical filter 3020, an imaging element 3022, and the like. The shutter 3018 adjusts the exposure time by blocking or letting through an imaging light from the optical system 3016 to the imaging element 3022. In addition, the optical filter 3020 comprises an optical low pass filter and the like, which prevents the occurrence of false colors (color moiré), for example.

The imaging element 3022 may obtain an image data by performing a photoelectric conversion on a light led by the optical system 3016. However, as shown in FIG. 18, when a foreign object 3024 such as litter and the like is attached to a component such as the optical filter 3020 through which the imaging light passes through and is present along an optical path of the imaging light, an image data obtained by the imaging element 3022 may include an image element influenced by the foreign object 3024 such as litter. An example of an image element influenced by the foreign object 3024 is an image element with a color (luminosity and the like) that is different from the original color in the imaging light due to the imaging light being blocked from passing through due to the foreign object 3024. A camera 3010 according to the present embodiment can, as described below, perform an imaging processing operation in which an image element influenced by the foreign object is detected. In addition, as described below, the camera 3010 can perform an image processing operation with respect to an image including an image element influenced by the foreign object 3024 by reducing the influence of the foreign object 3024 or eliminating the influence of the foreign object 3024.

Figure 19:
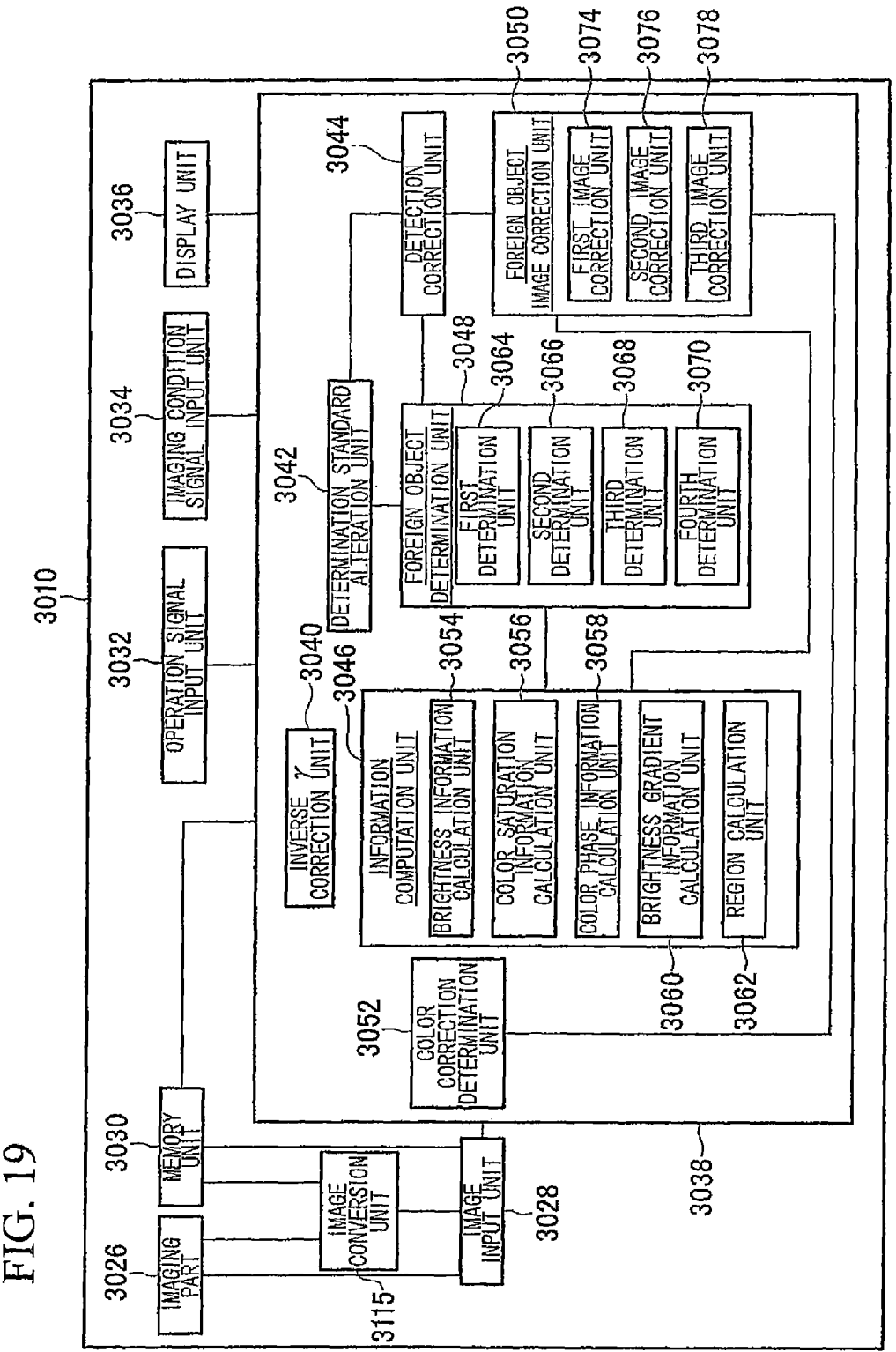
FIG. 19 is an overall block diagram of a camera shown in FIG. 18.

FIG. 19 is a skeletal block diagram indicating a configuration of an image processing device included in a camera 3010 shown in FIG. 18. The camera 3010 comprises an imaging part 3026, including an imaging element 3022 and the like shown in FIG. 18. The camera 3010 also comprises an image processing device which performs an image processing operation of an image taken by the imaging unit 3026 and the like. An image processing device included in the camera 3010 comprises, for example, an image conversion unit 3115, an image input unit 3028, a memory unit 3030, an operation signal input unit 3032, an imaging condition signal input unit 3034, a display unit 3036, a calculation unit 3038, and the like.

An image taken by the imaging unit 3026 is inputted into the image input unit 3028 in the form of an image data. An example of the image data is an ROB data. However, there is no particular limitation on the data format of the image. The image input unit 3028 outputs the inputted image to the calculation unit 3038. The calculation unit 3038 performs an image processing operation on the image inputted via the image input unit 3028. Incidentally, the image input unit 3028 may receive an input of, not only the image taken by the imaging unit 3026, but also an image taken by another imaging device. In addition, the image which undergoes an image processing operation performed by the calculation unit 3038 is not limited to an image taken by the imaging unit 3026, and may also include an image taken by another imaging device.

Furthermore, the image input unit 3028 receives an input of, not only an image obtained by undergoing a photoelectric conversion by the optical system 3016, but also an image that has already undergone an image processing operation by the image conversion unit 3115 by performing a γ correction and the like to the image. The image conversion unit 3115 performs, for example, an image processing operation such as a γ correction, a change in the format in which an image is saved, and a compression of a data, with respect to an image obtained by performing a photoelectric conversion of an image by the optical system 3016. As a result, when the image is displayed on a display device such as a liquid crystal display, the image conversion unit 3115 can correct the image so that the image is displayed more vividly, or is displayed with a more natural hue. In addition, as a result of the image conversion unit 3115 compressing the image, the camera can save a greater amount of images to a memory card and the like (not drawn in the diagram). An image processing performed by the image conversion unit 3115 with respect to an image includes a linear correction and a non-linear correction.

The calculation unit 3038 comprises an information calculation unit 3046, a foreign object determination unit 3048, and a foreign object image correction unit 3050. The information calculation unit 3046 may analyze an image and calculate data regarding a color of the image and the like. The foreign object determination unit 3048 may use data calculated by the information calculation unit 3046 and may determine whether or not a predetermined detection area is a portion corresponding to a foreign object such as a litter shown in the image. Furthermore, the foreign object image correction unit 3050 identifies a portion corresponding to a foreign object shown in the image based on a determination by the foreign object determination unit 3048, and may perform an image processing operation to the image reducing the influence of the foreign object. In addition, the foreign object image correction unit 3050 may use data calculated by the information calculation unit 3046, and may perform an image processing operation reducing the influence of the foreign object.

The information calculation unit 3046 comprises a brightness information calculation unit 3054, a color saturation information calculation unit 3056, a color phase information calculation unit 3058, a brightness gradient information calculation unit 3060, and a region calculation unit 3062. Each calculation component 3054, 3056, 3058, 3060, and 3062 included in the information calculation unit 3046 performs an arithmetic processing on the image, and outputs data for each calculation component 3054, 3056, 3058, 3060, and 3062.

The brightness information calculation unit 3054 calculates a brightness information corresponding to a brightness of an image. The brightness information calculated by the brightness information calculation unit 3054 may be a brilliance information of the image, a luminosity information of the image, or both the brilliance information and the luminosity information.

The brightness information calculation unit 3054 uses, for example, Equation (18) below, and calculates a brilliance value Y for each image element based on an RGB value for each image element of the image.

Equation (18)

$$Y=(0.299\times R+0.589\times G+0.114\times B)/255 \quad (18)$$

In addition, the brightness information calculation unit 3054 creates a brilliance plane corresponding to the image, based on the brilliance value Y of the image element. Therefore, the brilliance information computed by the brightness information calculation unit 3054 includes the brilliance value Y of each image element, the position of each image element, and a brilliance plane comprising the brilliance value Y.

The brightness information calculation unit 3054 may calculate a brightness information instead of the brilliance information, or in addition to the brilliance information. The luminosity information may be obtained by performing an HSV conversion on the RGB data. The HSV conversion is a process in which an ROB data is converted to a color phase (Hue), a color saturation (Saturation), and a luminosity (Value). The luminosity V, the color phase H, and the color saturation S for each image element of the image may be obtained from the RGB value of each image element according to equations (19-1) to (19-10) below.

Equations (19-1)-(19-10)

$$V=Vmax \quad (19\text{-}1)$$

$$S=(Vmax-Vmin)/Vmax \quad (19\text{-}2)$$

$$H=(\pi/3)(b-g)(\text{when } R=Vmax) \quad (19\text{-}3)$$

$$H=(\pi/3)(2+r-b)(\text{when } G=Vmax) \quad (19\text{-}4)$$

$$H=(\pi/3)(4+g-r)(\text{when } B=Vmax) \quad (19\text{-}5)$$

Here, $$Vmax=max\{R,G,B\} \quad (19\text{-}6)$$

$$Vmin=min\{R,G,B\} \quad (19\text{-}7)$$

$$r=(Vmax-R)(Vmax-Vmin) \quad (19\text{-}8)$$

$$g=(Vmax-G)(Vmax-Vmin) \quad (19\text{-}9)$$

$$b=(Vmax-B)(Vmax-Vmin) \quad (19\text{-}10)$$

Incidentally, when a conversion is performed based on Equations (19-3) to (19-5) and H<0, then $2\pi$ is added to H. Further, when Vmax=0, then S=0, and H=(indefinite).

The brightness information calculation unit 3054 uses the above Equations (19-1) and (19-6), and computes a luminosity value V for each image element from the ROB value of each image element of the image. In addition, the brightness information calculation unit 3054 creates a brightness plane corresponding to the image plane, based on the luminosity value V of an image element. Therefore, the luminosity information computed by the brightness information calculation unit 3054 includes the luminosity value V of each image element, the position of each image element, and a luminosity plane created by the luminosity value V.

The color saturation information calculation unit 3056 calculates a color saturation information corresponding to a color saturation of an image. The color saturation information calculation unit 3056 uses, for example, Equations (19-2), (19-6), and (19-7) shown above, and calculates the color saturation S of each image element from the RGB value of each image element of the image. In addition, the color saturation information calculation unit 3056 creates a color saturation plane corresponding to the image plane, based on the color saturation S of the image element. Therefore, the color saturation information computed by the color saturation information calculation unit 3056 includes the color saturation S of each image element, the position of each image element, and a color saturation plane created based on the color saturation S.

The color phase information calculation unit 3058 calculates a color phase information corresponding to a color phase of the image. The color phase information calculation unit 3058 uses, for example, Equations (19-3) through (19-5) and Equations (19-6) through (19-10), and calculates the color phase H of each image element from the ROB value of each image element of the image. In addition, the color phase information calculation unit 3058 creates a color phase plane corresponding to the image plane, based on the color phase II of the image element. Therefore, the color phase information calculated by the color phase information calculation unit 3058 includes the color phase IT of each image element, the position of each element, and a color phase plane created by the color phase H.

The brightness gradient information calculation unit 3060 calculates a brightness gradient information corresponding to a gradient of a brightness of the image from the brilliance plane or the luminosity plane computed by the brightness information calculation unit 3054. Examples of the brightness gradient information computed by the brightness gradient information calculation unit 3060 include a brilliance gradient information and a luminosity gradient information.

In this case, it is preferable that the brightness gradient information calculation unit 3060 compute a brightness gradient information based on a brilliance plane or a luminosity plane processed with an inverse γ correction by the inverse γ correction unit 3040. Since the image is often saved in a γ-corrected condition in accordance with a display device and the like, there is a high possibility that a γ correction is performed for an image which is inputted to the calculation unit 3038 via the image input unit 3028. Therefore, as a result of the inverse γ correction unit 3040 performing an inverse γ correction on the brilliance plane and the luminosity plane, these brightness information may be made closer to the original brightness information of the RAW data.

Referring to a brilliance plane and a luminosity plane before an inverse γ correction as YP1 and VP1 respectively, and referring to a brilliance plane and a luminosity plane after an inverse γ correction as YP2 and VP2 respectively, an inverse γ correction performed by the inverse γ correction unit 3040 is expressed as follows in Equations (20-1) and (200-2).

Equations (20-1), (20-2)

$$YP1=(YP1)^{\gamma} \quad (20\text{-}1)$$

$$VP1=(VP1)^{\gamma} \quad (20\text{-}2)$$

The brightness gradient information calculation unit 3060 computes a brightness gradient value Vgrad(i, j) for each position (image element) within the image based on, for example, the luminosity plane VP2. The brightness gradient information calculation unit 3060 applies a differential filter in the longitudinal direction and the lateral direction with respect to the luminosity plane VP2, computes a differential $\Delta yf(i, j)$ in the longitudinal direction and a differential $\Delta xf(i, j)$ in the lateral direction, and computes the luminosity gradient value Vgrad(i, j) for each position using the computed differentials. Referring to the luminosity value V of each image element included in the luminosity plane VP2 as V(i, j), the luminosity gradient value Vgrad(i, j) is computed according to the following Equations (21-1)-(21-3).

Equations (21-1)-(21-3)

$$\Delta_x f(i,j) = V(i,j) - V(i-1,j) \quad (21\text{-}1)$$

$$\Delta_y f(i,j) = V(i,j) - V(i,j-1) \quad (21\text{-}2)$$

$$V\text{grad}(i,j) = \sqrt{(\Delta_x f(i,j))^2 + (\Delta_y f(i,j))^2} \quad (21\text{-}3)$$

Here, "i" in Equations (21-1)-(21-3) represents a position of the image element in the lateral direction, while "j" represents a position of the image element in the longitudinal direction. The brightness gradient information calculation unit 3060 creates a luminosity gradient plane corresponding to the image plane based on the luminosity gradient value Vgrad (i, j) of each position. Therefore, the luminosity gradient information computed by the brightness gradient information calculation unit 3060 includes the luminosity gradient value Vgrad(i, j) and the luminosity gradient plane.

In addition, the brightness gradient information calculation unit 3060 may compute a brilliance gradient information instead of the luminosity gradient information or in addition to the luminosity gradient information based on the brilliance plane YP2. The brilliance gradient information includes the brilliance gradient value Ygrad(i, j) and the brilliance gradient plane. The brilliance gradient information is computed similar to the luminosity gradient information as described above.

The region calculation unit 3062 calculates a detection region in order to detect whether or not a foreign object is shown. The region calculation unit 3062 may compute the detection region by using, for example, a brightness gradient information computed by the brightness gradient information calculation unit 3060.

As long as the detection region is a part of the image, there is no particular limitation on the detection region. However, it is preferable that the detection region is set to a region in which there is a high possibility that a foreign object is shown. Here, according to the luminosity gradient plane computed by the brightness gradient information calculation unit 3060, a portion corresponding to an edge of the photographed subject or a portion in which a foreign object is shown tend to have a relatively large luminosity gradient value Vgrad (i, j). On the other hand, a portion corresponding to a vacant space or an inner part of the photographed subject tends to have a relatively small luminosity gradient value Vgrad (i, j).

Thus, the region calculation unit 3062 according to the present embodiment may compute a binary format image in which the luminosity gradient plane is expressed in a binary format, and set a continuous region, in which image elements with a high luminosity gradient value Vgrad (i, j) is linked, as a detection region. In other words, the region calculation unit 3062 sets a predetermined threshold value with respect to the luminosity gradient plane, replaces the value of the image element having a luminosity gradient value greater than the threshold value to "1," replaces the value of the image element having a luminosity gradient value less than the threshold value to "0," and thus computes a binary format image.

Moreover, based on the computed binary format image, the region calculation unit 3062 extracts the image element with the value "1," and sets the image elements with the value "1" as the detection region. As long as image elements with the value "1" are positioned continuously, the region calculation unit 3060 specifies the cluster of image elements as one detection region. Meanwhile, when a cluster of image elements with the value "1" is linked with another cluster of image elements with the value "1" via an image element with the value "1," the region calculation unit 3062 specifies these two regions as separate detection regions.

As described above, the region calculation unit 3062 may compute a detection region from the luminosity gradient plane. At the same time, the region calculation unit 3062 may compute a detection region from the brilliance gradient plane computed by the brightness information calculation unit 3054. The region calculation unit 3062 may compute the detection region by computing a binary format image from the brilliance gradient plane in a manner similar to the luminosity gradient plane.

The foreign object detection unit 3048 uses each information computed by the information calculation unit 3046, and determines whether or not each detection region is a portion corresponding to a foreign object shown in the image. The foreign object detection unit 3048 includes a first determination unit 3064, a second determination unit 3066, a third determination unit 3068, and a fourth determination unit 3070. The first to fourth determination units 3064-3070 each uses a separate determination standard and determines whether or not a detection region being evaluated is a portion corresponding to a foreign object shown in the image.

The first determination unit 3064 determines whether or not a detection region is a portion corresponding to a foreign object shown in the image, based on the size of the detection region that is being evaluated. According to an image processing device based on the present embodiment, the detection region and the size of the detection region that is being evaluated by the foreign object determination unit 3048 is computed by the region calculation unit 3062 using the brightness gradient information computed by the brightness gradient information calculation unit 3060. Therefore, when the region calculation unit 3062 is computing the detection region based on the brilliance gradient plane, for example, the first determination unit 3064 performs the determination using information such as the brilliance gradient value of each image element and the like. Meanwhile, when the region calculation unit 3062 is computing the detection region from the luminosity gradient plane, the first determination unit 3064 performs the determination using information such as the luminosity gradient information of each image element and the like.

As long as the size of the detection region computed by the region calculation unit 3062 is within a predetermined range, the first determination unit 3064 may determine that the detection region is a portion corresponding to the foreign object shown in the image. In addition, when the size of the detection region computed by the region calculation unit 3062 is large enough to exceed a predetermined range or is smaller than a predetermined range, the first determination unit 3064 may determine that the detection region is not a portion corresponding to a foreign object shown in the image.

The range of the size of the detected region, with which the first determination unit 3064 uses to determine that a foreign object is shown in the detected region, is set according to the size of the image and the conditions in which the image was photographed. An example of the lower limit value is 25 pixels, and an example of the upper limit value is 300 pixels.

The second determination unit 3066 uses the color saturation information corresponding to the color saturation of the detection region and determines whether or not the detection region is a portion corresponding to a foreign object shown in the image. The second determination unit 3066 may use the color saturation value S computed by the color saturation information calculation unit 3056 and the color saturation plane to determine whether or not the detected region is a portion corresponding to a foreign object shown in the image. The second determination unit 3066 according to the present embodiment examines the difference between the first color saturation information corresponding to the color saturation of the detection region and the second color saturation information corresponding to the color saturation of a region in the vicinity of the detection region. When the difference between the first color saturation information and the second color saturation information is within a predetermined range, the second determination unit 3066, the second determination unit 3066 determines that the detection region which is being evaluated is a portion corresponding to the foreign object. Further, when the difference between the first color saturation information and the second color saturation information is not within a predetermined range, the second determination unit 3066 may determine that the detection region that is being evaluated is not a portion corresponding to the foreign object.

Here, the first color saturation information may be set as, for example, an average value of the color saturation value S of the image elements included in the detection region. In addition, the second color saturation information may be set as an average value of the color saturation value S of an image element of a region in the vicinity of the detection region. An example of a region in the vicinity of the detection region is a region surrounding the detection region while contacting the outer peripheral of the detection region. The size of the region in the vicinity of the detection region may be roughly the same as the detection region.

There is no particular limitation on the numerical range with which the second determination unit 3066 determines that the detection region that is being evaluated is a region in which the foreign object is shown. In addition, the numerical range, according to which it is determined that a foreign object is shown in a region, may be set based on the magnitude (absolute value) of the difference in the color saturation value S. Alternatively, the numerical range may be set based on a ratio of the first color saturation information and the second color saturation information.

For example, when the average value S1 of the color saturation value S of the image element included in the detection region is 0.95-2 times the average value S2 of the color saturation value S of the image element of the region in the vicinity of the detection region, the second determination unit 3066 determines that the detection region which is being evaluated is a region in which the foreign object is shown. This is because, when an object is shown in the image not as a litter but as a photographed subject, the object strongly influences the color saturation information, whereas a foreign object shown in the image hardly influences the color saturation. Therefore, when the litter is not shown in the detection region, the difference between the first color saturation information and the second color saturation information is large. On the other hand, when a litter is shown in the detection region, the difference between the first color saturation information and the second color saturation information is small.

The second determination unit 3066 may determine whether or not the detection region is a portion corresponding to a foreign object shown in the image using not only the color saturation information as described above, but also a brightness information corresponding to the brightness of the detection region. When a determination is made using the brightness information, the second determination unit 3066 may use the brightness value V computed by the brightness information calculation unit 3054 and the luminosity plane to determine whether or not the detection region is a portion corresponding to a foreign object shown in the image. In addition, the second determination unit 3066 may determine whether or not the detection region is a portion corresponding to a foreign object shown in the image by using a brilliance value Y computed by the brightness information calculation unit 3054 and the brilliance plane.

The second determination unit 3066 according to the present embodiment examines, for instance, the difference between a first luminosity information corresponding to the luminosity of the detection region and a second luminosity information corresponding to the luminosity of the region in the vicinity of the detection region. When the difference between the first luminosity information and the second luminosity information is not within a predetermined range, the second determination unit 3066 determines that the detection region which is being evaluated is a portion corresponding to the foreign object.

Here, the first luminosity information may be set, for example, as an average value of the luminosity value V of the image element included in the detection region. Further, the second luminosity information may be set as the average value of the luminosity value V of the image element in the region in the vicinity of the detection region. For example, when the average value V1 of the luminosity value V of the image element included in the detection region is less than 0.975 times the average value V2 of the luminosity value V of the image element of the region in the vicinity of the detection region, the second determination unit 3066 determines that a foreign object is shown in the detection region which is being evaluated. This is because, when a foreign object is shown, the color saturation and the color phase are hardly affected, whereas the brightness is strongly influenced by the presence of the foreign object.

Moreover, the second determination unit 3066 may determine whether or not the detected region is a portion corresponding to a foreign object shown in the image by using a color phase information corresponding to the color phase of the detection region in addition to using the determination made based on the color saturation information. When the color phase information is used to perform the determination, the second determination unit 3066 may use the color phase value H computed by the color phase information calculation unit 3058 and the color phase plane to determine whether or not the region is a portion corresponding to a foreign object shown in the image.

The second determination unit 3066 according to the present embodiment, for example, examines the difference between a first color phase information corresponding to the color phase of the detection region and a second color phase information corresponding to the color phase of the region in the vicinity of the detection region. When the difference between the first color phase information and the second color phase information is within a predetermined range, the second determination unit 3066 determines that the detection region which is being evaluated is a portion corresponding to the foreign object.

Here, a first color phase information may be set as an average value of the color phase value H of the image element included in the detection region. In addition, the second color phase information may be set as an average value of the color phase value H of the image element in the region in the vicinity of the detection region. For example, when the average value H1 of the color phase value H of the image element included in the detection region is 0.94-1.06 times the average value H2 of the color phase value H of the image element in the region in the vicinity of the detection region, the second determination unit 3066 determines that the detection region which is being evaluated is a region in which a foreign object is shown. This is because an object shown in the image not as a litter but as a photographed subject strongly influences the color phase information, whereas, a foreign object shown in the image hardly influences the color phase.

When the second luminosity information corresponding to the brightness of the region in the vicinity of the detection region is not within a predetermined range, the third determination unit 3068 determines that the detection region which is being evaluated is not a portion corresponding to the foreign object. In addition, when the second luminosity information corresponding to the luminosity of the region in the vicinity of the detection region is within a predetermined range, the third determination unit 3068 determines that the detection region which is being evaluated is a portion corresponding to the foreign object. Examples of the brightness information used by the third determination unit 3068 includes the second luminosity information, which is an average value of the luminosity value V of the image element of the region in the vicinity of the detection region, and the second brilliance information, which is an average value of the brilliance value Y of the image element of the region in the vicinity of the detection region.

For example, when the average value V2 of the luminosity value V of the image element included in the region in the vicinity of the detection region is less than or equal to 60, the third determination unit 3068 determines that the detection region is not a portion corresponding to the foreign object. This is because, when the brightness of the region in the vicinity of the detection region is less than a predetermined value, the influence to the image exerted by the foreign object shown in the object is considered to be small, even though a foreign object is shown in the detection region.

When the standard deviation of the brightness of the region in the vicinity of the detection region is not within a predetermined range, the fourth determination unit 3070 determines that the detection region which is being evaluated is not a portion corresponding to the foreign object. Meanwhile, when the standard deviation of the brightness of the region in the vicinity of the detection region is within a predetermined range, the fourth determination unit 3070 determines that the detection region which is evaluated is not a portion corresponding to the foreign object. Examples of the standard deviation of the brightness of the region in the vicinity of the detection region includes the standard deviation of the luminosity value V of the image element of the region in the vicinity of the detection region, and a standard deviation of the brilliance value Y of the image element of a region in the vicinity of the detection region.

For example, the fourth determination unit 3070 computes the standard deviation Vstd of the brightness of the region in the vicinity of the detection region based on the luminosity value V(i, j) of the image element included in the region in the vicinity of the detection region, as well as the average value V2 of the luminosity value V(i, j) of the image element included in the region in the vicinity of the detection region, by using Equation (22) below.

Equation (22)

$$Vstd = \sqrt{\frac{1}{n-1} \sum_{1}^{n} (V(i,j) - V2)^2} \quad (22)$$

Here, "n" in Equation (22) indicates the number of image elements included in the region in the vicinity of the detection region. The threshold value based on which the fourth determination unit 3070 determines whether or not a foreign object is shown in the detection region is set appropriately according to the condition in which the image is photographed. For example, when the standard deviation Vstd of the brightness of the region in the vicinity of the detection region is greater than or equal to 0.6, the fourth determination unit 3070 may determine that the detection region is not a portion corresponding to a foreign object shown in the image. This is because, when the standard deviation of the brightness of the region in the vicinity of the detection region is large, it is highly likely that a high luminosity gradient value or a brilliance gradient value in the detection region is obtained not due to the foreign object being shown, but due to the photographed subject light.

The fourth determination unit 3070 may compute the standard deviation of the brightness of the region in the vicinity of the detection region based on the brilliance value Y of the image element included in the region in the vicinity of the detection region. Even when the standard deviation computed from the brilliance information is used, the fourth determination unit 3070 may determine whether or not the detection region which is being evaluated is a portion corresponding to the foreign object, in a manner similar to the case in which the standard deviation was computed using the luminosity information.

As described above, each of the first to fourth determination units 3064-3070 included in the foreign object determination unit 3048 may independently determine whether or not the detection region that is being evaluated is a portion corresponding to the foreign object shown in the image. The foreign object determination unit 3048 may output all of the determination result of the first to fourth determination units 3064-3070 to the detection correction unit 3044 and the foreign object image correction unit 3050. In addition, the foreign object determination unit 3048 may use the determination result of the first to fourth determination unit 3064-3070 and make a comprehensive determination on whether or not a foreign object is shown in each detection region. The foreign object determination unit 3048 may further output the result of the comprehensive determination to the detection correction unit 3044 and the foreign object image correction unit 3050.

For example, when one or more of the first to fourth determination units 3064-3070 determines that the detection region which is being evaluated is not a portion corresponding to the foreign object, the foreign object determination unit 3048 makes a comprehensive determination that the detection region which is being evaluated is not a portion corresponding to the foreign object. Alternatively, when all of the first to fourth determination units 3064-3070 determine that the detection region which is being evaluated is a portion corresponding to the foreign object, the foreign object determination unit 3048 makes a comprehensive determination that the detection region which is being evaluated is a portion corresponding to the foreign object.

The foreign object image correction unit 3050 performs a correction on the portion corresponding to the foreign object shown in the image in order to reduce the influence of the foreign object by using the determination result of the foreign object determination unit 3048 and the data computed by the information calculation unit 3046. In addition, the foreign object image correction unit 3050 may perform a correction to reduce the influence of the foreign object on the image based not on the determination result of the foreign object determination unit 3048 but based on a correction result which is a determination result which is corrected by the detection correction unit 3044.

The detection correction unit 3044 may correct the determination of the foreign object determination unit 3048 according to the operation signal entered by the calculation unit 3038 via the operation signal input unit 3032. For example, the detection correction unit 3044 corrects at least one of the threshold values used in the first to fourth determination unit 3064-3070 of the foreign object determination unit 3048 based on the operation signal. In this way, the detection correction unit 3044 again determines whether or not the detection region is a portion corresponding to the foreign object, and can correct the determination of the foreign object determination unit 3048.

Figure 22:
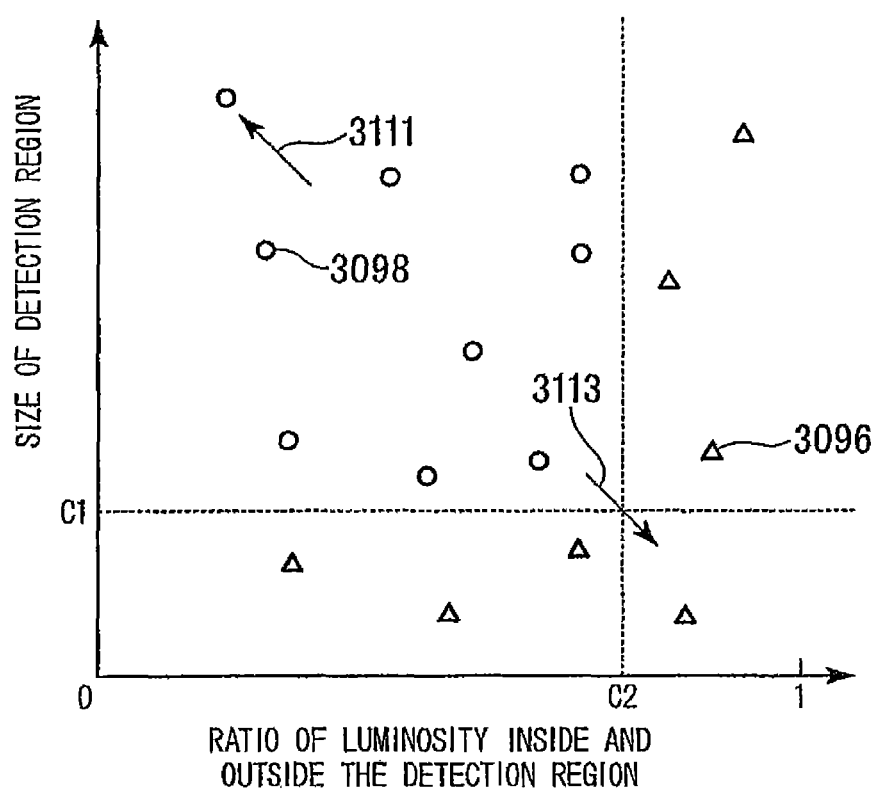
FIG. 22 is a conceptual diagram showing an adjustment process of a foreign object detection level of an image processing device according to the above embodiment.

FIG. 22 is a conceptual diagram showing a correction process of the decision executed by the detection correction unit 3044. FIG. 22 plots the detection region computed by the region calculation unit 3062 according to the size of the detection region and the ratio of the luminosity of the interior and the exterior of the detection region (the ratio of the first luminosity information and the second luminosity information). The circle 3098 and the triangle 3096 in FIG. 22 each corresponds to one detection region. Here, the circle 3098 corresponds to a detection region which is determined again by the detection correction unit 3044 to be a portion corresponding to the foreign object. Further, the triangle 3096 corresponds to a detection region which is determined again by the detection correction unit 3044 not to be a portion corresponding to the foreign object.

According to the example shown in FIG. 22, the detection correction unit 3044 shown in FIG. 19 corrects the determination made by the first determination unit 3064 (a determination based on the size of the detection region) and the determination made by the second determination unit 3066 (a determination based on the difference between the luminosity of the detection region and the luminosity of the region in the vicinity of the detection region). The detection correction unit 3044 may alter the threshold value C1 concerning how large the detection region is, as well as the threshold value C2 concerning the ratio of the luminosity in the interior and exterior of the detection region, based on an operational signal. This is because the threshold value C1 concerning the size of the detection region and the threshold value C2 concerning the ratio of the luminosity of the interior and the exterior of the detection region have a large influence on the detection sensitivity.

Here, among the detection region indicated by the triangle 3096 and the circle 3098 in FIG. 22, those plotted in the upper left direction indicated by the arrow 3111 are considered to be the portion corresponding to the foreign object that has a salient influence on the image. This is because, the larger the size of the detection region and the greater the difference between the luminosity of the detection region and the region in its vicinity is large (the ratio of the luminosity (first luminosity information/second luminosity information) is small), the more salient the detection region is likely to be. On the other hand, the detection region plotted in the lower right direction indicated by the arrow 3113 is considered to have a small influence on the photographed image. This is because, the smaller the size of the detection region determined to be the foreign object, and the smaller the difference between the luminosity of the detection region and the luminosity of the region in the vicinity of the detection region, the less salient the detection region is.

The detection correction unit 3044 shown in FIG. 19 may increase the threshold value C1 indicated in FIG. 22 according to the operational signal from the input unit 3032. As a result, the detection correction unit 3044 determines again that only the detection region larger than the threshold value C1 is a portion corresponding to a foreign object. In this way, the incidence of erroneous detection of the foreign object is reduced. Meanwhile, the detection correction unit 3044 may decrease the threshold value C1 indicated in FIG. 22 according to the operational signal from the input unit 3032. As a result, it is possible to reduce the incidence of failing to detect a foreign object. Furthermore, the detection correction unit 3044 may adjust the detection sensitivity as in the case of the threshold C1, by increasing and decreasing the threshold value C2 according to the operational signal.

The detection correction unit 3044 may independently alter the values of the threshold C1 and the threshold C2. However, the detection correction unit 3044 may also alter the values of the threshold C1 and the threshold C2 according to a parameter using a predetermined function (such as a linear function and the like) in which the threshold value C1 and the threshold value C2 are variables. The threshold variable that the detection correction unit 3044 alters is not limited to the threshold value C1 concerning the size of the detection region nor the threshold value C2 concerning the ratio of the luminosity of the interior and the exterior of the detection region.

For example, a threshold value that the detection correction unit 3044 changes may be a threshold value concerning the color saturation S of the second determination unit 3066, a threshold value concerning the brilliance Y of the second determination unit 3066, a threshold value concerning the color phase H of the second determination unit 3066, a threshold value concerning a luminosity V of the region in a surrounding region according to the third determination unit 3068, or a threshold value concerning a standard deviation Vstd of a brightness of a surrounding region according to the fourth determination unit 3070. In addition, the detection correction unit 3044 may change the computation result and the determination result of the information calculation unit 3046 and the foreign object determination unit 3048 by changing the threshold value concerning the luminosity gradient value Vgrad (i, j) of the region calculation unit 3062. The detection correction unit 3044 corrects the determination result of the foreign object determination unit 3048 by changing these threshold values. As a result, the image processing device according to the present embodiment may perform a detection of foreign objects in accordance with the preference of the user.

The detection correction unit 3044 may display to the display unit 3036, the determination result of the foreign object determination unit 3048 and/or the position of the detection region which is determined again by the detection correction unit 3044 to be a portion corresponding to a foreign object, in a manner such that the determination result and/or the position of the detection region overlap with the photographed image. As a result, the user of the camera 3010 may obtain a visual representation of the sensitivity with which the image processing device detects a foreign object, and can make the detection correction unit 3044 correct a determination according to the preference of the user. In addition, the detection correction unit 3044 may receive an input of the operation signal. The operation signal corrects the determination of whether the detection region is a portion corresponding to the foreign object. This correction is made as the user directly specifies and corrects the position of the detection region in the photographed image. As a result, the detection correction unit 3044 may correct the determination in better alliance with the preference of the user.

In addition, the detection correction unit 3044 may output to the memory unit 3030, a corrected determination standard which is a determination standard that has been corrected, or a data (i.e., a foreign object map) created by reflecting a correspondence of the determination of the detection correction unit 3044 to the data of the detection region as shown in FIG. 22. The corrected determination standard includes the threshold value C1 and the threshold value C2. In addition, the data reflecting a correspondence of the determination result of the detection correction unit 3044 to the data of the detection region includes a categorization of the detection region as shown in FIG. 22, a value of the size or the luminosity ratio of the detection region, and the position of the detection region. The memory unit 3030 may store the corrected determination standard, which has undergone a correction process by the detection correction unit 3044, and/or the data of the detection region, and outputs to the determination standard alteration unit 2042 based on need.

The determination standard alteration unit 3042 may alter an initial determination standard based on the corrected determination standard. The initial determination standard is a determination standard used when the first to fourth determination units 3064-3068 of the foreign object determination unit 3048 performs a determination based on the corrected determination standard. The determination standard alteration unit 3042 may alter the initial determination standard of the foreign object determination unit 3048 so that the initial determination standard becomes closer to the corrected determination standard.

The initial determination standard is a determination standard concerning a determination performed by the foreign object determination unit 3048 before the detection correction unit 3044 performs a correction. The corrected determination standard is a determination standard used when the detection correction unit 3044 performs a corrected determination. Therefore, the determination standard alteration unit 3042 may make the initial determination standard of the foreign object determination unit 3048 closer to the preference of the user of the camera 3010. Therefore, according to the image processing device based on the present embodiment, the foreign object may be detected efficiently according to the preference of the user. Incidentally, the determination standard alteration unit 3042 may compute an average value of a plurality of corrected determination standard stored in the memory unit 3030. Then, the determination standard alteration unit 3042 may alter the initial determination standard of the foreign object determination unit 3048 based on the average value of the corrected determination standard.

In addition, the determination standard alteration unit 3042 may alter the initial determination standard of the foreign object determination unit 3048 by using an accumulated data. The accumulated data is obtained by accumulating a data, created by reflecting the determination result of the detection correction unit 3044 to the data of the detection region, for over a plurality of determinations. For example, the determination standard alteration unit 3042 computes from the accumulated data of the foreign object map, a range such that a portion of a detection region (the circle 3098 of FIG. 22) determined to be a portion corresponding to a foreign object is greater than a portion of a detection region (the triangle 3096 of FIG. 22) determined not to be a portion corresponding to the foreign object. Further, the determination standard alteration unit 3042 alters the initial determination standard of the foreign object determination unit 3048 based on a range computed from the accumulated data of the foreign object map. As a result, the determination standard alteration unit 3042 can make the initial determination standard of the foreign object determination unit 3048 closer to the preference of the user of the camera 3010.

The foreign object image correction unit 3050 performs an image correction on the portion corresponding to the foreign object shown in the photographed image in order to reduce the influence of the foreign object. The foreign object image correction unit 3050 performs the image correction based on the determination made by the foreign object determination unit 3048 and a determination corrected by the detection correction unit 3044. The foreign object image correction unit 3050 according to the present embodiment comprises a first image correction unit 3074, a second image correction unit 3076, and a third image correction unit 3078.

The first image correction unit 3074 may perform a first correction on the portion corresponding to the foreign object shown in the photographed image in order to reduce the influence of the foreign object, using the luminosity information computed by the brightness information calculation unit 3054. The first image correction unit 3074 performs a first image correction using the luminosity plane and the luminosity V of each image element computed by the brightness information calculation unit 3054.

The first image correction unit 3074 performs a standardization (normalization) procedure of a regional luminosity V. Thus, the first image correction unit 3074 computes a luminosity transparency rate signal VT (i, j) for the detection region that will be corrected. In this way, the first image correction unit 3074 creates a luminosity transparency rate map (luminosity gain map) for the detection region that will be corrected. Here, the detection region that will be corrected by the first image correction unit 3074 is a detection region determined to be a portion corresponding to the foreign object by the foreign object determination unit 3048 or the detection correction unit 3044.

The luminosity transparency rate signal VT (i, j) is obtained by calculating a relative ratio between the luminosity V (i, j) of the image element of interest (i, j) (hereinafter may also referred to as an attention image element or a pixel of interest) in the detection region and an average value of a luminosity of a local region including the image element of interest (i, j). Thus, the first image correction unit 3074 according to the present embodiment may compute the luminosity transparency rate signal VT (i, j) according to the Equation (23) below.

Equation (23)

$$VT(i, j) = \frac{V(i, j)}{\left(\sum_{m=i-\alpha}^{i+\alpha} \sum_{m=j-\beta}^{j+\beta} V(i+m, j+n)\right) / (2\alpha + 1)(2\beta + 1)} \quad (23)$$

In Equation (23) above, $\alpha$ and $\beta$ correspond to a range used to obtain the local average. $\alpha$ indicates the number of image elements spreading out in the left and right directions from the image element of interest (i, j). $\beta$ indicates the number of image elements spreading out in the upper and lower directions from the image element of interest (i, j). Regarding the computation of the luminosity transparency rate signal VT (i, j), it is possible to set the range from which the local average is taken to approximately three times the range presumed to include a foreign object. However, there is no particular limitation on the range from which the local average is taken. For example, regarding the computation of the luminosity transparency rate signal VT (i, j), the first image correction unit 3074 may set the values of α and β (the number of image elements) to be α=(36 to 55) and β=(36 to 55).

Figure 21A:
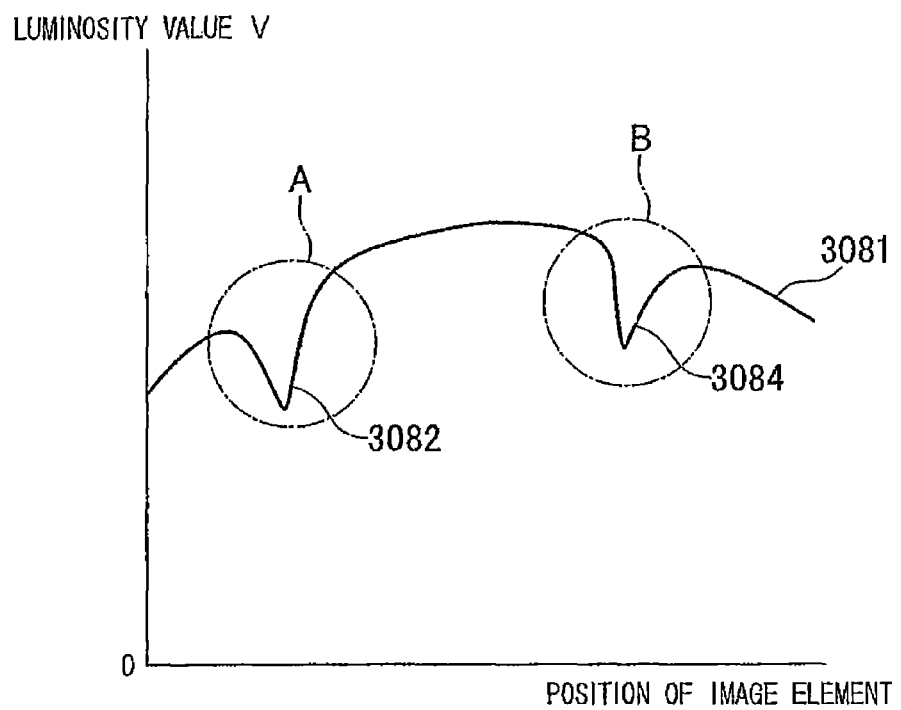
FIG. 21A is a conceptual diagram showing a creation process of a gain map.
Figure 21B:
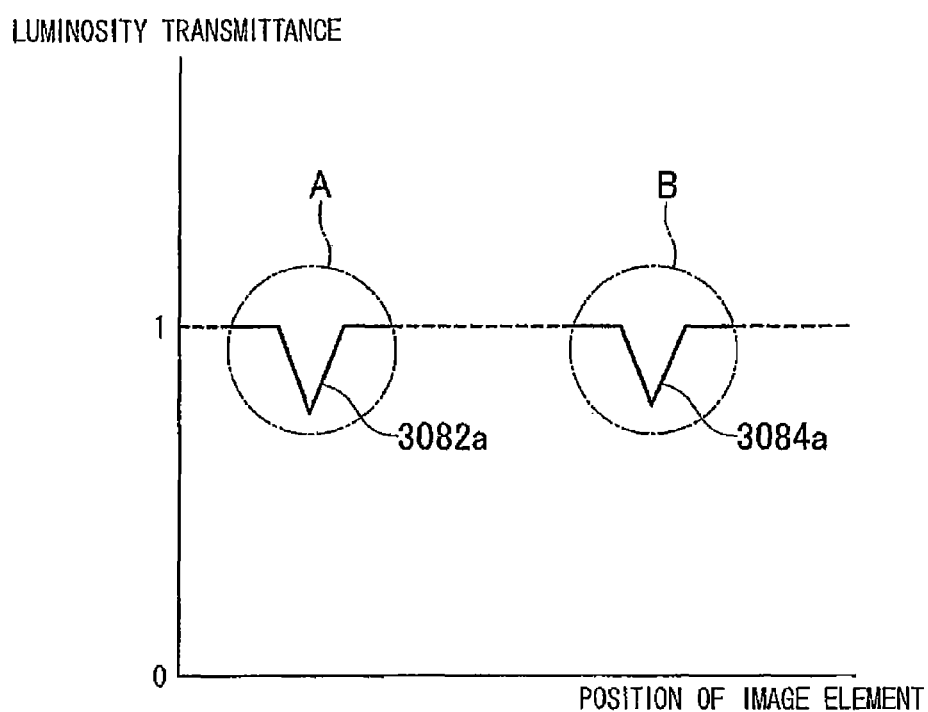
FIG. 21B is a conceptual diagram showing a creation process of a gain map.

FIGS. 21A and 21B are conceptual diagrams illustrating the generation of a luminosity transparency rate map performed by the first image correction unit 3074. FIG. 21A indicates a change in the luminosity V of the photographed image in the left and right directions in the luminosity plane. There are concave portions 3082 and 3084 in the luminosity plane (curve) 2081 shown in FIG. 21A. The concave portions 3082 and 3084 are such that the luminosity V is low compared to the surrounding portions, and the luminosity gradient Vgrad (i, j) is large. In FIG. 21A, the detection region which will be corrected by the first image correction unit 3074 is the detection region A and the detection region B corresponding to the concave portions 3082 and 3084.

The first image correction unit 3074 shown in FIG. 19 computes a luminosity transparency rate signal VT (i, j) for each image element included in the detection region A of the luminosity plane (curve) shown in FIG. 21A and each element included in the detection region B. FIG. 21B shows a luminosity transparency rate map computed by the luminosity plane (curve) shown in FIG. 21A. Only the decrease in luminosity due to the foreign object is extracted from the concave portions 3082 and 3084 of the luminosity plane shown in FIG. 21A by a localized normalization process. In the luminosity transparency rate map shown in FIG. 21B, the concave portions are replaced with concave portions 3082a and 3082b of the luminosity transparency rate. In this way, the first image correction unit 3074 creates a luminosity transparency rate map for the detection region determined to be a portion corresponding to the foreign object. The first image correction unit 3074 may calculate a first correction amount (i.e., a luminosity gain), which is the amount of correction performed by the first image correction, independently for each detection region by generating a gain map for each detection region.

Furthermore, the first image correction unit 3074 executes a first image correction to reduce or eliminate the influence of a foreign object with respect to the portion corresponding to the foreign object shown in the photographed image by using the position information of each detection region and the luminosity transparency rate map of each detection region. The first image correction unit 3074 performs a gain correction by multiplying the luminosity V (i, j) of each image element included in the detection region with an inverse number of the luminosity transparency rate signal VT (i, j). In other words, the first image correction unit 3074 performs a gain correction on the luminosity V of the image element included in the detection region corresponding to the foreign object shown in the photographed image. In this way, the first image correction unit 3074 reduces or eliminates a change in the luminosity caused by the foreign object being shown in the photographed image. For instance, the first image correction unit 3074 computes a corrected luminosity VC(i, j) using the Equation (24).

Equation (24)

$$VC(i,j)=V(i,j)/VT(i,j) \qquad (24)$$

In this way, the first image correction unit 3074 corrects the luminosity plane of the photographed image by replacing the luminosity V (i, j) of the detection region to a luminosity VC (i, j) which has undergone a gain correction. As a result, the first image correction unit 3074 corrects the luminosity plane of the photographed image by replacing the luminosity V (i, j) of the detection region with the gain corrected luminosity VC (i, j). As a result, the first image correction unit 3074 may reduce or eliminate a change in the luminosity of the photographed image due to the foreign object shown in the image.

The second image correction unit 3076 uses the color saturation information computed by the color saturation information calculation unit 3056 and perform a second image correction on the portion corresponding to the foreign object shown in the photographed image to reduce the influence of this foreign object. The second image correction unit 3076 performs a second image correction using the color saturation plane and the color saturation S of each image element computed by the color saturation information calculation unit 3056.

In a manner similar to the first image correction unit 3074, the second image correction unit 3076 performs a standardization (normalization) procedure of a local color saturation S, computes the color saturation transparency rate signal ST (i, j) with respect to the detection region that will be corrected, and generates a color saturation transparency rate map (color saturation gain map) regarding the detection region that will be corrected. Similar to the case of the first image correction unit 3074, the detection region that will be corrected by the second image correction unit 3076 is the detection region that was determined by the foreign object determination unit 3048 or the detection correction unit 3044 to be a portion corresponding to the foreign object.

The equation for computing the color saturation transparency rate signal ST (i, j) can be obtained by replacing the luminosity transparency rate signal VT (i, j) and the luminosity V (i, j) in Equation (23) to a color saturation transparency rate signal ST (i, j) and a color saturation S(i, j). In addition, similar to the first image correction unit 3074, the second image correction unit 3076 creates a color saturation transparency rate map with respect to the detection region determined to be a portion corresponding to the foreign object. The second image correction unit 3076 may compute the second correction amount (i.e., the color saturation gain) independently for each detection region by creating a gain map for each detection region. The second correction amount is the amount of correction executed in the second image correction.

Similar to the first image correction unit 3074, the second image correction unit 3076 performs a second image correction on the portion corresponding to the foreign object shown in the photographed image in order to reduce or eliminate the influence of the foreign object by using the position information of each detection region and the color saturation transparency rate map of each detection region. The second image correction unit 3076 performs a gain correction by multiplying an inverse number of the color saturation transparency rate signal ST (i, j) with the color saturation S (i, j) of each image element included in the detection region. For example, the second image correction unit 3076 computes the corrected color saturation SC (i, j) by using the Equation (25) below.

Equation (25)

$$SC(i,j)=S(i,j)/ST(i,j) \qquad (25)$$

In this way, the second image correction unit 3076 corrects the color saturation plane of the photographed image by replacing the color saturation S(i, j) of the detection region with the gain corrected color saturation SC (i, j). As a result, the second image correction unit 3076 can reduce or eliminate the change in the color saturation in the photographed image caused by the foreign object.

The third image correction unit 3078 can perform a third image correction on the portion corresponding to the foreign object shown in the photographed image in order to reduce the influence of the foreign object, by using a color phase information computed by the color phase information calculation unit 3058. The third image correction unit 3078 performs a third image correction by using the color phase plane and the color phase H of each image element computed by the color phase information calculation unit 3058.

In a manner similar to the first image correction unit 3074, the third image correction unit 3078 performs a standardization (normalization) procedure of a local color phase H, computes the color phase transparency rate signal HT (i, j) with respect to the detection region that will be corrected, and generates a color phase transparency rate map (color phase gain map) regarding the detection region that will be corrected. Similar to the case of the first image correction unit 3074, the detection region that will be corrected by the third image correction unit 3078 is the detection region that was determined by the foreign object determination unit 3048 or the detection correction unit 3044 to be a portion corresponding to the foreign object.

The equation for computing the color phase transparency rate signal HT (i, j) can be obtained by replacing the luminosity transparency rate signal VT (i, j) and the luminosity V (i, j) in Equation (23) to a color phase transparency rate signal HT (i, j) and a color phase H(i, j). In addition, similar to the first image correction unit 3074, the third image correction unit 3078 creates a color phase transparency rate map with respect to the detection region determined to be a portion corresponding to the foreign object. The third image correction unit 3078 may compute the third correction amount (i.e., the color phase gain) independently for each detection region by creating a gain map for each detection region. The third correction amount is the amount of correction executed in the third image correction.

Similar to the first image correction unit 3074, the third image correction unit 3078 performs a third image correction on the portion corresponding to the foreign object shown in the photographed image in order to reduce or eliminate the influence of the foreign object by using the position information of each detection region and the color phase transparency rate map of each detection region. The third image correction unit 3078 performs a gain correction by multiplying an inverse number of the color phase transparency rate signal HT (i, j) with the color phase H (i, j) of each image element included in the detection region. For example, the third image correction unit 3078 computes the corrected color phase HC (i, j) by using the Equation (26) below.

Equation (26)

$$HC(i,j)=H(i,j)/HT(i,j) \qquad (26)$$

In this way, the third image correction unit 3078 corrects the color phase plane of the photographed image by replacing the color phase H(i, j) of the detection region with the gain corrected color phase HC (i, j). As a result, the third image correction unit 3076 can reduce or eliminate the change in the color phase in the photographed image caused by the foreign object.

When the color correction determination unit 3052, for example, determines that the photographed image that is currently planning to be corrected is an image processed with a non-linear correction such as a PEG image, the foreign object image correction unit 3050 performs an HSV correction correcting the photographed image with a first to third image correction executed by the first to third image correction units 3074-3078.

According to the HSV correction performed by the first to third image correction units 3074-3078, the photographed image is HSV-converted, a gain map is created independently for each of the luminosity plane, the color saturation plane, and the color phase plane, and an image correction is performed. Therefore, even in a case in which a non-linear correction is applied to a color of a photographed image, the HSV correction performed by the first to third image correction units 3074-3078 makes it possible to correct the change of the color due to the foreign object while maintaining a high degree of harmony with the coloring of the surrounding regions.

Incidentally, when the color correction determination unit 3052 determines that the photographed image which is planning to be corrected is an image that has not been processed with a non-linear correction such as a RAW image, the foreign object image correction unit 3050 may perform a general correction using only the brilliance. Here, it is also possible to perform a correction using only the luminosity.

In general, a correction of the brilliance is made as follows. A standardization (normalization) procedure is applied to a localized brilliance Y, and for each detection region that will be corrected, a brilliance transparency rate signal YT (i, j) is computed. Thus, a brilliance transparency rate map (brilliance gain map) is generated for the detection region that will be corrected. The equation for computing the brilliance transparency rate signal YT (i, j) may be obtained by replacing the luminosity transparency rate signal VT (i, j) and the luminosity V (i, j) in Equation (23) with the brilliance transparency rate signal YT (i, j) and the brilliance value Y (i, j).

A gain correction is performed by multiplying the inverse number of the brilliance transparency rate signal YT (i, j) with each of the R value R (i, j), the G value G (i, j), and the B value B (i, j) of each image element included in the detection region. For example, a corrected R value RC (i, j), G value GC (i, j), and B value BC (i, j) are computed using the Equations (27-1) to (27-3) below.

Equations (27-1)-(27-3)

$$RC(i,j)=R(i,j)/YT(i,j) \qquad (27\text{-}1)$$

$$GC(i,j)=G(i,j)/YT(i,j) \qquad (27\text{-}2)$$

$$BC(i,j)=B(i,j)/YT(i,j) \qquad (27\text{-}3)$$

In this way, the photographed image can be corrected by replacing the RGB value of each image element included in the detection region with the gain-corrected R value RC (i, j), G value GC (i, j), and B value BC j), which is a normal correction performed using only the brilliance.

Incidentally, the normal correction using only the brilliance is performed by using only the gain map of the brilliance (YT (i, j)) as indicated in Equations (27-1)-(27-3). Therefore, when an image that has been non-linearly corrected is processed with a normal correction that uses only the brilliance, either of the RGB values (RC (i, j), GC (i, j), and BC (i, j)) of the image element after the correction becomes a value that is different from the RGB value of the image element in the surrounding area. In this way, a correction vestige may be created.

In addition, such a problem is more likely to occur when a strong non-linear correction is applied to the photographed image to be corrected. Moreover, the format of the non-linear correction applied on the photographed image may differ depending on the type of imaging devices such as a camera. Meanwhile, according to the HSV correction based on the above embodiment, each of a luminosity gain map, a color saturation gain map, and a color phase gain map are generated to perform the correction, as indicated in Equations (24) to (26). As a result, the gain-corrected image element is corrected to be a color that is close to that of the image element in a surrounding region. Further, even if a on-linear correction has been applied to the photographed image to be corrected, the HSV correction prevents problems such as the correction vestige being created on the photographed image that was corrected. In addition, this effect can be attained regardless of the format of the non-linear correction that has been applied to the image to be corrected. In other words, the same effect as described above in the present embodiment can be expected for images other than a PEG that has been non-linearly corrected.

Incidentally, according to the HSV correction performed by the foreign object image correction unit 3050, the corrected photographed image may be generated by combining the luminosity plan, the color saturation plane, and the color phase plane that have been corrected by the first to third image correction unit 3074-3078. However, the image correction made by the second image correction unit 3074 or the third image correction unit 3078 may be omitted. In other words, according to the HSV correction by the foreign object image correction unit 3050, a gain correction may not be performed on either one of the color saturation plane or the color phase plane. Instead, the corrected photographed image may be generated by combining the color saturation plane or the color phase plane, which has not been gain-corrected, with the corrected luminosity plane and the like.

According to the present embodiment, a correction based on the color saturation using the second image correction unit 3076 is combined with the correction based on the luminosity using the first image correction unit 3074 (including the correction based on the brilliance). As a result, compared to a normal correction using only the brilliance, the accuracy with which a foreign object is removed and corrected increases especially with respect to a non-linearly corrected image. In addition, according to the present embodiment, the correction based on the color phase using the third image correction unit 3078 is combined with the correction based on the luminosity using the first image correction unit 3074 (including the correction based on the brilliance). As a result, compared to a normal correction using only the brilliance, the accuracy with which a foreign object is removed and corrected increases especially with respect to a non-linearly corrected image.

Incidentally, according to the HSV correction, the foreign object image correction unit 3050 may compute the first to third correction amount, which are the correction amount regarding the first to third image correction, independently for each detection region. By computing the correction amount independently for each detection region, the image processing device according to the present embodiment may reduce the amount of computation compared to the case in which the correction amount is computed for the entire photographed image. In addition, the first image correction unit of the foreign object image correction unit 3050 may perform the image correction using the brilliance information instead of the luminosity information.

The color correction determination unit 3052 determines whether or not the photographed image, which is to be corrected by the foreign object image correction unit 3050 by removing the influence of the foreign object, has been non-linearly corrected with respect to a photographed image obtained by applying a photoelectric conversion on the image by the optical system 3016 of the camera 3010. The color correction determination unit 3052 determines whether or not the photographed image, which is to be corrected by the foreign object image correction unit 3050 by removing the influence of the foreign object, has been non-linearly corrected, and outputs the determination result to the foreign object image correction unit 3050.

When the color correction determination unit 3052 determines that the photographed image that is to be currently corrected has been non-linearly corrected, the foreign object image correction unit 3050 performs the HSV correction according to the first to third image correction units 3074-3078. Thus, the foreign image correction unit 3050 performs a correction to reduce the influence of the foreign object. On the other hand, when the color correction determination unit 3052 determines that the photographed image to be presently corrected has not been non-linearly corrected, the foreign object image correction unit 3050 does not perform the image correction by the first to third image correction units 3074-3078. Instead, the foreign object image correction unit 3050 may perform a normal correction using only the brilliance, and thus may perform a correction reducing the influence of the foreign object from the foreign object image collection unit 3050.

In addition, the color correction determination unit 3052 may determine the degree of strength of the non-linear correction that is applied to the photographed image that is to be corrected by the foreign object image correction unit 3050 removing the influence of the foreign object. Thus, the color correction determination unit 3052 may determine the degree of strength of the non-linear correction that is applied to the photographed image that is to be corrected by the foreign object image correction unit 3050 removing the influence of the foreign object, and outputs the determination result to the foreign object image correction unit 3050.

In this case, when the color correction determination unit 3052 determines that a strong non-linear correction has been applied to the photographed image that is presently being corrected, the foreign object image correction unit 3050 performs the HSV correction by the first to third image correction unit 3074-3078, and performs a correction to reduce the influence of a foreign object from the foreign object image correction unit 3050. On the other hand, when the color correction determination unit 3052 determines that a weak non-linear correction has been applied to the photographed image that is presently being corrected, the foreign object image correction unit 3050 does not perform the image correction by the first to third image correction units 3074-3078 and instead performs a normal correction using only the brilliance, and thus performs a correction to reduce the influence of the foreign object on the foreign object image correction unit 3050.

The memory unit 3030 stores a corrected determination standard which has been corrected by the detection correction unit 3044, data of the detection region, and conditions for photographing the photographed image. The memory unit 3030 comprises nonvolatile memory and the like. The operation signal input unit 3032 is an input unit which receives an input of an operation signal corresponding to an operation performed by a user to specify a portion corresponding to a foreign object shown in the photographed image. The operation signal input unit 3032 receives an input of operation signal to alter, for example, a threshold value (determination standard) used by the first to fourth determination units 3064-3070 of the foreign object determination unit 3048 such as a threshold value C1 concerning the size of the detection region, a threshold value C2 concerning the ratio of the luminosity in the interior and exterior of the detection region.

The operation signal input unit 3032 includes a user interface for the user to input an operation signal to the image processing device. Examples of the user interface includes, for example, a button equipped on the camera main body 3012 (see FIG. 18), a cross-shaped key, and a rotating-style selector. The detection correction unit 3044 may correct the determination made by the foreign object determination unit 3048 according to the operation signal inputted to the computation unit 3038 via the operation signal input unit 3032.

The imaging condition signal input unit 3034 receives an input of an imaging condition concerning the photographed image that will be evaluated by the foreign object determination unit 3048 and the photographed image that is processed with an image correction by the foreign object image correction unit 3050. The imaging condition that is inputted to the imaging condition signal input unit 3034 includes, for example, a focus value or an imaging sensitivity when the image is photographed, or the type of optical system or the focal length that were used when the image was photographed.

The detection correction unit 3044 may store to the memory unit 3030, a corrected determination standard of a data concerning the foreign object map shown in FIG. 22 in correspondence with the imaging condition that has been inputted via the imaging condition signal input unit 3034. In addition, the determination standard alteration unit 3042 may alter the initial determination standard, which is a determination standard used when the first to fourth determination unit 3064-3070 of the foreign object determination unit 3048 makes a determination. Here, the determination standard alteration unit 3042 may alter the initial determination standard for each imaging condition based on the corrected determination standard corresponding to the imaging condition. The foreign object detection sensitivity according to the preference of the user may change according to the imaging condition. The image processing device including the imaging condition signal input unit 3034 may make the initial determination standard of the foreign object determination unit 3048 closer to the preference of the user of the camera 3010.

In addition, when a foreign object positioned at a particular place in the optical filter 3020 continues to be attached there, it is highly likely that the foreign object will continue to be shown at a specific location of the photographed image when the imaging condition is the same. Therefore, by saving data concerning the foreign object map according to the imaging condition, the image processing device based on the present embodiment may easily specify the position at which the foreign object that the user identified is shown in the photographed image.

The display unit 3036 comprises, for example, a liquid crystal display device and the like equipped to a camera main body part 3012 (see FIG. 18). The display unit 3036 may display the position of the detection region which was determined again by the detection correction unit 3044 to be a portion corresponding to the foreign object in a manner such that the detection region overlaps with the photographed image.

Figure 20A:
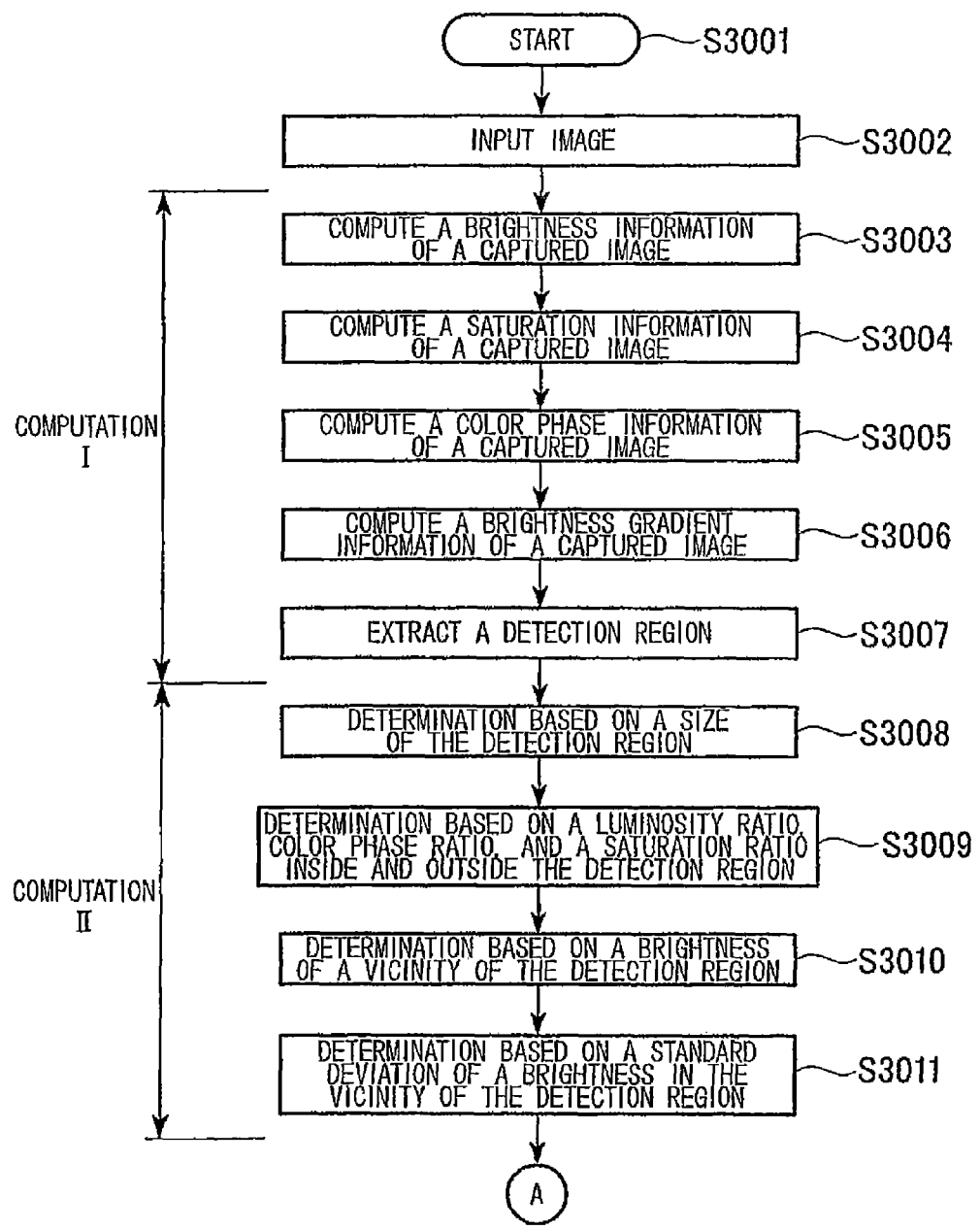
FIG. 20A is a flowchart showing a first half portion of an example of an image processing computation performed by an image processing device according to the above embodiment.
Figure 20B:
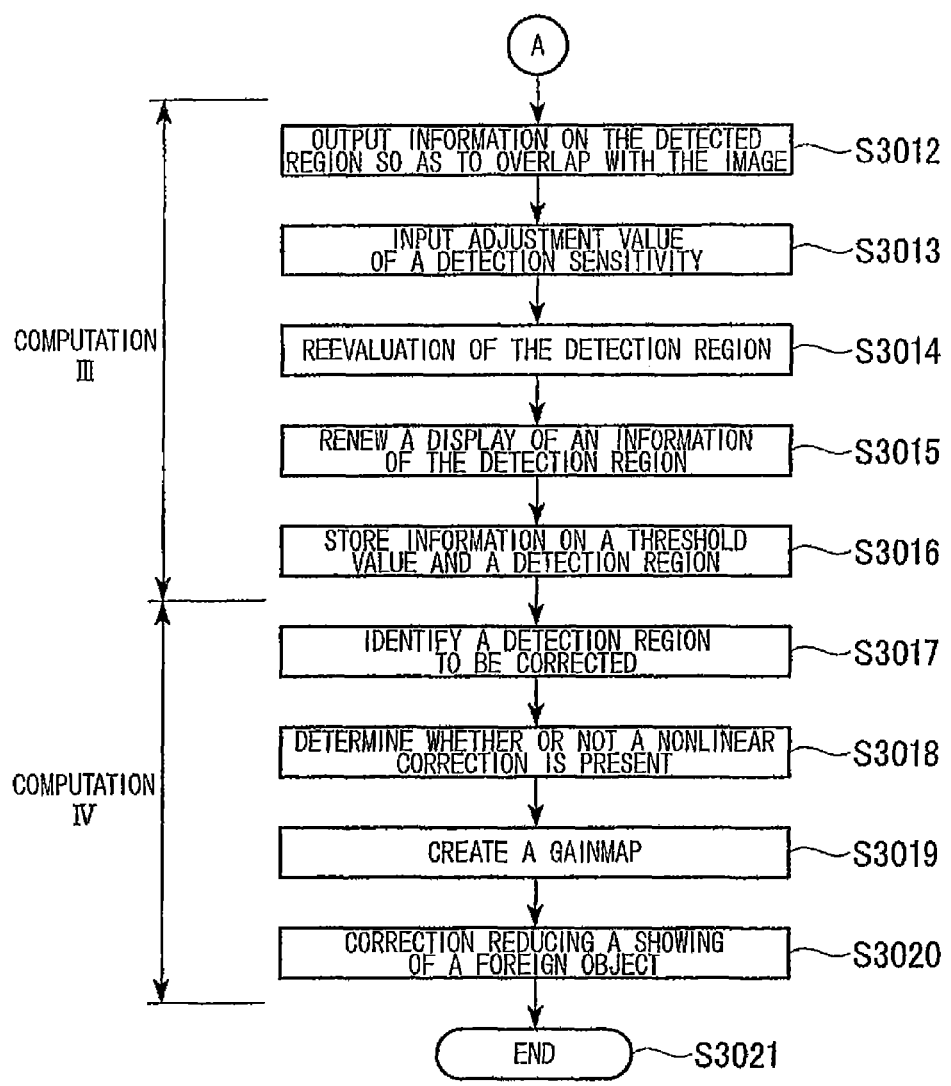
FIG. 20B is a flowchart showing a latter half portion of an example of an image processing computation performed by an image processing device according to the above embodiment.

FIGS. 20A and 2013 show a flowchart indicating an example of an image processing operation performed by the camera 3010 shown in FIG. 19. FIG. 20A shows a first half portion of the image processing operation. FIG. 20B shows a second half of the image processing operation. As indicated in FIGS. 20A and 20B, the image processing operation includes a calculation I including steps S3003-S3007, a calculation II including steps S3008-S3011, a calculation III including steps S3012-S3016, and a calculation IV including steps S3017-S3020.

In the calculation I, the calculation computes information concerning the color of the photographed image, such as the brightness information and the color saturation information. In the calculation II, the calculation unit 3038 uses the information computed in the calculation I, and calculates a foreign object information concerning the foreign object that is shown in the photographed image, such as the position of the foreign object shown in the photographed image. In addition, in the calculation II, the calculation unit 3038 uses the information computed in the calculation I, and determines whether or not the detection region inside the photographed image is a portion corresponding to the foreign object shown in the photographed image.

In the calculation III, the calculation unit 3038 inputs the operation signal of the user via the operation signal input unit 3032, and performs a calculation to correct the determination made in the calculation II in accordance with the inputted operation signal. In the calculation IV, the calculation unit 3038 specifies the detection region in which the foreign object is shown based on the determination result made by the calculation II or the calculation III. Then, the calculation unit 3038 uses the information computed in the calculation I and performs an image correction with respect to the portion corresponding to the foreign object shown in the photographed image, in order to reduce the influence of the foreign object. In the calculation IV, the calculation unit 3038 performs a first image correction (i.e., an image correction performed by the first image correction unit 3074) using the brightness information computed in the calculation I, in order to reduce the influence of the foreign object. Furthermore, in the calculation IV, a second image correction (i.e., an image correction performed by the second image correction unit 3076) using the color saturation information computed in the calculation I to reduce the influence of the foreign object, and a third image correction (i.e., an image correction performed by the third image correction unit 3078) using the color phase information computed in the calculation I to reduce the influence of the foreign object, are performed.

The image processing device equipped in the camera 3010 shown in FIG. 19 starts the series of image processing operations in step S3001, as indicated in FIG. 20A. In step S3002, the photographed image, taken by the imaging unit 3026, is inputted to the calculation unit 3038 via the image input unit 3028.

Figure 23:
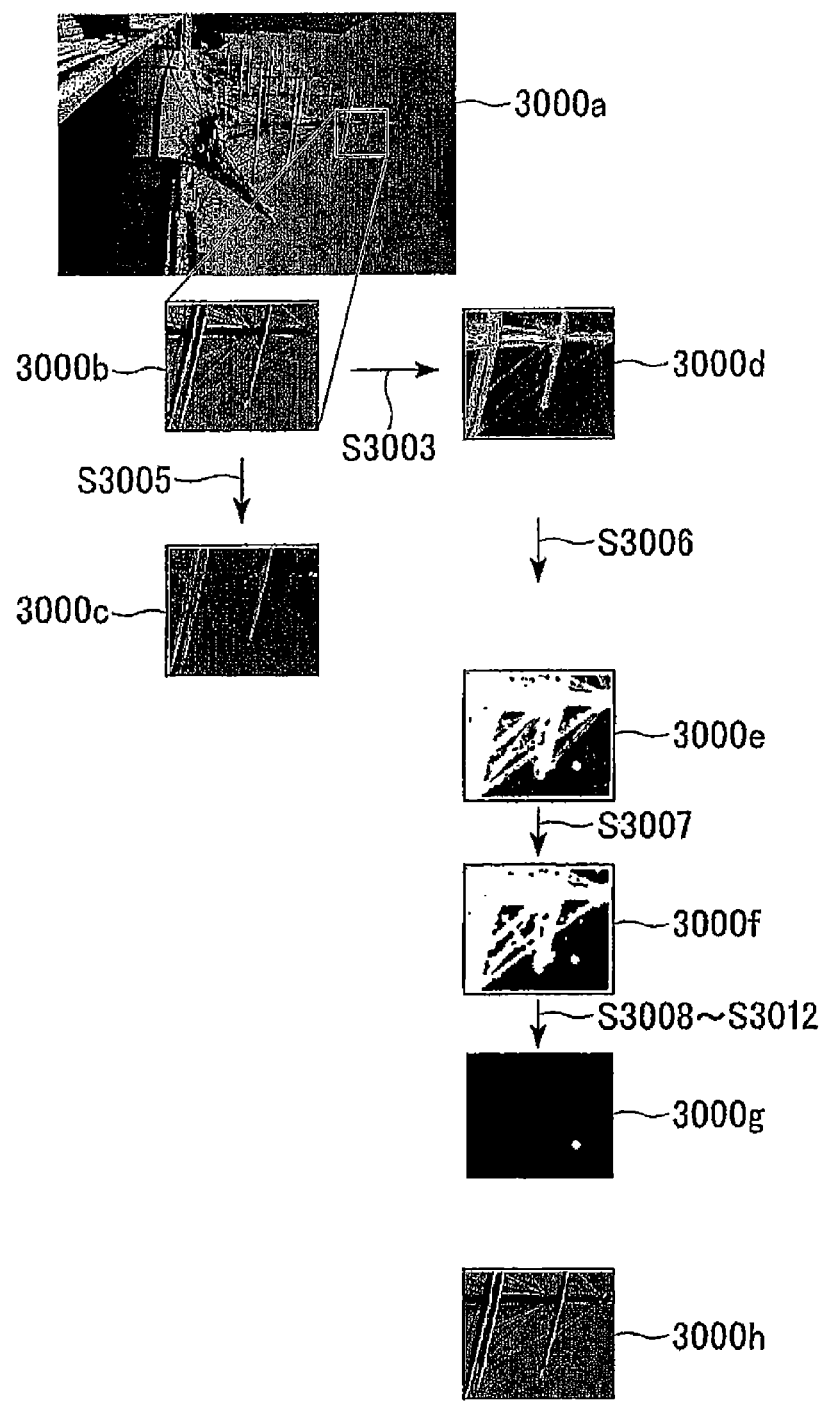
FIG. 23 is a conceptual diagram showing an image and the like computed by an image processing device according to the above embodiment.

FIG. 23 illustrates the image processing operation performed by the camera 3010 shown in FIG. 19, by showing the photographed image 3000b (reference numeral 3000b) as an example. The photographed image 3000b is a part of the photographed image indicated by the reference numeral 3000a. In step S3002 shown in FIG. 20A, the photographed image 3000b is inputted to the calculation unit 3038.

In steps S3003-S3007 shown in FIG. 20A, the information calculation unit 3046 of the calculation unit 3038 shown in FIG. 19 computes information concerning the color of the photographed image. In step S3003, the brightness information calculation unit 3054 of the information calculation unit 3046 computes a brightness information corresponding to the brightness of the photographed image. The brightness information computation unit 3054 may compute the brilliance plane of the photographed image, or the luminosity plane of the photographed image. However, in step S3003 indicated in FIG. 20A, the brightness information calculation unit 3054 calculates the luminosity plane using the Equations (19-1) and (19-6) mentioned above.

In step S3003, the color saturation information calculation unit 3056 of the information calculation unit 3046 uses the Equations (19-2), (19-6), and (19-7) mentioned above to compute the color saturation plane. In addition, in step S3005, the color phase plane is computed using the Equations (19-3)-(19-5) and (19-6)-(19-10) mentioned above.

As shown in FIG. 23, in step S3003, the luminosity plane 3000d (reference numeral 3000d) of the photographed image 3000b is computed from the photographed image 3000b. In addition, in step S3004, the color saturation plane (not diagramed) of the photographed image 3000b is computed from the photographed image 3000b. Further, in step S3005, the color phase plane 3000c of the photographed image 3000b is computed from the photographed image 3000b.

In step S3006 shown in FIG. 20A, the brightness gradient information calculation unit 3060 of the information calculation unit 3046 computes the brightness gradient information corresponding to the brightness gradient of the photographed image. The brightness gradient information calculation unit 3060 may compute the brilliance gradient plane of the photographed image or may compute the luminosity gradient plane of the photographed image. However, in step S3006 shown in FIG. 20A, the brightness gradient information computation unit 3060 uses the data of the luminosity plane computed in step S3003 and Equation (21) described earlier, in order to compute the luminosity gradient plane.

In step S3007 indicated in FIG. 20A, the region calculation unit 3062 of the information calculation unit 3046 computes the detection region. The region calculation unit 3062 computes a binary format image using the luminosity gradient plane computed by the brightness gradient information calculation unit 3060, and computes the detection region. The region calculation unit 3062 identifies a region in which image elements having a luminosity gradient value greater than the threshold value are positioned continuously as one detection region.

In step S3006, the luminosity gradient plane 3000e (reference numeral 3000e) of the photographed image 3000b is computed from the luminosity plane 3000d (reference numeral 3000d) of the photographed image 3000b, as indicated in FIG. 23. Further, in step S3007, the binary format image 3000f (reference numeral 3000f) is computed from the luminosity gradient plane 3000e.

In steps S3008-S3011 shown in FIG. 20A the foreign object determination unit 3048 of the calculation unit 3038 shown in FIG. 19 uses the information computed by the information calculation unit 3046 and, for each detection region specified by the region calculation unit 3062, determines whether or not the detection region is a portion corresponding to a foreign object.

In step S3008 shown in FIG. 20A, the first determination unit 3064 of the foreign object determination unit 3048 refers to the size of the detection region that is being evaluated in order to determine whether or not the detection region is a portion corresponding to the foreign object shown in the image. The first determination unit 3064 may use the binary format image 3000l to compute the size of the detection region from the number of image elements and the like included in the detection region. In addition, when the size of the detection region computed based on the binary format image 3000f is not within a predetermined range, the first determination unit 3064 determines that the detection region that is being evaluated is not a portion corresponding to the foreign object.

In step S3009 shown in FIG. 20A, the second determination unit 3066 of the foreign object determination unit 3048 uses the color saturation information corresponding to the color saturation of the detection region, the color phase information corresponding to the color phase of the detection region, and the luminosity information corresponding to the luminosity of the detection region, and determines whether or not the detection region is a portion corresponding to a foreign object shown in the image.

In step S3009, the second determination unit 3066 first uses the luminosity plane computed by the brightness information calculation unit 3054 and evaluates the difference between the first luminosity information corresponding to the luminosity of the detection region and the second luminosity information corresponding to the luminosity of the region in the vicinity of the detection region. In step S3009, the second determination unit 3066 sets the average value of the luminosity value V of the image elements included in the detection region as the first luminosity information, and sets the average value of the luminosity value V of the image elements included in the region in the vicinity of the detection region as the second luminosity information. When the ratio of the first luminosity information and the second luminosity information is not within a predetermined range, the second determination unit 3066 determines that the detection region that is being evaluated is not a portion corresponding to the foreign object.

Next, the second determination unit 3066 uses the color saturation plane computed by the color saturation information computation unit 3056 and evaluates a difference between the first color saturation information corresponding to the color saturation of the detection region and a second color saturation information corresponding to the color saturation of the region in the vicinity of the detection region. In step S3009, the second determination unit sets the average value of the color saturation value S of the image elements included in the detection region as the first color saturation information, and sets the average value of the color saturation value S of the image elements included in the region in the vicinity of the detection region as the second color saturation information. When the ratio of the first color saturation information and the second color saturation information is not within a predetermined range, the second determination unit 3066 determines that the detection region that is being evaluated is not a portion corresponding to the foreign object.

Further, the second determination unit 3066 uses the color phase plane computed by the color phase information calculation unit 3058 to evaluate the difference between the first color phase information corresponding to the color phase of the detection region and the second color phase information corresponding to the color phase of the region in the vicinity of the detection region. In step S3009, the second determination unit 3066 sets the average value of the color phase value H of the image elements included in the detection region as the first color phase information, and sets the average value of the color phase value H of the image elements included in the region in the vicinity of the detection region as the second color phase information. When the ratio between the first color phase information and the second color phase information is not within a predetermined range, the second determination unit 3066 determines that the detection region that is being evaluated is not a portion corresponding to the foreign object.

In step S3010 shown in FIG. 20A, the third determination unit 3068 of the foreign object determination unit 3048 uses the brightness information corresponding to the brightness of the region in the vicinity of the detection region to determine whether or not the detection region is a portion corresponding to the foreign object shown in the image. The third determination unit 3068 uses the luminosity plane computed by the brightness information calculation unit 3054 and computes the second luminosity information corresponding to the luminosity of the region in the vicinity of the detection region. Similar to the second determination unit 3066, the third determination unit 3068 sets the average value of the luminosity value V of the image elements included in the region in the vicinity of the detection region as the second luminosity information. When the second luminosity information is not within a predetermined range, the third determination unit 3068 determines that the detection region that is being evaluated is not a portion corresponding to the foreign object.

In step S3011 shown in FIG. 20A, the fourth determination unit 3070 of the foreign object determination unit 3048 determines, from the standard deviation of the brightness of the region in the vicinity of the detection region, whether or not the detection region is a portion corresponding to the foreign object shown in the image. The fourth determination unit 3070 uses the luminosity plane computed by the brightness information calculation unit 3054 and the Equation (22) described above, in order to compute the standard deviation of the luminosity of the region in the vicinity of the detection region. When the standard deviation of the brightness of the region in the vicinity of the detection region is not within a predetermined range, the fourth determination unit 3070 determines that the detected region which is being evaluated is not a portion corresponding to the foreign object.

In steps S3008 to S3012, only the detection region in which the foreign object is shown is extracted from the binary format image 3000f by removing the detection region that do not correspond to the foreign object such as the binary format image 3000g indicated with the reference numeral 3000g, as shown in FIG. 23.

Incidentally, the determination corresponding to steps S3008-S3011 of FIG. 20A may be conducted with respect to all of the detection regions included in the photographed image 3000b. However, the determination corresponding to steps S3009-S3011 may be performed only for the region that was not determined not to be the portion corresponding to the foreign object in the immediately proceeding steps S3009-S3011. The foreign object determination unit 3048 determines that the portion corresponding to a foreign object is the only detection region that was not determined in either of steps S3008-S3011 not to be a portion corresponding to the foreign object.

In addition, after the foreign object determination unit 3048 performs a determination in sequence from step S3008 to step S3011 for one detection region, the foreign object determination unit 3048 may perform the determination for another detection region in sequence from step S3008 to S3011. In this case, the determination concerning one detection region is made such that, once the detection region that is being evaluated is determined not to be a portion corresponding to a foreign object in either one step included in steps S3008 to S3011, the rest of the determination (step) regarding this detection region is skipped, and a determination concerning another detection region may be commenced. In this case, the foreign object determination unit 3048 determines that a portion corresponding to the foreign object is a detection region that was being evaluated in step S3011, and that was not determined not to be a portion corresponding to a foreign object in step S3011. Since the foreign object determination unit 3048 can skip the determination corresponding to steps S3009-S3011, the image processing device may reduce the amount of computation performed by the foreign object determination unit 3048.

After the calculation unit 3038 has completed the calculation II including steps S3007-S3011 in FIG. 20A, the calculation unit 3038 carries out the calculation III including steps S3012-S3016 in FIG. 20B. Incidentally, according to the setting and the like of the user, once the calculation unit 3038 has completed the calculation II including steps S3007-S3011 in FIG. 20A, the calculation unit 3038 may skip the calculation III, and may execute the calculation IV including steps S3017-S3020 in FIG. 20B.

In steps S3012-S3016 shown in FIG. 20B, the correction determination unit 3044 and the like of the calculation unit 3038 inputs the operation signal of the user via the operation signal input unit 3032, and according to the inputted operation signal, a calculation is performed to correct the determination made in steps S3008-S3011.

In step S3012 shown in FIG. 20B, the detection correction unit 3044 displays to the display unit 3036, the determination result of the foreign object determination unit 3048 such that the determination result overlaps with the photographed image. As shown in the image indicated with the reference numeral 3000h in FIG. 23, the display unit 3036 receives an instruction from the detection correction unit 3044, and displays the detection region, determined to be a portion corresponding to the foreign object in the foreign object determination unit 3048 in a manner such that the detection region is overlapped with the photographed image 3000b, and that the detection region is distinguished from the other detection region. According to the image indicated with the reference numeral 3000h, among the detection regions extracted by the region calculation unit 3062, only the position of the detection region determined to be a portion corresponding to the foreign object in the foreign object determination unit 3048 is displayed using a triangular figure.

In step S2013 shown in FIG. 20B, the operation signal for correcting the determination made in the foreign object determination unit 3048 is inputted to the detection correction unit 3044 of the calculation unit 3038 via the operation signal input unit 3032. In step S3013, the user refers to the determination result displayed on the display unit 3036, operates the user interface included in the operation signal input unit 3032, and may input the operation signal for correcting the determination made by the foreign object determination unit 3048.

When the user decides that the detection sensitivity of the foreign object obtained by the determination of the foreign object determination unit 3048 is too low, the user inputs an operation signal to alter the threshold value that is used in the determination, so that a determination will be performed again with a higher detection sensitivity compared to the determination performed by the foreign object determination unit 3048. For example, the user may input an operation signal to reduce the threshold value C1 (see FIG. 23) concerning the size of the detection region, or an operation signal to increase the threshold value C2 concerning the ratio of the luminosity regarding the interior and the exterior of the detection region (i.e., make the threshold value C2 closer to 1) (see FIG. 23).

On the other hand, when the user decides that the detection sensitivity of the foreign object obtained by the determination of the foreign object determination unit 3048 is too high, the user inputs an operation signal to alter the threshold value that is used in the determination, so that a determination will be performed again with a lower detection sensitivity compared to the determination performed by the foreign object determination unit 3048. For example, the user may input an operation signal to increase the threshold value C1 (see FIG. 23) concerning the size of the detection region, or an operational signal to reduce the threshold value C2 concerning the ratio of the luminosity regarding the interior and the exterior of the detection region (i.e., make the threshold value C2 closer to 0) (see FIG. 23).

In step S3014 shown in FIG. 20B, the detection correction unit 3044 alters the threshold value used in the determination made in the foreign object determination unit 3048 according to the operation signal inputted to the calculation unit 3038 via the operation signal input unit 3032 and determines again whether or not the detection region is a portion corresponding to the foreign object. In other words, in step S3014, the detection correction unit 3044 uses the threshold value which was altered according to the operation signal, and corrects the determination performed in the first to fourth determination units 3064-3070 in the foreign object determination unit 3048.

For example, in step S3013, when an operation signal to reduce the threshold value C1 (see FIG. 23) concerning the size of the detection region is inputted, the detection correction unit 3044 corrects the determination made by the foreign object determination unit 3048 as described below. In other words, the detection correction unit 3044 reduces the threshold value C1 of the first determination unit 3064 according to the operation signal. Then, the detection correction unit 3044 makes the foreign object determination 3048 execute again the calculation II including steps S3008-S3011. The detection correction unit 3044 identifies the detection region, which was determined by the re-calculation to be a portion corresponding to the foreign object, to be a detection region which was determined again to be a portion corresponding to the foreign object.

In step S2015 shown in FIG. 20B, the detection correction unit 3044 updates what is displayed on the display unit 3036. In other words, based on the determination corrected by the detection correction unit 3044 the display unit 3036 displays the detection region which was determined again in step S3014 to be a portion corresponding to the foreign object in a manner such that the detection region overlaps with the photographed image.

The user refers to the display unit 3036, the content of which was updated in step S3015, and when the user decides that the detection result re-evaluated by the detection correction unit 3044 is appropriate, the user inputs an operation signal ending the re-evaluation of the detection region to the camera 3010. In this case, the detection correction unit 3044 proceeds with the operation of step S3016. In addition, when the user decides that the determination result re-evaluated by the detection correction unit 3044 is inappropriate, the user inputs an operation signal to the detection correction unit 3044 to re-execute the re-evaluation of the detection region. In this case, the detection correction unit 3044 re-executes the procedure concerning steps S3013-S3015.

In step S3016 shown in FIG. 20B, the detection correction unit 3044 outputs the threshold value used during the re-evaluation, and the position of the detection region determined in the re-evaluation to be a portion corresponding to the foreign object, and the like, to the memory unit 3030. The memory unit 3030 stores data such as the threshold value used during the re-evaluation, and the position of the detection region which was determined to be a portion corresponding to the foreign object and the like. Then, based on necessity, the memory unit 3030 may output the stored data to the determination standard alteration unit 3042.

In steps S3017-S3020 shown in FIG. 20B, the foreign object image correction unit 3050 of the calculation unit 3038 uses the information computed by the brightness information calculation unit 3054 to perform an image correction with respect to the detection region determined by the detection correction 3044 to be a portion corresponding to a foreign object, in order reduce the influence of the foreign object from the photographed image.

In step S3017, the foreign object image correction unit 3050 specifies the detection region that was determined by the detection correction unit 3044 to be a portion corresponding to the foreign object to be a region that will be corrected in order to reduce the influence of the foreign object from the photographed image. In step S3018, the color correction determination unit 3052 determines whether or not the photographed image that is about to be presently corrected has been non-linearly corrected by the image conversion unit 3015.

When it is determined in step S3018 that the photographed image has been non-linearly corrected, an image correction by the first to third image correction units 3074-3078 of the foreign object image correction unit 3050 is performed in steps S2019 and S3020. Here, in step S3019, the first to third image correction units 3074-3078 of the foreign object image correction unit 3050 uses the luminosity information computed by the brightness information calculation unit 3054, the color saturation information computed by the color saturation information calculation unit 3056, and the color phase information computed by the color phase information calculation unit 3058 to create a gain map of the region to be corrected. The first to third image correction unit 3074-3078 of the foreign object image correction unit 3050 uses the information computed by the information calculation unit 3046 and Equation (23) described above to create a luminosity transparency rate map, a color saturation transparency rate map, and a color phase transparency rate map.

In step S3020, the first to third image correction unit 3074-3078 of the foreign object image correction unit 3050 uses the luminosity transparency rate map, the color saturation transparency rate map, the color phase transparency rate map, and Equations (24)-(26) to perform a gain correction of the luminosity plane, the color saturation plane, and the color phase plane of the photographed image. Furthermore, the foreign object image correction unit 3050 creates a corrected photographed image by combining the luminosity plane, color saturation plane, and color phase plane which have been gain-corrected by the first to third image correction units 3074-3078.

When it is determined in step S3018 that the photographed image has not been non-linearly corrected, a normal correction using only the brilliance may be performed in steps S3019 and S3020.

In step S3021, a procedure is performed to save the corrected photographed image generated by step S3020, and the series of image processing operations is completed.

As described above, the image processing device according to the present embodiment comprises a foreign object determination unit 3048 which uses the brightness information of the detection region and the color saturation information of the detection region to determine whether or not the detection region is a portion corresponding to the foreign object shown in the photographed image. The foreign object determination unit 3048 evaluates the detection region by using not only the brightness information of the detection region but also the color saturation information. Therefore, the foreign object determination unit 3048 can precisely determine whether or not a foreign object is shown in the detection region. This is because of the feature that the foreign object shown in the photographed image has little influence on the color saturation and the color phase, but has a strong influence on the brightness. Further, the precision of the foreign object determination unit 3048 is also made possible because, in order to detect the change in color from the photographed image caused by the foreign object shown in the photographed image, it is effective to make the determination while combining the color saturation information and the brightness information.

Incidentally, the image processing device according to the present embodiment may more precisely determine whether or not a foreign object is shown in the detection region by evaluating the detection region by using the color phase information of the detection region in addition to the brightness information of the detection region and the color saturation information of the detection region. In addition, by making the determination using the brightness information of the region in the vicinity of the detection region and the standard deviation of the brightness of the region in the vicinity of the detection region, the image processing device according to the present embodiment may more precisely determine whether or not a foreign object is shown in the detection region. This is because, in a dark portion of the photographed image and a portion in which there is a large discrepancy in the luminosity, an edge of the photographed subject may be erroneously detected as an edge due to the foreign object being shown in the photographed image. Further, in these portions, even if an edge exists due to the foreign object being shown in the photographed image, it is relatively hard to distinguish. Further, after a determination is made based on a brightness information, the image processing device according to the present embodiment may make a determination based on a color saturation information or a color phase information. In this way, the image processing device according to the present embodiment can supplement or evaluate the determination based on the brightness information by using the color saturation information or the color phase information.

The image processing device according to the present embodiment comprises a detection correction unit 3044 which corrects the determination made by the foreign object determination unit 3048 based on the operation signal by the user. Therefore, the image processing device according to the present embodiment may detect the foreign object shown in the photographed image at a detection level that is in accordance with the preference of the user. In addition, the image processing device according to the present embodiment possesses a display unit 3036 which displays the detection result before and after the correction by the detection correction unit 3044. Therefore, it is possible to prevent erroneous detections of foreign objects as well as an omission in detecting a foreign object since the user can adjust the detection level by referring to what is displayed in the display unit 3036.

In addition, the image processing device according to the present embodiment comprises a determination standard alteration unit 3042 which alters an initial determination standard based on a corrected determination standard by the detection correction unit 3044. The initial determination standard is a determination standard used when the first to fourth determination units 3064-3068 of the foreign object determination unit 3048 makes a determination. The determination standard alteration unit 3042 can make the initial determination standard of the foreign object determination unit 3048 closer to the preference of the user of the camera 3010. Therefore, the image processing device according to the present embodiment can effectively detect a foreign object according to the preference of the user. Incidentally, the detection correction unit 3044 may correct the threshold value used when the region calculation unit 3062 generates a binary image. Further, the determination standard alteration unit 3042 may alter the threshold value used when the region calculation unit 3062 generates a binary format image. The image processing device according to the present embodiment may make the sensitivity of detecting the foreign object more appropriate by correcting the threshold value used when the region calculation unit 3062 generates a binary format image or by feeding back the threshold value.

The image processing device according to the present embodiment comprises a foreign object image correction unit 3050 which performs an image correction to reduce the influence of the foreign object shown in the photographed image by adding to the gain correction of the luminosity gain map, a gain correction by the color saturation gain map and/or a gain correction by the color phase gain map. Therefore, even in a case in which the photographed image that is to be corrected has been non-linearly corrected, the image processing device according to the present embodiment correct the change in the color due to foreign object shown in the photographed image, while maintaining a high degree of consistency with the color of the surrounding region. In addition, even in a case in which the photographed image that is to be corrected has been non-linearly corrected, the image processing device according to the present embodiment can prevent a correction vestige from being created on the photographed image after the correction is made.

Incidentally, in the above embodiment, a description of an imaging device has been given with a camera 3010 equipped with an image processing device as an example. However, an imaging device comprising an image processing device is not limited to a still camera and includes a video camera, a portable phone, and the like. In addition, a program for executing the image processing operation described above is not limited a program executed in a computer equipped on a still camera, a video camera, and a portable phone, and may includes a program which can be executed in a computer in order to perform other image processing operations.

Hereinafter, a sixth embodiment of the present invention is described with reference to the figures.

Figure 24:
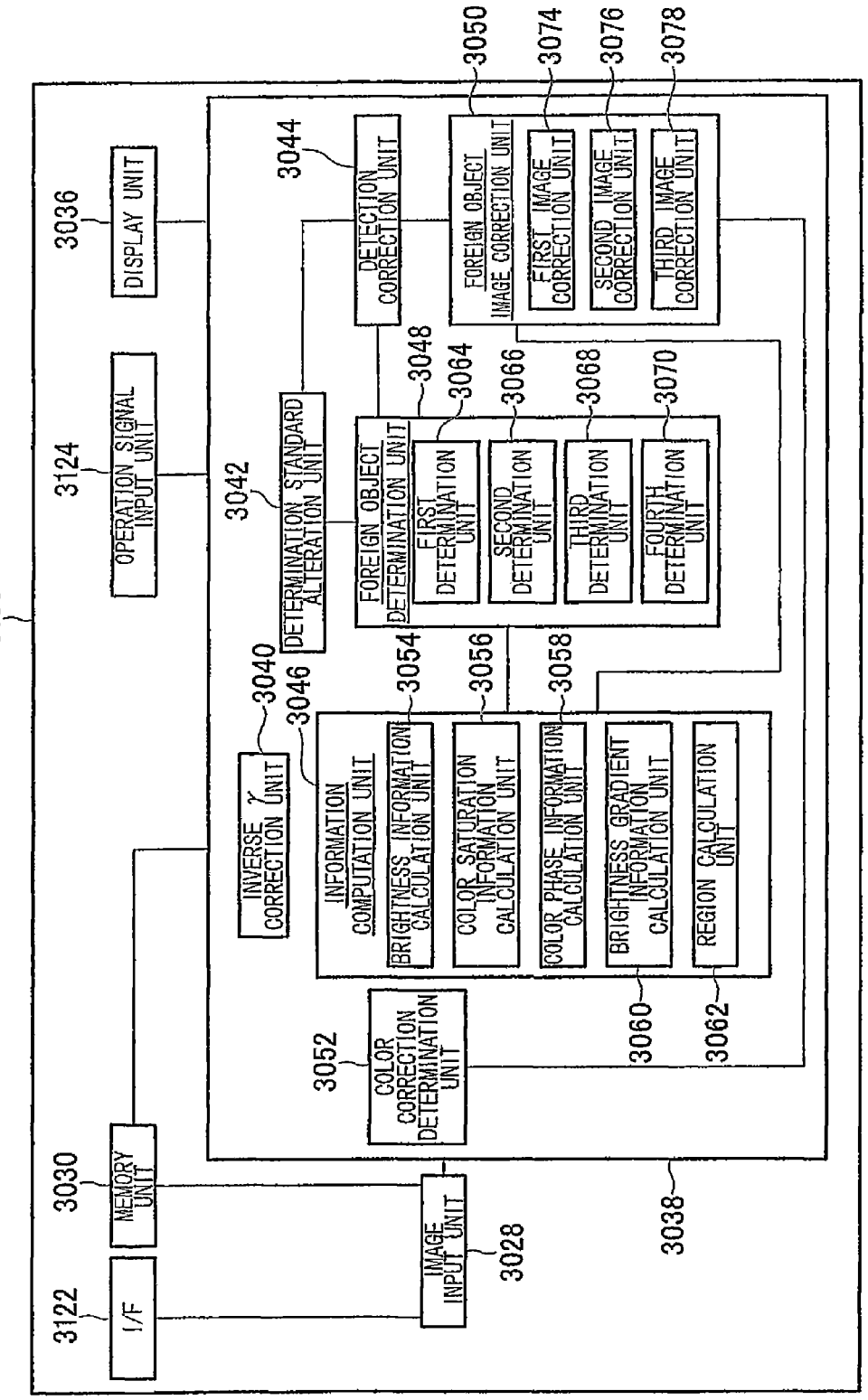
FIG. 24 is a block diagram of a computer comprising an image processing device according to a sixth embodiment of the present invention.

FIG. 24 is a block diagram of a computer 3120 such as a personal computer comprising an image processing device according to the present embodiment. The computer 3120 does not include an imaging unit 3026, an operation signal input unit 3032, an imaging condition signal input unit 3023, and an image conversion unit 3115. Instead, the computer 3120 includes, as shown in FIG. 24, an I/F (interface) 3122 and an operation signal input unit 3124. Other than the imaging unit 3026 shown in FIG. 19, the computer 3120 shown in FIG. 24 is configured in a manner similar to the camera 3010 shown in FIG. 19. Therefore, a configuration which is similar to that of the camera 3010 shown in FIG. 19 is indicated using the same reference numeral used in FIG. 19, and an explanation is omitted.

The computer 3120 comprises an I/F 3122 for connecting with a memory card, a camera, and a portable phone and the like. A photographed image is inputted to an image input unit 3028 of the computer 3120 from the I/F 3122 and/or a memory unit 3030 included in the computer 3120. Similar to the calculation unit 3038 of the camera 3010 in FIG. 19, a calculation unit 3038 shown in FIG. 24 performs a image process of a photographed image inputted via the image input unit 3028. Incidentally, the calculation unit 3038 may receive an input of the imaging conditions as well as the photographed image via the I/F 3122 and the like. The calculation unit 3038 may be a specialized circuit comprising an information calculation unit 3046 existing in the interior of the calculation unit 3038, a foreign object determination unit 3048, and a foreign object image correction unit 3050. However, it is preferred that the calculation unit 3038 include a memory unit, which stores a program for executing these features, and a central information processing device (CPU), which executes the program stored in the memory unit.

Similar to the operation signal input unit 3032 according to the third embodiment, the operation signal input unit 3124 is an input unit which receives an input of an operation signal corresponding to an operation performed by the user in order to identify the portion corresponding to the foreign object shown in the photographed image. Examples of the operation signal input unit 3124 includes a keyboard, a mouse, a touch pad, and the like. However, there is no particular limitation on the operation signal input unit 3124.

With respect to the photographed image inputted via the image input unit 3028, the calculation unit 3038 of the computer 3120 may detect a foreign object shown in the photographed image and perform an image correction reducing the influence of the foreign object shown in the photographed image, in a manner similar to the calculation unit 3028 according to the fifth embodiment. Therefore, an image processing device included in the computer 3120 attains an effect similar to an image processing device included in the camera 3010 according to the third embodiment.

While a preferred embodiment of the present invention has been described above, it should be understood that these are exemplary of the invention and are not to be considered as limiting the present invention. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A non-transitory recording medium storing an image processing program making a computer execute the steps comprising:

a step computing a first brightness value representing a brightness of each portion within an image and a second brightness value representing a brightness of an area surrounding the each portion;

a step computing a first color phase value representing a color phase of the each portion and a second color phase value representing a color phase of the area surrounding the each portion; and a step extracting a region comprising the each portion such that a difference between the first brightness value and the second brightness value is greater than or equal to a first predetermined threshold value and such that a difference between the first color phase value and the second color phase value is not greater than or equal to a second predetermined threshold value.

2. An imaging device comprising:

an imaging unit capturing an image;

a brightness computation unit computing a first brightness value representing a brightness of each portion within the image captured by the imaging unit and a second brightness value representing a brightness of an area surrounding the each portion;

a color phase value computation unit computing a first color phase value representing a color phase of the each portion and a second color phase value representing a color phase of the area surrounding the each portion; and a region extraction unit extracting a region comprising the each portion such that a difference between the first brightness value and the second brightness value is greater than or equal to a first predetermined threshold value and such that a difference between the first color phase value and the second color phase value is not greater than or equal to a second predetermined threshold value.

* * * * *